United States Patent

[11] 3,621,214

[72] Inventors Gordon W. Romney
1521 Princeton Avenue, Salt Lake City; David C. Evans, 1393 East South Temple, Salt Lake City; Alan C. Erdahl, 2277 East 1700 South, Salt Lake City, Utah; Chris R. Wylie, deceased, late of Salt Lake City, Utah Patricia A. Wylie, administratrix

[21] Appl. No. 802,702
[22] Filed Nov. 13, 1968
[45] Patented Nov. 16, 1971

[54] ELECTRONICALLY GENERATED PERSPECTIVE IMAGES
48 Claims, 66 Drawing Figs.

[52] U.S. Cl. .......... 235/151, 340/172.5, 315/18
[51] Int. Cl. .......... G06f 7/00, G06f 9/12
[50] Field of Search .......... 343/7.9; 35/10.4; 33/18 C; 340/324.1; 235/151

[56] References Cited

UNITED STATES PATENTS

| | | | |
|---|---|---|---|
| 3,145,474 | 8/1964 | Taylor, Jr. | 33/18 C |
| 3,364,382 | 1/1968 | Harrison | 340/324.1 |
| 3,441,789 | 4/1969 | Harrison | 340/324.1 |
| 3,449,721 | 6/1969 | Dertouzos et al. | 340/324.1 X |
| 3,519,997 | 7/1970 | Bernhart et al. | 340/172.5 |

FOREIGN PATENTS

| | | | |
|---|---|---|---|
| 1,016,444 | 1/1966 | Great Britain | 235/151 |

*Primary Examiner*—Eugene G. Botz
*Attorney*—Lynn G. Foster

ABSTRACT: A method and system for electronically generating and displaying two-dimensional perspective images which visually define three-dimensional objects by providing electrical signals representative of the surfaces of an object, converting, ordering and utilizing the signals to identify and display only visible surfaces and to control brightness along the visible surfaces of the eventual electronic display. More specifically, units of the electrical signals define surface portions of the object. These units are converted to define the projections of the surfaces defined by the units onto a two-dimensional image or view plane. The converted units are sorted to conform to the scanning pattern of the display device and those units which are to be visible, depending on the desired orientation of the object, are determined. The visual characteristics of the visible units are then calculated and converted to suitable form for controlling the intensity of the electronic display.

INVENTORS
Gordon W. Romney
Chris R. Wylie
David C. Evans
Alan C. Erdahl

INVENTORS
Gordon W. Rommey
Chris R. Wylie
David C. Evans
Alan C. Erdahl

INVENTORS.
GORDON W. ROMNEY
CHRIS R. WYLIE
DAVID C. EVANS
ALAN C. ERDAHL

BY [signature]

ATTORNEY

INVENTORS.
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL

BY Lynn G. Foster
ATTORNEY

INVENTORS
DAVID C. EVANS
GORDON W. ROMNEY
CHRIS R. WYLIE
ALAN C. ERDAHL
BY Lynn G. Foster
ATTORNEY

INVENTORS
GORDON W. ROMNEY
CHRIS R. WYLIE
DAVID C. EVANS
ALAN C. ERDAHL

BY [signature]
ATTORNEY

INVENTORS.
GORDON W. ROMNEY
CHRIS R. WYLIE
DAVID C. EVANS
ALAN C. ERDAHL

BY [signature]

ATTORNEY

INVENTORS.
GORDON W. ROMNEY
CHRIS R. WYLIE
DAVID C. EVANS
ALAN C. ERDAHL

BY Lynn G. Foster

ATTORNEY

INVENTORS.
GORDON W. ROMNEY
CHRIS R. WYLIE
DAVID C. EVANS
ALAN C. ERDAHL

BY Lynn G. Foster
ATTORNEY

INVENTORS
GORDON W. ROMNEY
CHRIS R. WYLIE
DAVID C. EVANS
ALAN C. ERDAHL
BY
Lynn G. Foster
ATTORNEY INVENTORS
GORDON W. ROMNEY
CHRIS R. WYLIE
DAVID C. EVANS
ALAN C. ERDAHL
BY Lynn G. Foster
ATTORNEY

INVENTORS.
GORDON W. ROMNEY
CHRIS R. WYLIE
DAVID C. EVANS
ALAN C. ERDAHL

BY Lynn G. Foster
ATTORNEY

INVENTORS
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL
BY Lynn S. Foster
ATTORNEY INVENTORS.
GORDON W. ROMNEY
CHRIS R. WYLIE
DAVID C. EVANS
ALAN C. ERDAHL
BY Lynn G. Foster
ATTORNEY INVENTORS.
GORDON W. ROMNEY
CHRIS R. WYLIE
DAVID C. EVANS
ALAN C. ERDAHL
BY Lynn G. Foster
ATTORNEY INVENTORS.
GORDON W. ROMNEY
CHRIS R. WYLIE
DAVID C. EVANS
ALAN C. ERDAHL
BY Lynn G. Foster
ATTORNEY INVENTORS.
GORDON W. ROMNEY
CHRIS R. WYLIE
DAVID C. EVANS
ALAN C. ERDAHL
BY Lynn G. Foster
ATTORNEY

INVENTORS.
GORDON W. ROMNEY
CHRIS R. WYLIE
DAVID C. EVANS
ALAN C. ERDAHL

BY Lynn G. Foster

ATTORNEY

INVENTORS.
GORDON W. ROMNEY
CHRIS R. WYLIE
DAVID C. EVANS
ALAN C. ERDAHL
BY Lynn G. Foster
ATTORNEY INVENTORS
GORDON W. ROMNEY
CHRIS R. WYLIE
DAVID C. EVANS
ALAN C. ERDAHL
BY Lynn G. Foster
ATTORNEY INVENTORS
GORDON W. ROMNEY
CHRIS R. WYLIE
DAVID C. EVANS
ALAN C. ERDAHL
BY Lynn G. Foster
ATTORNEY

INVENTORS
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL
BY Lynn G. Foster
ATTORNEY

INVENTORS
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL
BY Lynn G. Foster
ATTORNEY INVENTORS.
GORDON W. ROMNEY
CHRIS R. WYLIE
DAVID C. EVANS
ALAN C. ERDAHL
BY Lynn G. Foster
ATTORNEY

INVENTORS.
GORDON W. ROMNEY
CHRIS R. WYLIE
DAVID C. EVANS
ALAN C. ERDAHL

BY [signature]

ATTORNEY

Z Occupied Table ZOT

TRIANGLE NUMBER →

| I | II | III | Z |
|---|---|---|---|
| 0 | 0 | 0 | 16 |
| 0 | 0 | 0 | 15 |
| 0 | 0 | 0 | 14 |
| 0 | 0 | 0 | 13 |
| 1 | 0 | 0 | 12 |
| 1 | 0 | 0 | 11 |
| 1 | 1 | 1 | 10 |
| 1 | 1 | 1 | 9 |
| 1 | 1 | 1 | 8 |
| 1 | 1 | 1 | 7 |
| 1 | 1 | 1 | 6 |
| 1 | 0 | 0 | 5 |
| 1 | 0 | 0 | 4 |
| 1 | 0 | 0 | 3 |
| 1 | 0 | 0 | 2 |
| 0 | 0 | 0 | 1 |

Z ↓

Z Entry Table ZET

| Z Values | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Triangle No. | 0 | 0 | 0 | 0 | 0 | 0 | 0 | 0 | 0 | III | 0 | I | 0 | 0 | 0 | 0 |

| I | II | III |
|---|---|---|
| 0 | 0 | II |

Z Exit Table ZXT

| Z Values | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Triangle No. | 0 | I | 0 | 0 | 0 | III | 0 | 0 | 0 | 0 | 0 | 0 | 0 | 0 | 0 | 0 |

| I | II | III |
|---|---|---|
| 0 | 0 | II |

INVENTORS.
GORDON W. ROMNEY
CHRIS R. WYLIE
DAVID C. EVANS
ALAN C. ERDAHL

BY Lynn G. Foster
ATTORNEY

INVENTORS.
GORDON W. ROMNEY
CHRIS R. WYLIE
DAVID C. EVANS
ALAN C. ERDAHL
BY
ATTORNEY

ELECTRONICALLY GENERATED PERSPECTIVE IMAGES

BACKGROUND OF THE INVENTION

This invention relates to a system for generating perspective images of 3-dimensional (3-D) objects and more particularly to an electronic system for generating shaded perspective images of 3-D objects on a raster scan display. As well, the invention notably features elimination of hidden surfaces of the objects and shading of visible surfaces, through finite techniques which dramatically restrict the number of surfaces considered at any given time and which cause needed surface information to be interpolated from a relatively few surface locations where finite solutions are first obtained.

Perspective views of 3-D objects communicate to the viewer the actual physical arrangement and dimensionality of an object. Such views are generally employed in areas of design work such as architecture, machine design, product design, and other phases of engineering design. The accuracy of this communication is enhanced greatly by eliminating hidden surfaces and by shading the visible part of the perspective view to display the image as it would be seen from a source of illumination.

Hidden surfaces consist of the areas of an object normally bounded by edges, including corners, which are concealed from the sight of the viewer or observer by the other, visible parts of the object itself due to the particular object orientation. The inclusion of hidden surfaces in a perspective view tends to confuse the viewer, because ambiguities are created. This confusion increases greatly with increasing object complexity, substantially eroding the usefulness of the perspective view.

Shading enhances the realism of the perspective view by adding the appearance of depth to the 2-D representation. Thus, this appearance of depth greatly improves the ease with which the display can be comprehended by the technically trained as well as the novice.

Such perspective views are usually manually prepared by a skilled draftsman. As such, they require a large expenditure of time and the correctness of the view depends on the skill of the draftsman. Furthermore, as the complexity of the object increases more drafting skill is required to prepare the view and the expenditure of drafting time increases at a rate faster than the increase in object complexity.

To reduce the expenditure of time and skill required, drafting machines which construct perspective views have been developed. Such machines include those of the type disclosed in U.s. Pat. No. 2,442,117, issued to Davis, Jr. on May 25, 1948, U.S. Pat. No. 2,714,253and issued to Stone on Aug. 2, 1955, and U.S. Pat. No. 3,145,474 issued to Taylor, Jr. on Aug. 25, 1964. All of these drafting machines require the provision of two planar views of the object. These views are manually traced by an operator which through mechanical linkages as in the Davis, Jr. and Stone patents or electrical analog circuits as in the Taylor, Jr. patent, controls a scribe to produce a perspective view. Although these machines do reduce the expenditure of time and the level of skill necessary to produce perspective views, they still require substantial time and produce simple line drawings which do not effectively communicate the depth of the physical arrangement of the object.

Still other systems have been developed to facilitate the production of perspective views of 3-D objects. One such system is disclosed in U.S. Pat. No. 3,153,224 issued to Taylor, Jr. on Oct. 13, 1964. This system utilizes a relay calculator to perform a series of complex matrix operations to project on a point by point basis the coordinates of a 3-D object in a three-dimensional coordinate system into a two-dimensional coordinate system. The output of the system is in terms of the coordinate values of the new points which must then be plotted by a draftsman to obtain a perspective view. Thus, the system still requires the use of a draftsman, and even then produces only a simple line drawing.

Since these known systems and machines are still not satisfactory, additional efforts have been made to develop electronic systems for producing perspective views. These efforts have employed digital techniques and have utilized such methods as point by point production of the perspective view, constructing the object from basic geometrical models, and line-by-line construction of the object. These methods, however, have produced only line drawings and include hidden lines which define hidden surfaces which are those portions of the object not ordinarily visible from the viewer's position if the object is solid.

Some approaches have been made to eliminate such hidden lines; however, the computational time required by the electronic calculators carrying out these methods is so extremely great as to render the approaches impractical. In addition, the expenditure of time increases geometrically with any increase in the complexity of the object of which the perspective view is generated. In addition, these systems have sometimes utilized mechanical plotters to generate the perspective view thereby even further increasing the time required. Furthermore, these systems have not provided shaded perspective views.

Also in the past, line drawings have been electronically created upon a cathode-ray tube, but in ways which are highly impractical if not prohibitive from a time and cost point of view.

With the foregoing in mind, it is a primary object of this invention to provide a novel method and system for generating perspective images which visually describe 3-D objects.

It is another significant object of the present invention to provide a novel method and system for generating perspective images which obviate and minimize the shortcomings of previously known systems.

It is a more specific object of the present invention to provide a novel method and system for generating perspective images in which hidden surfaces are eliminated from view.

It is another object of the present invention to provide a novel method and system for generating a perspective image which is shaded to dramatize depth and thereby add materially to the realism of the generated image.

It is another object of the present invention to provide a novel method and system which utilizes a raster scan approach for generating perspective images.

It is another object of this invention to provide a novel method and system for electronically generating a perspective picture of an object by use of data units that exactly or approximately define finite subdivisions which when taken together describe the object.

It is another object to provide a novel, highly practical and finite method and system for obtaining perspective images which define three-dimensional objects by considering only selected surfaces, directly solving for certain conditions at limited locations along the selected surfaces and approximating conditions at other locations along the selected surfaces.

It is another object of the present invention to provide a unique method and apparatus for creating a two-dimensional perspective illustration of an object by eliminating from consideration things which are irrelevant to the solving for conditions or values at various locations along the object.

It is another object of the present invention to provide a novel method and system for generating essentially two-dimensional perspective representations which visually appear to be 3-D objects, in substantially less time than previously known systems and in which the time required increases approximately only linearly with the complexity of the objects.

The foregoing objectives may be accomplished by quantizing input data representative of the object into a plurality of units defining surfaces which represent the object. These units are projected onto an image plane and reordered in accordance with the pattern of the display.

Those surfaces defined by the units which would be visible in a chosen orientation of the object relative to the viewer are then determined and the intensity of illumination or apparent brightness of these visible surfaces is calculated. The results of this calculation are then utilized to modify the intensity of a display device, which traces the shaded visible surfaces upon its screen.

RESULTS

The present invention is capable of producing essentially 2-D shaded perspective pictures of a wide variety of 3-D objects, as illustrated in FIGS. 1*a*–*e*. These illustrations are lithographic reproductions of actual shaded perspective images generated upon the face of raster scan display device using a system embodying the novel concepts of the present invention. The varied objects are illustrative of the versatility of the present invention and its wide range of application. Solid portions make invisible hidden surface portions of the object, depending upon the orientation of the object chosen by the user. The variable shading gives a realism through depth perception not obtainable with simple line perspective views.

Figure 1A:
FIG. 1*a* is a 2-D reproduction of a shaded perspective image of a sphere generated by the method and systems of the present invention.

FIG. 1*a* is a perspective reproduction of a combination of triangular surface units, which closely approximate a sphere, as generated by the present invention. The sphere appears lightest at the frontmost portion of the surface curvature and gradually darkens as the surface curves away and toward the rear, which is how the equivalent object in three space would appear if illuminated by a light source at the observer's eye point. Thus, no shadows appear in the picture. The latitudinal and longitudinal lines are due to the type of triangle surfaces which are defined by units of electrical signals into which the sphere was broken down or quantized and to the resolution of the quantization which will be discussed below.

Figure 1B:
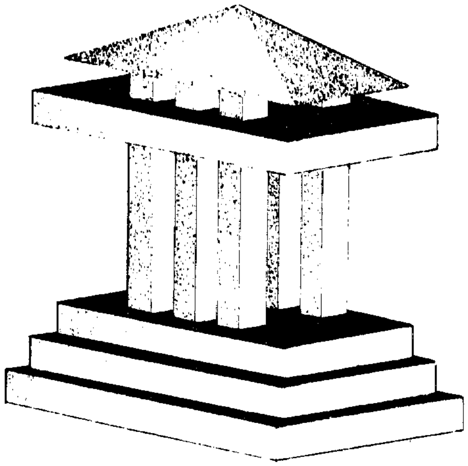
FIGS. 1*b*–1*d* are 2-D reproductions similar to the reproduction of FIG. 1*a* of other 3-D objects that have been generated according to the present invention.

FIG. 1*b* is a perspective reproduction of a geometrical structure in the shape of a building illustrating the effect of shading on perpendicular or angularly related planar surfaces, such as the horizontal portions of the stepped base, the rectangular columns and the pitched roof.

Figure 1C:
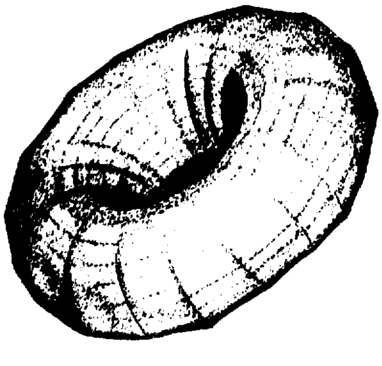

FIG. 1*c* is a perspective reproduction of a toroidal-shaped object which illustrates the reduced intensity of illumination or apparent brightness on the inside surface as compared to the frontmost outer surface which is parallel to the inside surface. This exemplifies the reduction in reflected illumination of an object in three space with increase in distance away from the observer; thus, depth in added to the visual interpretation of the display.

Figure 1D:
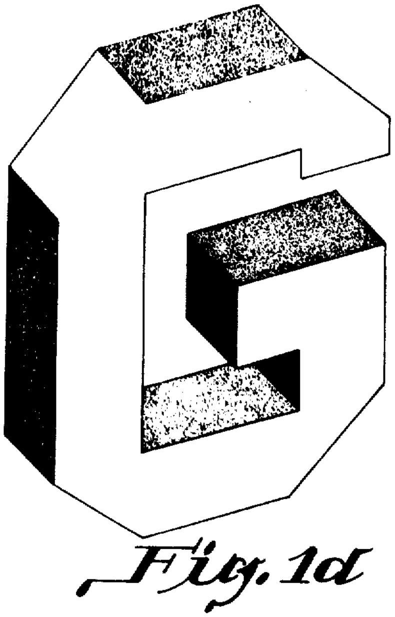

FIG. 1*d* is a perspective reproduction of 3-D block letter "G." The top of the "G" is orientated so as to be angularly exposed to the vision of the observer. The shading is similar to that heretofore described and surfaces not exposed to the vision of the observer are removed from the picture.

Figure 1E:

FIG. 1*e* is a perspective reproduction of the entire word "-Graphics" shown from left in block letters with similar shading and with hidden surfaces removed as before. The sides facing the illumination are significantly brighter than the front portions of the letters. Additionally, the letters that are nearest to the observer are displayed with a brighter intensity. The reproduction also illustrates a situation where portions of letters that are behind the preceding letter, due to the observation angle, are not visible in the picture.

Figure 2A:
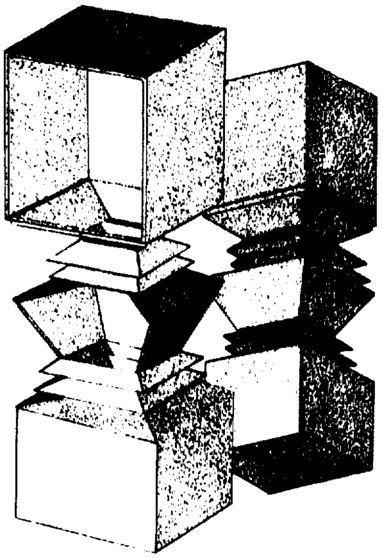
FIGS. 2*a*–*c* are 2-D reproductions similar to the reproductions of FIG. 1*a* of different views of another 3-D object that have been generated according to the present invention.
Figure 2B:
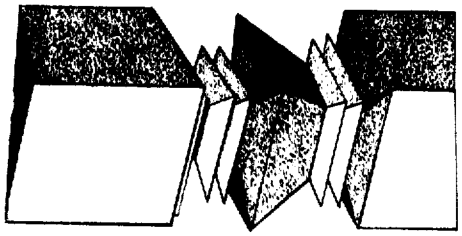
Figure 2C:
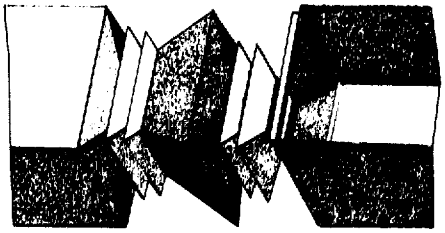

FIGS. 2*a*–2*c* are also reproductions of shaded perspective images generated by a system embodying the inventive concepts of the present invention. These reproductions are 2-D perspectives representative of the same 3-D object resulting from different orientations relative to the viewpoint.

FIG. 2*a* is a single picture of two views of the subject matter, one being in front of the other. The frontmost view is tilted forward at the top and has the front surface of the top block removed to cause the interior of the top block to be visible to the observer. The rear view of FIG. 2*a* is translated away from the observer and is tilted rearward at the top and viewed in such position as to cause the top surface of the upper block to be eliminated from view and the bottom of the bottom block to be visible. This Figure illustrates the capability of the present invention to display in the same raster an object in duplicate and to translate and rotate the object so that each view constitutes a separate display. The shading is such that the apparent brightness is correlated with the apparent distance the subject matter of the picture is from the observation point in each view.

FIG. 2*b* shows the same subject as FIG. 2*a* with the object translated toward the observer and rotated about 90° counterclockwise relative to FIG. 2*a*. FIG. 2*c* shows the same object similarly translated but rotated 90° clockwise relative to FIG. 2*a* and has the front surface of the top block removed.

These figures illustrate how the orientation of the same subject matter may be rotated, translated and otherwise manipulated with respect to the observer.

The generation of 2-D perspective representations of 3-D objects, such as illustrated in FIGS. 1*a*–1*e* and 2*a*–2*c*, is accomplished electronically by an electronic system which is a combination of interrelated electronic devices. The electronic system receives the input data which defines the object in terms of electrical signals and then processes and operates on these signals to produce end results similar to FIGS. 1*a*–1*e* and 2*a*–2*c*, as will be described in detail below.

THEORY

Briefly, the input data representing the 3-D object is quantized into units or sets of electrical signals. Each unit defines one of a plurality of surfaces in relation to a chosen 3-D coordinate system, which surfaces taken together make up the surface of the 3-D object. These units of electrical signals are then converted into units of signals which define 2-D surfaces as would result if the 3-D surfaces of the object were projected onto a two-dimensional image or view plane. The converted sets of signals which define the 2-D surfaces represent the image of the object essentially as it would be seen by an observer in a three space system. The converted electrical units or sets are reordered to conform to the order in which they would be encountered in a predetermined raster pattern display and are utilized to electronically calculate various surface parameters. These parameters are then used to determine which of the projected surfaces would be visible to the observer and to determine the relative illumination or apparent brightness of the visible surfaces from a specified light source.

These determinations are then utilized to modify the raster scan of a display as by modulating the intensity of the electron beam in a CRT while maintaining a uniform scan rate or by maintaining a uniform beam intensity and varying the rate of scan, to generate a shaded or halftone perspective picture or image.

The operation of the system may be more readily understood by the following graphical explanation.

Figures 3A, 3B, 3C:
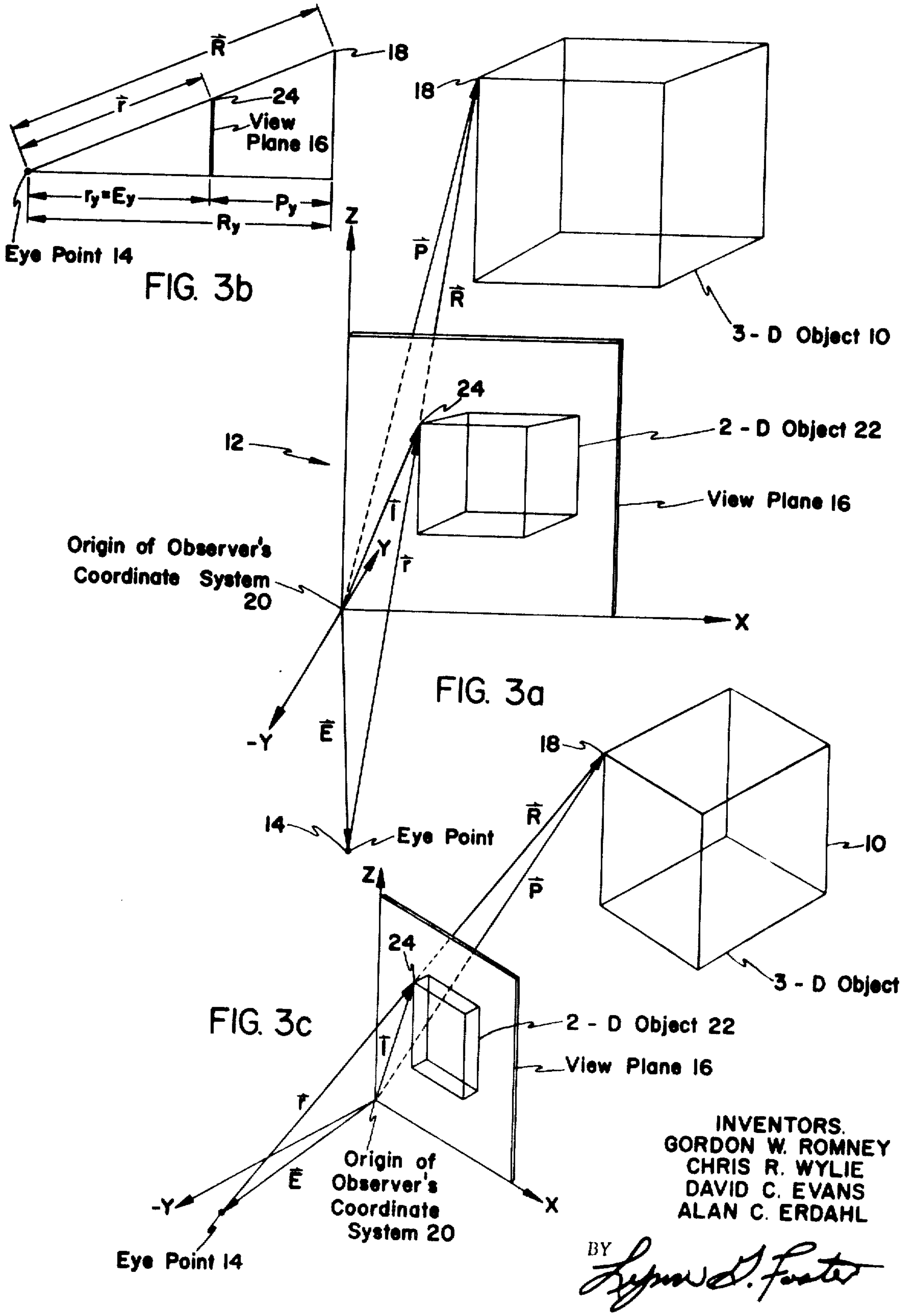
FIGS. 3*a*, *b*, *c*, *d*, are diagrammatic illustrations of the projection technique of the present invention.

Referring to FIG. 3*a*, again to provide theoretical clarity, a cube 10 is shown positioned arbitrarily relative to a three space coordinate system 12 having three orthogonal axes labeled X, Y and Z. The coordinate system 12 is the observer's coordinate system. The coordinate system 12 is determined relative to the observer whose viewing position or eyepoint 14 relative to coordinate system 12 is specified by the vector $\vec{E}$.

The image or view plane 16 is constrained to lie in the $y=0$ plane parallel to the X- and Z-axes. A point 18 on the cube 10 is specified by the vector $\vec{P}$ extending from the origin 20 of the observer's coordinate system 12. The point 18 is also specified by a vector $\vec{R}$ extending from the eyepoint 14. The cube 10, as seen from the eyepoint 14, may be described by a two-dimensional perspective image 22 lying in the viewplane 16. Every point of the image 22 corresponds to the projection of at least one point of the cube 10. For example, point 24 corresponds to the point 18. The point 24 is specified by a vector $\vec{I}$ extending from the origin 20 and by a vector $\vec{r}$ extending from the eyepoint 14.

The vector $\vec{I}$ may be defined in terms of vectors $\vec{E}$ and $\vec{r}$ in vectorial addition by the equation:

$$\vec{I}=\vec{E}+\vec{r} \qquad (1)$$

Since vectors $\vec{r}$ and $\vec{R}$ lie along the same line the vector $\vec{r}$ is proportional to vector $\vec{R}$ and may be expressed by the equation:

$$\vec{r}=w\cdot\vec{R} \qquad (2)$$

where $w$ is a scalar constant.

Furthermore, the vector $\vec{R}$ may be defined in terms of vectors $\vec{P}$ and $\vec{E}$ in vectorial subtraction by the equation:

$$\vec{R}=\vec{P}-\vec{E} \qquad (3)$$

Substituting equations (2) and (3) into equation (1), we obtain $$\vec{I}=\vec{E}+(\vec{P}-\vec{E})\cdot w \qquad (4)$$

Referring to FIG. 3*b*, which describes the positions of the points with respect to the Y- and Z-axes only, it can be seen that by the similarity of triangles $$w=\frac{\vec{r}}{\vec{R}}=\frac{r_y}{R_y}=\frac{-E_y}{P_y-E_y} \qquad (5)$$

where $r_y$, $R_y$, $E_y$, and $P_y$ are the components vectors along the Y-axis (The minus signs are necessary since $E_y$ will be negative value.)

Substituting equation (5) into equation (4), we obtain $$I=E-(P-E)\left[\frac{Ey}{Py-Ey}\right]$$

Thus, the image vector $\vec{I}$ which specifies the projection of a particular point of the object onto the view plane may be stated solely in terms of known values.

In this manner, points describing quantized surfaces representing the object may, for the sake of theoretical explanation, be said to be projected onto the viewplane, thereby defining all such points in a two-dimensional coordinate system. In the present invention, this so-called projection is accomplished by electronic calculators supplied with electrical signals representing the values of the eyepoint and the object in terms of the coordinate components of the points describing the quantized surfaces.

The particular type of perspective image which is generated depends on the choice of the object location with respect to the coordinate system 12 and the position of the eyepoint 14. A theoretical illustration of this flexibility is diagrammatically shown in FIG. 3*c*. FIG. 3*c* is equivalent to FIG. 3*a* except the perspective is taken more to the right of the object, coordinate system and eye point.

Figure 3D:
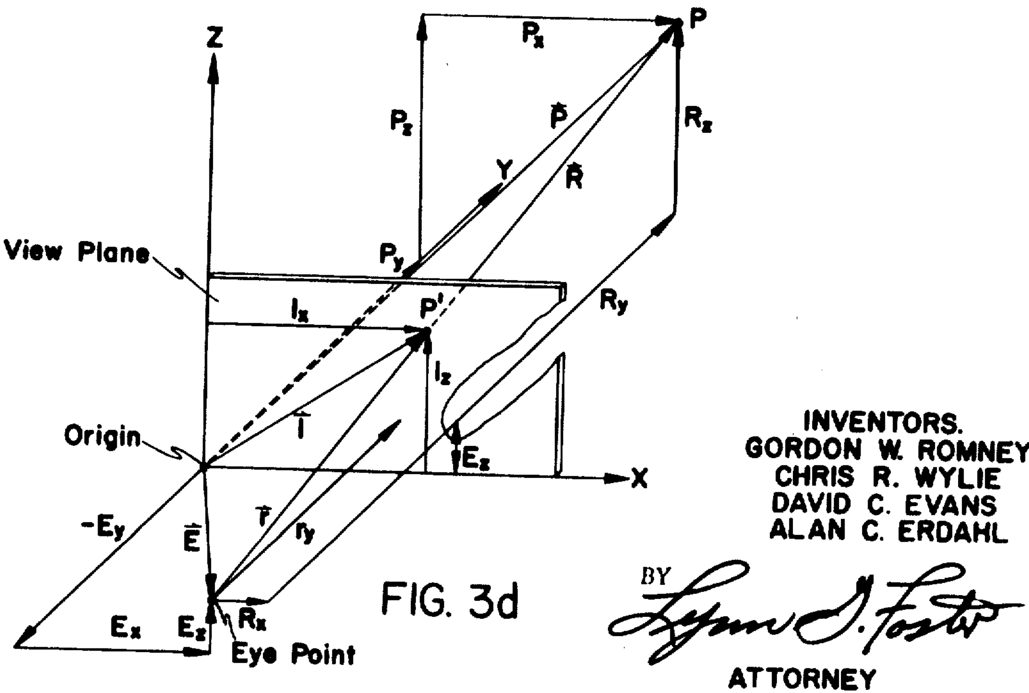

Each of the vectors $\vec{P}$, $\vec{R}$, $\vec{I}$, $\vec{r}$ and $\vec{E}$ may be described by their components along each of the three axes of the coordinate system. This is diagrammatically shown in FIG. 3*d*. For example, the vector $\vec{P}$, extending from the origin to the point P, is made up of components $P_x$, $P_y$ and $P_z$. Likewise, the vector $\vec{I}$, extending from the origin to P', the projection of point P onto the viewplane is made up of components $I_x$ and $I_z$. Since the components are scalars, and since vectors may be arithmetically operated on by operating on each component individually, these components will be utilized in carrying out the novel methods and systems of the present invention.

Next, continuing with the theoretical explanation, the visibility of the projected points to an observer at the eyepoint 14 must be determined. This could be done by direct mathematical means which gives an infinite resolution solution. The present invention determines the solution only at the finite points for which it is required to generate the picture, thus reducing the amount of computation. Computation time is further reduced dramatically by the mechanism of sorting the triangles according to their highest and lowest and their leftmost and rightmost points in the 2-D picture so that only those triangles which actually intersect the ray $\vec{R}$ from the eye through the picture element being calculated are considered by the calculation.

In order to explain the method used to determine visibility, the manner of display must be explained.

The present invention preferably utilizes a raster scan display which uses a plurality of horizontal scan lines which cover the vertical dimension of the display screen. The scan lines may be identified by their value along the Z-axis of a two-dimensional coordinate system and the position of information along each scan line may be identified by its value along the X-axis of the coordinate system at the view plane.

In determining the visibility according to the present invention, sets of signals defining the quantized surfaces are ordered according to their position on the raster scan. That is, the sets of signals are first ordered according to the successive Z-scan line which first enter each quantized surface defined by the sets of signals during the raster scan. Next, signals representative of the location at edges of each quantized surface which is intercepted by a Z-scan line being generated are sequentially ordered, even though some or all of the surfaces are electronically defined in superimposition along theoretical scan rays between the eye point and the object. Thus only signals defining those surfaces which are intercepted by a particular scan line need be checked for the second ordering.

Where only one surface is intersected by a given scan ray of a scan line, it must be visible. Where there is more than one surface so intersected, a decision as to which surface is the visible surface must be made. However, once the edge conditions have been examined and one surface is determined to be visible or in front of all other surfaces intersected by the scan ray, it remains in front of the other surfaces at least until signals representing the next edge condition are encountered.

This procedure may be diagrammatically explained with reference to FIG. 4, realizing that the explanation is again theoretical and that the following tangible geometrical description is illustrative of what takes place electronically.

The two-dimensional projection 22 of cube 10 is shown on the erect viewplane 16. The cube 10 has been quantized into surfaces which, for simplicity, are triangular planes. As projected, these include triangles *a* and *b* which make up the front face; *c* and *d* which make up the right side portion; *e* and *f* which make up the rear face; *g* and *h* which make up the left side portion; *i* and *j*, which make up the bottom face; and *k* and *l* which make up the top.

The cube is scanned along the exemplary scan line Z′. The ordering of the triangles is exemplified by the graphical positions along the scan line Z′, with triangles *a, h, g, b, f, e, c,* and *d* being intercepted at their left edges in that order at intercepts 26, 28, 30, 32, 34, 36, and 38, respectively. Each of these intercepts represents the entering of at least one new triangle along the scan line. Since the triangles do not intersect one another, once one triangle is determined to be nearer to the eyepoint than all others it remains nearer at least until the next edge intercept is reached. Therefore, distance calculations are only performed at X-intercept points.

For example, triangles *a* and *h* project to the same beginning left edge and are entered at a common X intercept point 26 along scan line Z′. Once triangle *a* is determined to be closer to the eyepoint than *h*, no further visibility determinations need to be made until the next entering triangle is reached, namely, triangle *g* at X-intercept 28. A distance or $R_y$ (FIG. 3*b*) calculation will reveal that triangle *a* is still closer and therefore visible, and no further distance calculations need be made until triangle intercept 30 is reached. At intercept 30, triangles *b* and *g* are intersected by the scan ray. Therefore another visibility decision must be made, which determines triangle *b* to be closer. This process repeats at all of the interceptions along each scan line.

To reduce the required computation time and to simplify the computation, the distance calculation is approximated and solved in terms of the image vector $\bar{I}$ of the projected point.

This is done by solving for only the Y-component of the vector $\bar{R}$ which represents the distance from the eyepoint to a point on the object. This is sufficient and completely accurate since visibility depends on the relative positions of the surfaces rather than the absolute distance of each surface from the eyepoint.

Specifically, with respect to triangles, $R'_y$ may be determined by the equation:

$$R'_y = a_1 \cdot I_x + a_2 \cdot I_z + a_3 \qquad (7)$$

where $a_1$, $a_2$, and $a_3$ are constants and are commonly called "distance ratio parameters" and where $R'_y = 1/R_y$.

The constants $a_1$, $a_2$, and $a_3$ are found for each triangle by solving equation (7) for each of the vertices where $R'_y$ is known.

These determinations are nominally repeated at each intercept on each scan line. However, the number of calculations may be substantially reduced by comparing the order of intercepts of a particular scan line with the order of intercepts along the previous scan line. If the surfaces enter in the same order as the previous scan line, then the surface visible at each intercept would be the same as the visible surface at each intercept of the previous scan line. This is because a surface once determined to be visible at a given location with respect to another surface, is always visible over that surface, and therefore no subsequent distance $R_y$ calculations are necessary. This may also be applied to beginning portions of the scan line. No distance calculations are necessary for the beginning portion of a scan line which portion is repetitive of the beginning portion of the previous scan line.

The utilization of this comparison substantially reduces the number of intercepts at which distance calculations must be made. Once the visible surfaces along a scan line are determined, the scan line may be considered to be a series of visible segments 40, 42, 44 and 46 of the respective triangles, with the picture background at 48 also being considered a visible segment, though not part of the object.

The variations of intensity of illumination or apparent brightness of each of these segments must then be determined to generate the shading of the perspective view.

In order to reduce the computation time required, here an approximation is made. First the intensity of the defining points of each surface is determined. This determination may be in accordance with any selected intensity interpolation process. It may also be modified in accordance with predetermined reflectivities of different surfaces.

In addition arbitrary intensities may be designated for selected surfaces as well as arbitrary color selection for use with a color display device.

As an example, where the surfaces are planar, the following or other intensity equation may be used:

$$i = i_0 \frac{\cos^2\theta}{\vec{R}^4} \qquad (8)$$

where $i_o$ is a constant and $\theta$ is the angle between the vector $\bar{R}$ and the normal to the surface of the triangle.

Equation (8) may be used to determine the intensities at the vertices of the triangle.

The intensity level at any point on the triangle may be approximated by the following equation in terms of the projected image vector components: $i = b_1 I_x + b_2 I_y + b_3 \qquad (9)$ where $b_1$, $b_2$, and $b_3$ and constants.

By substituting in the intensities and vector components at each vertex into equation (9) the values of $b_1$, $b_2$, and $b_3$ for a given triangle may be found by Cramer's Rule.

Given an $I_x$ and an $I_z$ for a particular X-begin point, this equation is then solved for each increment $\Delta X$ along the visible segment of a particular triangle using the constants $b_1$, $b_2$, and $b_3$ determined for that triangle. The relative size of $\Delta X$ is determined by the resolution desired or the resolution capable of being produced by the display. The calculated intensity values are then fed to a suitable display where they control the intensity of the display at the corresponding scan position.

By controlling the intensity of the display in this manner, a shaded perspective view of the visible surfaces of the object will be generated. A background may be provided to surround the generated view by controlling the display to produce predetermined constant intensity for all points along each scan line where no visible segment of a surface is present.

Figure 4:
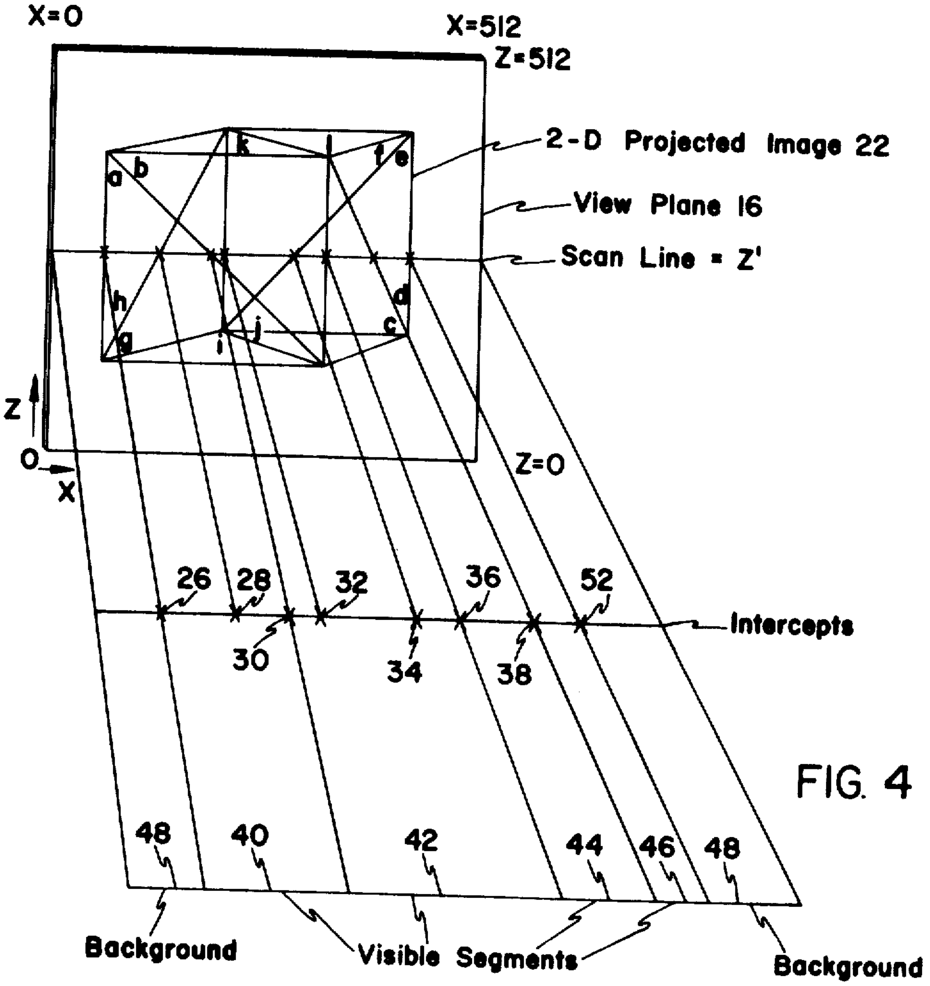
FIG. 4 is a diagrammatic illustration of the scanning and visibility determination techniques of the present invention.

Referring to FIG. 4 a background 48 is generated between the beginning of the scan line Z' to the first intercept 26 and between the exit intercept 52 of the last visible segment 46 and the end of the scan line.

The fundamental concepts of the invention will now be described with reference to the basic block diagram of FIG. 5.

Input data representative of the 3-D object or objects to be displayed as well as the position of the observer or eyepoint is provided by the object creation apparatus 54. By "3-D object" we mean any physical subject matter which does not have a single depth dimension measured along the line of sight of an observer. Thus, a single plane oriented at an angle to the line of sight would be a 3-D object as would two at least partially superimposed planes which are oriented normal to the line of sight. The object creation apparatus 54 may include many different devices as will be described hereinafter. The object creation apparatus 54 allows the operator to supply sets of electrical signals defining a plurality of surfaces representative of the 3-D object to the remaining equipment. In one preferred embodiment these units define triangles by specifying the vertices of each triangle in a three space coordinate system referenced to the specified eyepoint.

The signals representative of the vertices of each triangle are fed to a prescan calculator 56. The calculator 56 transforms the vertices signals into a more easily useable form and electrically calculates surface parameters to be used in subsequent operations. More specifically the prescan calculator 56 first electrically determines the projections of the surfaces defined by the units on the viewplane in accordance with the theory described above with reference to FIGS. 3a and 3b. The prescan calculator 56 also functions to order the signals of a surface-defining unit into a set order of minimum and maximum values to assist in subsequent operations.

The prescan calculator 56 further calculates the distance ratio constants, such as $a_1$, $a_2$, and $a_3$ of each triangular surface in accordance with the method described previously to determine which surfaces are visible. As stated previously, these distance ratio constants are calculated in terms of the values of the projections of the surfaces on the viewplane and the relative depths ($R'_v$'s) of selected points on the surfaces are determined according to a linear approximation. Additionally, the prescan calculator 56 calculates the slopes ($\Delta z/\Delta x$) of the edges of the triangular surfaces.

The signals representing the projected surface-defining surfaces are then fed to a sorter 58 which reorders the signals into sets to conform to the scanning pattern of the display. Specifically, the sorter first arranges signals in the order in which the surfaces defined by the signals would enter in successive scan lines of the display. Signals are also arranged in a separate register in the order in which the surfaces defined by the signals would enter along the scan line, once having been so entered.

The ordered sets of signals produced by the sorter 48 are then fed to the visibility calculator 60. This calculator determines which of the surfaces defined by the arranged sets of signals are visible by comparing the relative depths ($R'_v$) of the surfaces at each X-intercept point where more than two surfaces project onto the viewplane in superposition. This is accomplished by calculating the depths of each surface at a the point in question by utilizing the surface constants, such as $a_1$, $a_2$, and $a_3$ of the triangles involved. This calculation is done in terms of the projected values of the surfaces.

The sets of signals defining surfaces which are determined to be the closest to the eyepoint are stored with the remainder of visible surfaces in a memory. For each of these visible surfaces, intensity interpolation parameters, such as $b_1$, $b_2$, and $b_3$, are calculated in the intensity calculator 62 in accordance with the method described previously. These parameters are then utilized to calculate the intensity of illumination at each X-point of each visible surface along each scan line. Alternatively, the intensity of illumination could be calculated at just the X-begin point and then incrementally changed by a predetermined amount until the surface exits. These intensity calculations are then fed through a digital to analog converter 64 and are supplied to the display device 68. Accordingly, arbitrary intensities of illumination may be selectively fed to the display device 68.

The display device 68 is a cathode-ray tube or the like display on which a raster pattern scan is created. The display 68 may be a conventional oscilloscope requiring a time delay photograph to be taken to reproduce the shaded perspective view in full, or may be a conventional TV-type picture tube requiring the insertion of a buffer 66 to receive intensity signals from the intensity calculator 68 at one speed and supply them to the TV tube via the digital to analog converter 64 at the necessary speed.

DETAILED BLOCK DIAGRAM OF ONE EMBODIMENT

For simplicity, sets of signals may be used which represent planar triangles, the triangles collectively exactly or approximately defining the object to be displayed. This is because a planar surface simplifies the relative distance calculations needed for the visibility determination and three points are the least number of points required to define a plane. In addition, a collection of planar triangles can successfully approximate a curved surface, where the accuracy of the approximation varies with the size of planar triangles used.

Figure 6:
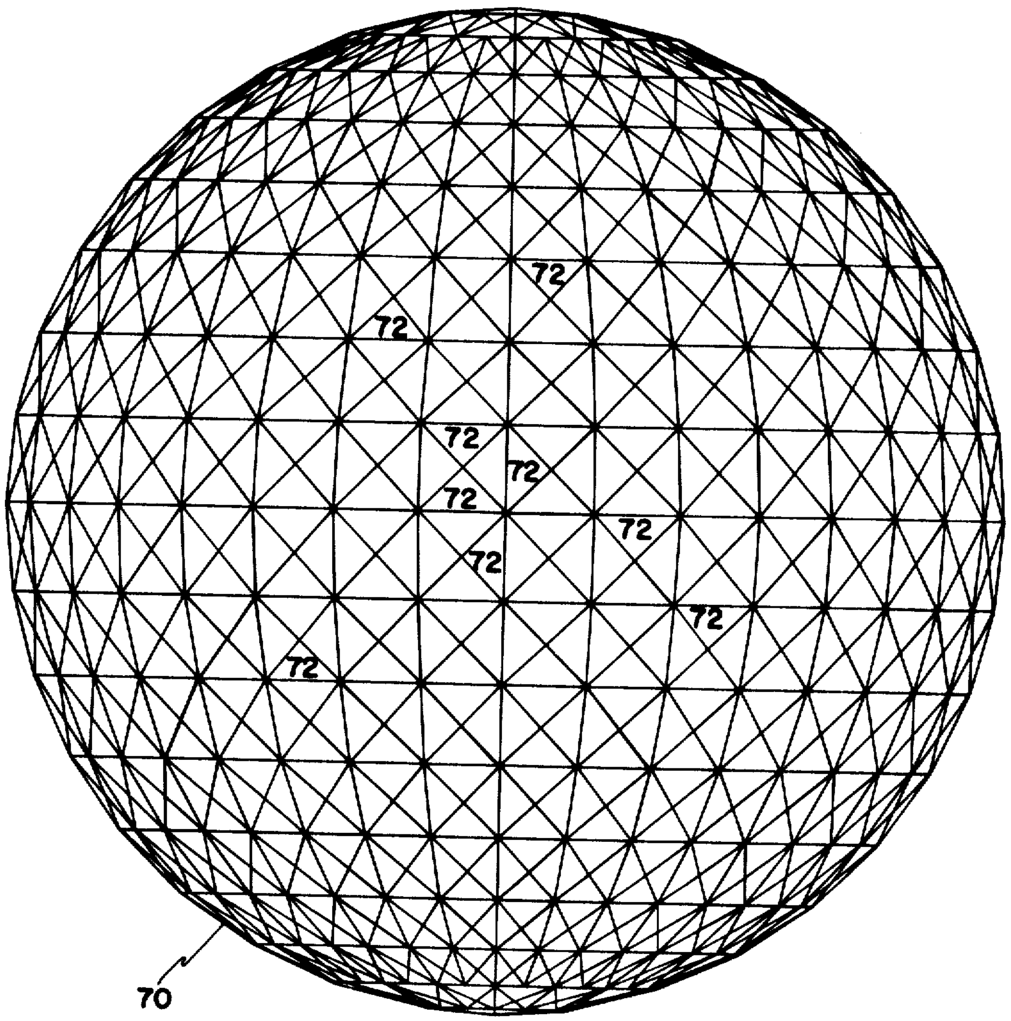
FIG. 6 is an illustration of a sphere quantized into a plurality of triangular surfaces.

Referring to FIG. 6, the surface of a sphere 70 is shown quantized into a plurality of triangles 72. The shaded perspective view of a sphere as reproduced in FIG. 1a was generated from input data which was quantized into units defining triangles in the manner illustrated in FIG. 6. As stated previously, the latitudinal and longitudinal lines are due to the use of a planar triangle approximation, and depend upon the number of triangles into which the surface of the sphere was quantized and the resolution of the display equipment.

Figure 7:
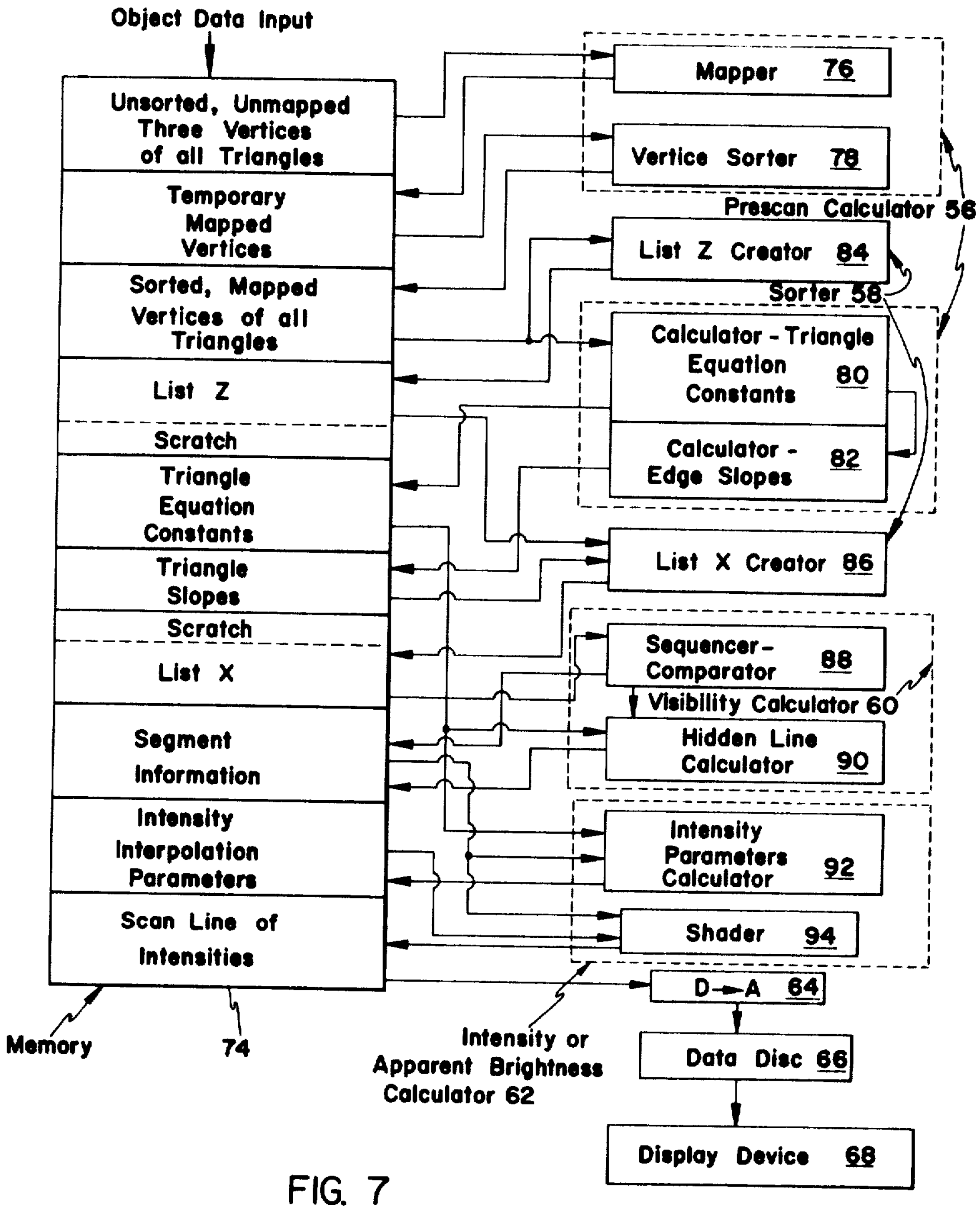
FIG. 7 is a detailed block diagram of one embodiment according to the present invention.

When the surfaces defined are triangles, then the more detailed block diagram of FIG. 7 describes the processing and system utilized to produce a shaded perspective view.

The object creation apparatus 54 (FIG. 5) generates units or sets of electrical signals defining the planar triangles which represent the object. These units of electrical signals are digital signals identifying each triangle and defining the three vertices of each triangle by their position in the chosen three dimensional coordinate system. The object creation also specifies the viewer's vantage point or eyepoint by the coordinates of its position in the chosen three dimensional coordinate system. These digital signals are stored in a conventional memory 74.

The prescan calculator 56 then begins its operations on these signals. The prescan calculator includes a mapper 76, a vertice sorter 78, a triangle equation constants calculator 80 and an edge slope calculator 82.

First the sets of signals three-dimensionally defining each planar triangle and the vertices thereof along with the signals specifying the eyepoint are fed to the mapper 76. The mapper 76 calculates values representative of the projections of the triangles defined by these units of signals onto the viewplane. The mapper also calculates the distance ($R_v$) along the Y-axis of each vertex of each triangle from the eyepoint. "Mapped" signals representing the results of these calculations are then stored temporarily in memory 74.

To facilitate further processing of the sets of signals defining the projected triangles, these sets of signals are next fed to the vertices sorter 78. The vertices sorter 78 reorders the sets of signals defining the vertices of the projected triangle according to the components of each vertex along the Z-axis.

More specifically the signals defining the vertices of each triangle are reordered so that the vertex having the maximum Z-component of that triangle is specified first and the vertex having the minimum Z-component of that triangle is specified last. These reordered units of electrical digital signals are then stored the memory 74.

The reordered units of electrical signals defining the sorted and mapped vertices of all triangles are thereafter fed from the memory 74 to the triangle equation constants calculator 80.

The triangle constants calculator 80 functions to calculate the distance ratio parameters $a_1$, $a_2$ and $a_3$ for each triangle so that $R'_y$, the inverse of the Y-component of the distance from any point on each triangle to the eyepoint may be expressed by the equation:

$$R'_y=a_1I_x+a_2I_y+a_3 \quad (7)$$

These constants $a_1$, $a_2$ and $a_3$ are stored in the memory 74 for subsequent use.

The signals defining the mapped components of the vertices of each triangle are also fed to the edge slopes calculator 82. This calculator 82 determines the slopes ($\Delta z/\Delta x$) of each edge of each triangle since these slopes must be known to determine the beginning and exiting point of a triangle along a given scan line. The slopes thus calculated are stored in the memory 74 for future use.

After the edge slopes are calculated or simultaneously therewith the sets of signals defining each triangle are fed from the memory 74 to the sorter 58.

The sorter 58 includes a List Z creator 84 and a List X creator 86. The mapped, reordered units of electrical signals are fed from the memory 74 to the List Z creator 84. This transfer is actually accomplished prior to or simultaneously with the mentioned transfer to the triangle equation constants calculator 84. The List Z creator 84 creates a list of the triangles in the order in which they enter at successive scan lines conforming to the scan of the display. This is accomplished by utilizing a portion of the List Z memory identified as Scratch as will be described hereinafter. This list is then stored in the memory 74. The edge slopes (obtained from 82) and the list of triangles created by the List Z creator 84 are supplied to the List X creator 86 from the memory 74. The List X creator 86 then successively creates lists (one per each scan line) of the triangles in the order in which they enter along each scan line. In creating these successive lists only those triangles intercepted by a particular scan line as determined by the list created by the List Z creator 80 are considered. The List X creator also utilizes a portion of memory 74 identified as Scratch as will be described hereinafter.

These successive lists created by the List X creator 86 are transferred through the memory 74 to the visibility calculator 60 to determine which triangles are visible. The visibility calculator 60 includes a sequencer-comparator 88 and a hidden line calculator 90. Each of the successive lists created by the List X creator 86 are transferred through the memory 74 to the sequencer-comparator 88, where the order of triangles in the list of the current scan line are compared to the list of the previous scan line.

If they are the same in accordance with the previous discussions with reference to FIG. 4, the same triangles are visible and no visibility determinations are necessary. The visible triangles are then stored in the memory 74.

If the orders are not the same, the current list is fed to the hidden line calculator 90. The hidden line calculator 90 retrieves the triangle constants $a_1$, $a_2$ and $a_3$ from the memory 74 for each of the triangles in the list, and calculates $R'_y$ according to equation (7) for each triangle. The value of $R'_y$ of partially or completely superimposed triangles are compared to determine which triangle is closest to the eyepoint and the signals representing the closest triangle are stored in the memory 74. When the current list begins in the same order as the previous list, no visibility determinations are necessary until the first difference between the orders occurs. The comparator stores signals representing the visible triangles directly in the memory 74 for that portion of the list which remains the same as the previous list.

The intensity calculator 62 then calculates the relative intensities of illumination of the visible triangles stored in the memory 74. The intensity calculator includes an intensity parameters calculator 92 and a shader 94. The intensity parameters calculator 92 receives the signals representing characteristics of the mapped visible triangles from the memory 74 and calculates $b_1$, $b_2$ and $b_3$. The signals representing $b_1$, $b_2$ and $b_3$ are then stored in the memory 74 for subsequent transfer to the shader 94.

The signals representing characteristics of the visible triangles are also fed to the shader 99 from the memory 74 along with triangle intensity constants. The shader then calculates the intensity of illumination of the X-points of each triangle along the scan line. Alternatively the shader may calculate the intensity of the X-begin point and then incrementally change the intensity of illumination for each increment of the triangle along the scan line until the triangle exits. Signals representing these intensity or brightness values of illumination are stored in the memory 74 for transfer to the D-A converter 64 which converts the signals into analog form and supplies them to the display 68. As discussed previously with reference to FIG. 5, a buffer such as a data disc 66 may be included as required by the display device 68.

Preferably the intensity of the scanning beam of the display device 68 is varied in accordance with these signals to display a shaded perspective view of the object.

The memory 74 may either by a single unit separated into sections as indicated in FIG. 7 for storing the various signals described above, or may be a plurality of separate units. Additionally due to the sequential nature of the apparatus and the similarity of several of the signals to be stored the same memory space of a single unit or the same separate unit may be used to store different signals at different times. For example, the sorted mapped vertices of all triangles, the triangle equation constants and the intensity interpolator parameters all require the storage of three lines of information for each vertex of each triangle. Since each of the signals of these operations is no longer needed once the following set of signals is determined, these signals could replace each other in the same memory space or memory unit. Additionally, a single memory space may be utilized for the scratch portions of the List Z and List X memory spaces.

The individual units discussed hereinabove will now be described in detail.

OBJECT CREATION APPARATUS

As described previously, the object creation apparatus 54 (FIG. 5) is illustrative of the means by which data representative of the object to be displayed is fed to the memory 74 (FIG. 7), the data being quantized into units or sets of electrical signals with each set defining a surface portion of the object.

Figures 5, 8:
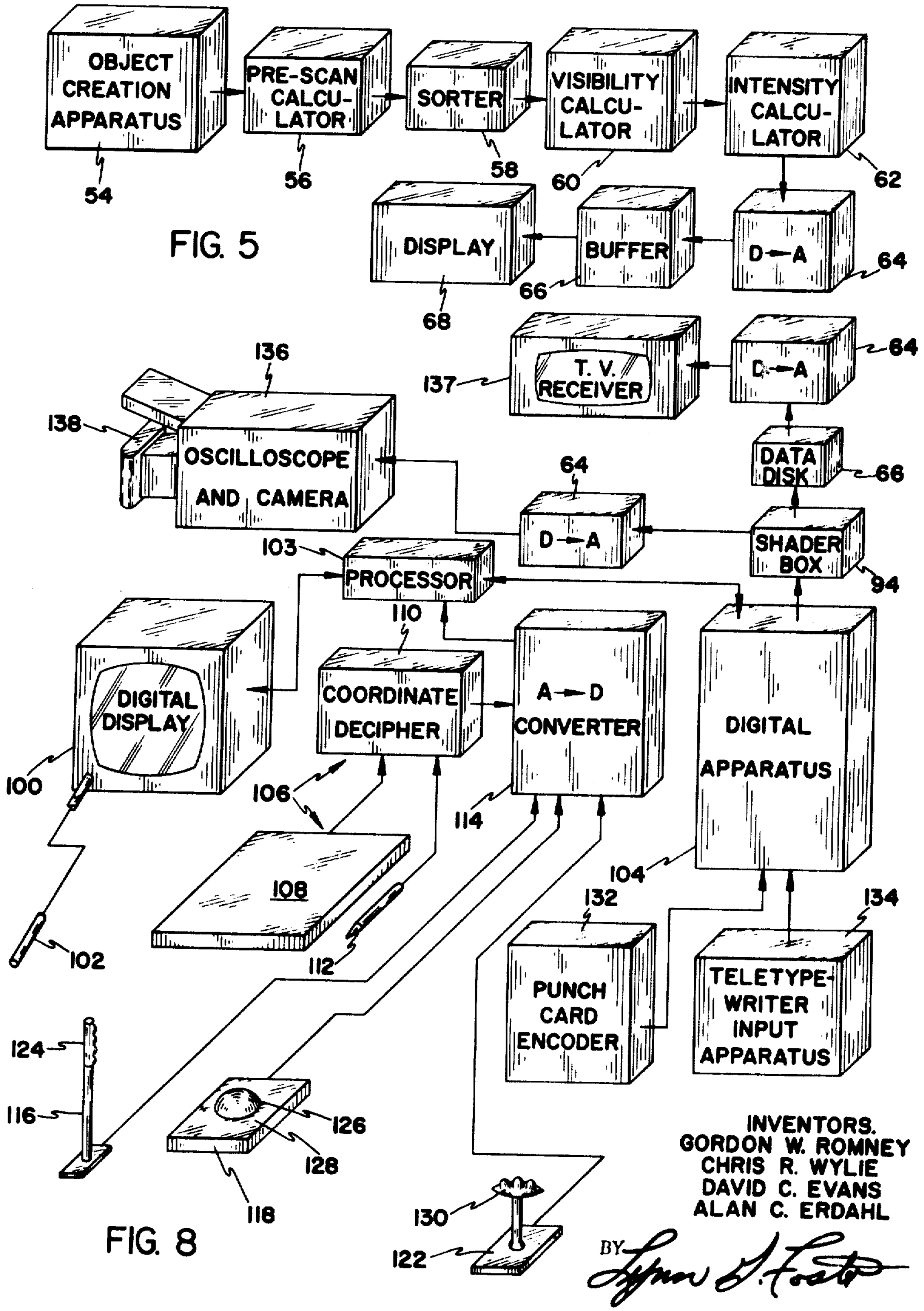
FIG. 5 is a block diagram of an embodiment of the present invention.
FIG. 8 (sheet 5) is an illustration of the object creation apparatus and display equipment utilized with the present invention.

Referring to FIG. 8, the object creation apparatus may include any or all of a plurality of devices. First input data may be provided by means of a CRT display 100 having an optical pen 102 which may be a type No. CM 10093 available from Information Displays, Inc., Mount Vernon, N.Y.

The optical pen 102 is used to call up any one or more of various predescribed objects from a processor 103 which includes a memory and may be a model PDP-8 available from Digital Equipment Corporation, Maynard, Mass. These objects may be added to each other in any desired manner and may be translated, rotated, duplicated, enlarged or reduced either as a whole or relative to each other, by means of "operators" activated by the optical pen 102. By these manipulations the desired object is created and is displayed as a simple line drawing perspective on the display. The descriptions of the objects, which are stored as units of electrical signals describing surface areas of the objects, are then fed to the digital apparatus 104 where they are stored in the memory 74. The digital apparatus 104 is utilized for convenience of illustration to depict the prescan calculator 56, sorter 58, visibility calculator 60, intensity calculator 62, and memory 74.

Alternatively, input data representative of the object may be provided by means of an electronic tablet 106.

The electronic tablet 106 includes a tablet 108, a coordinate decipher 110 and an electronic pen 112. The electronic pen 112 is utilized in a manner similar to the use of the optical pen 102 to call up various predescribed objects from the memory of processor 103. The position of the pen 112 relative to the tablet 108 is sensed to cause the coordinate decipher 110 to provide analog output signals to A-D converter 114 which converts the signals to digital signals and feeds them to the processor 104. The objects thus called may be displayed on the digital display 100. In addition the electronic tablet 106 may be actuated to rotate, translate, duplicate, enlarge or reduce the objects as desired. The electronic tablet 106 may be a Sylvania Data Tablet model DT1 available from Sylvania Electronic System of Waltham, Mass. The A→D converter 114 may be a 10 bit model A801 available from Digital Equipment Corporation of Maynard, Mass.

The input data called by Display 100 or by the electronic tablet 106 may also be selectively rotated and/or translated by means of either a joy stick 116, a socket ball 118, or a pressure handle 122. All of these devices are analog transducers which convert the physical movement applied thereto into analog electrical signals which are fed to the A→D converter 114. The joy stick 116, which may be a model 437 available from Measurement Systems, Inc. of Norwalk, Conn. is actuated by movement of the handle 124 to selectively translate the object. The socketed ball which may be the type available from Romney Engineering and Manufacturing Company of Salt Lake City, Utah, is actuated by rotation of the ball 126 in the socket 128 to rotate the objects. The pressure handle 122 which may be a model 327 available from Measurement Systems, Inc. is actuated by grasping the handle 130 and varying the tightness of one's grip. This pressure handle 122 is extremely sensitive thereby giving a very fine control over the object movement which it actuates.

Input data may also be supplied to the computing apparatus 104 in digital form by a punch card encoder 132 or by teletypewriter input apparatus 134 in ways which are well known. In this manner, the input data representative of the object has already been quantized into units defining surfaces of the object. The punch card encoder 132 may be a model 1004 available from the Univac division of Sperry Rand. The Teletypewriter 134 may be a model 35C available from Teletype Corporation, Skokie, Ill.

DISPLAY EQUIPMENT

With further reference to FIG. 8, the display equipment may be either a conventional Oscilloscope 136, requiring a time delay photograph to be taken to produce the shaded perspective picture, or a conventional raster scan TV receiver 137. The oscilloscope 136 may be a type CO8–1205A available from Hewlett Packard Co. The time delay photograph can be produced by using an oscilloscope camera 138, which may be a model C–12 with a series 125–F1.9–1:09 lens available from Tektronix, Inc. of Portland, Ore., in conjunction with a Polaroid Land Film Holder No. 500 available from Polaroid Corporation of Cambridge, Mass.

When using the oscilloscope, intensity of illumination signals are fed from the shader 94 through a conventional D→A converter 64 to the oscilloscope 136. The TV receiver 137 may be any commercial brand appropriately modified. When using the TV receiver, a buffer such as a data disc 66 must be used to provide the intensity of illumination signals to the receiver at the required rate.

THE MAPPER

As described previously, the mapper 76 calculates the projections of the vertices of each triangle on the two-dimensional viewplane. This is accomplished serially by calculating the projection of each vertex of each triangle in the order in which they are stored in the memory 74. The mapper will now be described with reference to FIGS. 9 and 10.

Figure 9:
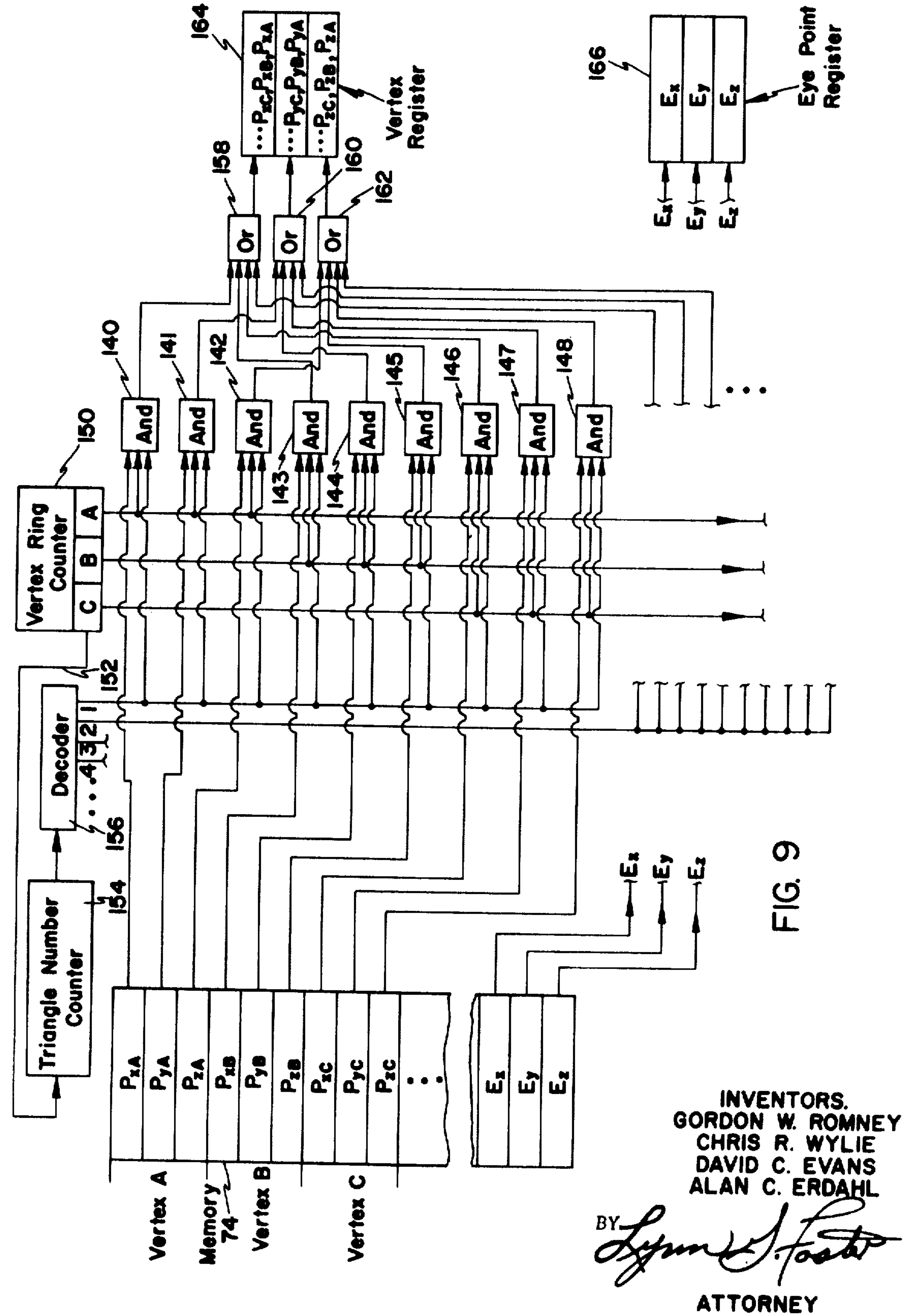
FIG. 9 is a schematic diagram of a transfer circuit.

Referring to FIG. 9, the electrical signals representative of the vertices of the triangles are stored in the memory 74. The coordinates of each of the vertices are defined by the letter P with a first subscript indicating the component along a particular axis and a second subscript indicating the vertex. For example $P_{xA}$ indicates the X-component of the vertex A of the triangle. Likewise, $P_{yA}$ indicated the Y-component of the vertex A of the triangle and $P_{zA}$ indicates the Z component of the vertex A of the triangle. Each triangle has three vertices A, B and C as generated by the object creation apparatus 54. Each of these components is stored in order in a portion of the memory 74 and are each connected to one input of AND-gates 140 through 148, respectively. It should be understood that the component values as stored are represented by a plurality of digital bits and that the AND gate to which the component value is connected actually represents a plurality of AND gates, one for each bit. In order to simplify the description only a single signal and a single AND gate for each component value will be shown.

A ring counter 150 is connected to a second input of each of the AND-gates 140 through 148. The ring counter 150 counts to three and includes three separate outputs labeled A, B and C to signify the particular vertex of the triangle which they control. These outputs are connected to a second input of each of the AND-gates 140 through 148. More specifically, the "A" output of the ring counter 150 is connected to the second input of each of the AND-gates 140, 141, and 142. The "B" output of the ring counter 150 is connected to the second input of each of the AND-gates 143, 144 and 145 and the "C" output is connected to the second input of each of the AND-gates 146, 147 and 148.

The ring counter 150 includes a fourth output 152 which is connected to a triangle number counter 154. The triangle number counter 154 keeps track of which triangle vertices are being transferred and supplies an output to a decoder 156 which includes a plurality of outputs labeled 1, 2, 3, 4, etc. to signify the triangle which they control. The "1" output of the decoder 156 is connected to a third input of each of the AND-gates 140 through 148. Additional outputs "2," "3,""4," etc. will be connected to the third input of AND gates similar to 140 through 148 which are provided for the vertex components of the remainder of triangles. These AND gates and the inputs thereto are not shown as they are the same as that shown for the first triangle.

The outputs of the AND-gates 140, 143 and 146 are each supplied to an input of an OR-gate 158. Likewise, the outputs of the AND-gates 141, 144, and 147 are supplied to an OR-gate 160 and the outputs of the AND-gates 142, 145 and 148 are supplied to an OR-gate 162. The outputs of the OR-gates 158, 160 and 162 are each connected to one line of a vertex register 164. The vertex register 164 includes three lines for storing the X-component, the Y-component and the Z-component respectively of all the vertices of a single triangle at any point in time.

The components of the eye point stored in the memory 74 are designated *Ex*, *Ey* and *Ez* and are fed directly in parallel to the eye point register 166 where they are stored respectively in the three lines thereof.

In the operation of the circuit shown in FIG. 9 the decoder provides a signal on that line which represents the triangle now being transferred. For example, since we are now transferring triangle 1, a signal is supplied on output "1" to each of the AND-gates 140 through 148 to provide one of the enabling signals thereto. The ring counter 150 supplies the other enabling signal to selected ones of the AND gates according to which of the three outputs A, B or C are actuated. Output A enables AND-gates 140, 141 and 142 which then pass respectively $P_{xA}$, $P_{yA}$ and $P_{zA}$ through OR-gates 158, 160 and 162, respectively, to the three lines of the vertex register 164. When output B is actuated, AND-gates 143, 144 and 145 are enabled to pass $P_{xB}$, $P_{yB}$ and $P_{zB}$, respectively, to OR-gates 158, 160 and 162, respectively, through to the vertex register 164. AND gates output C enables AND-gates 146, 147 and 148 to pass $P_{xC}$, $P_{yC}$ and $P_{zC}$ through the OR gates to the vertex register 164. Thus, while the "1" output of the decoder 156 is active vertex register 164 is enabled to store each component of each vertex in parallel and each of the three vertices sequentially. This process is repeated for each of the remaining triangles which are connected to similar sets of AND gates enabled by the ring counter and the remaining outputs of the decoder. The outputs of these additional sets of AND gates are similarly fed to the OR gates 158, 160 and 162.

Figure 10:
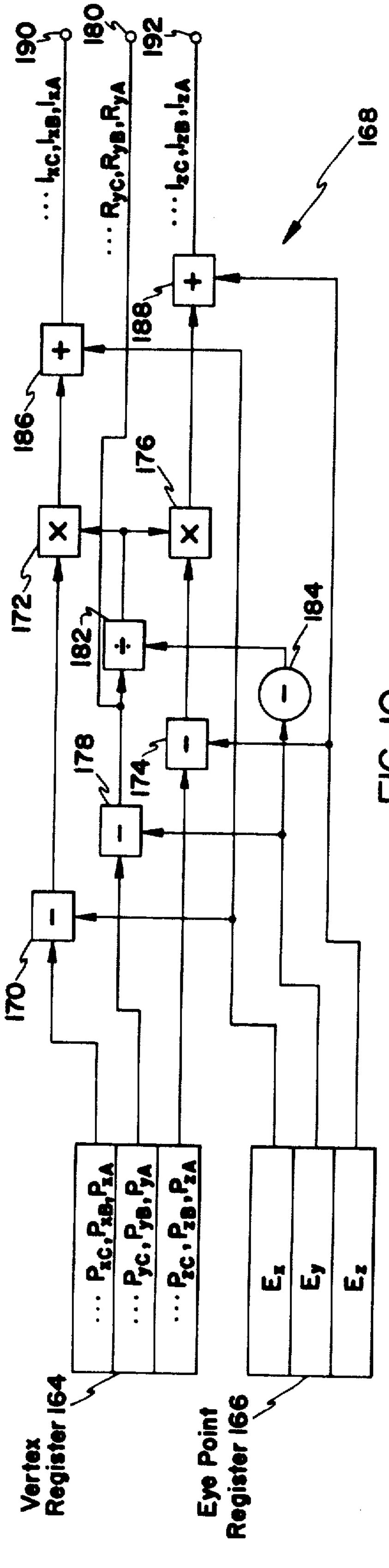
FIG. 10 is a schematic diagram of the mapper.

Referring to FIG. 10, the components of the vertices of each triangle are fed directly through the vertex register 164 to a calculating section 168. In order to simplify the description of this section, the components will be referred to generally as $P_x$, $P_y$ and $P_z$, it being understood that these apply to all of the specific components of the vertices A, B and C of each of the triangles.

$P_x$ is fed to one input of the subtractor 170. $E_x$ is fed to a second input of the subtractor 170 which functions to subtract $E_x$ from $P_x$. The output of the subtractor 170 is connected to a multiplier 172.

$P_z$ is simultaneously fed to a subtractor 174. $E_z$ is also fed to the subtractor 174 where it is subtracted from $P_z$. The output of the subtractor 174 is supplied to a multiplier 176.

Simultaneously, $P_y$ is fed to a subtractor 178 as is $E_y$ which is subtracted therein from $P_y$. Since $E_y$ is a negative value the output of this subtractor 178 is effectively the addition of the absolute values of these two components. The output of subtractor 178 is $R_y$, the Y-component of the distance from the eye point to the vertex being examined. $R_y$ is fed to an output terminal 180 and to one input of a divider 182. $E_y$ is inverted in an inverter 184 to eliminate the negative sign and fed to a second input of the divider 182. The divider 182 divides $E_y$ by $R_y$ and supplies the result thereof to the multipliers 172 and 176. The outputs of these multipliers 172 and 176 are then fed to adders 186 and 188, respectively. $E_x$ is supplied to the adder 186 where it is added to the output of multiplier 172 to produce an output which is representative of $I_x$ at an output terminal 190. $E_z$ is supplied to the adder 188 where it is added to the output of multiplier 176 to produce an output which is representative of $I_z$ at an output terminal 192.

In operation the calculating Section 168 functions to calculate the equation (6).

$$\vec{I}=\vec{E}+(\vec{P}-\vec{E})\left[\frac{-E_y}{R_y-E_y}\right] \qquad (6)$$

It does this by performing equation (6) for each of the components of the vertex and the eyepoint. Subtractor 178 provides the denominator $P_y-E_y$ and supplies it to a divider 182 which divides inverted $E_y$ by this signal. The subtractors 170 and 174 produce the portion of the equation enclosed in the parentheses $(\vec{P}-\vec{E})$ for each component. These signals are then multiplied by the output of the divider 182 to produce the portion of the equation to the right of the plus sign. This is then added to the components of vector $\vec{E}$ in adder 186 and 188 to produce the components of vector $\vec{I}$.

Figure 11:
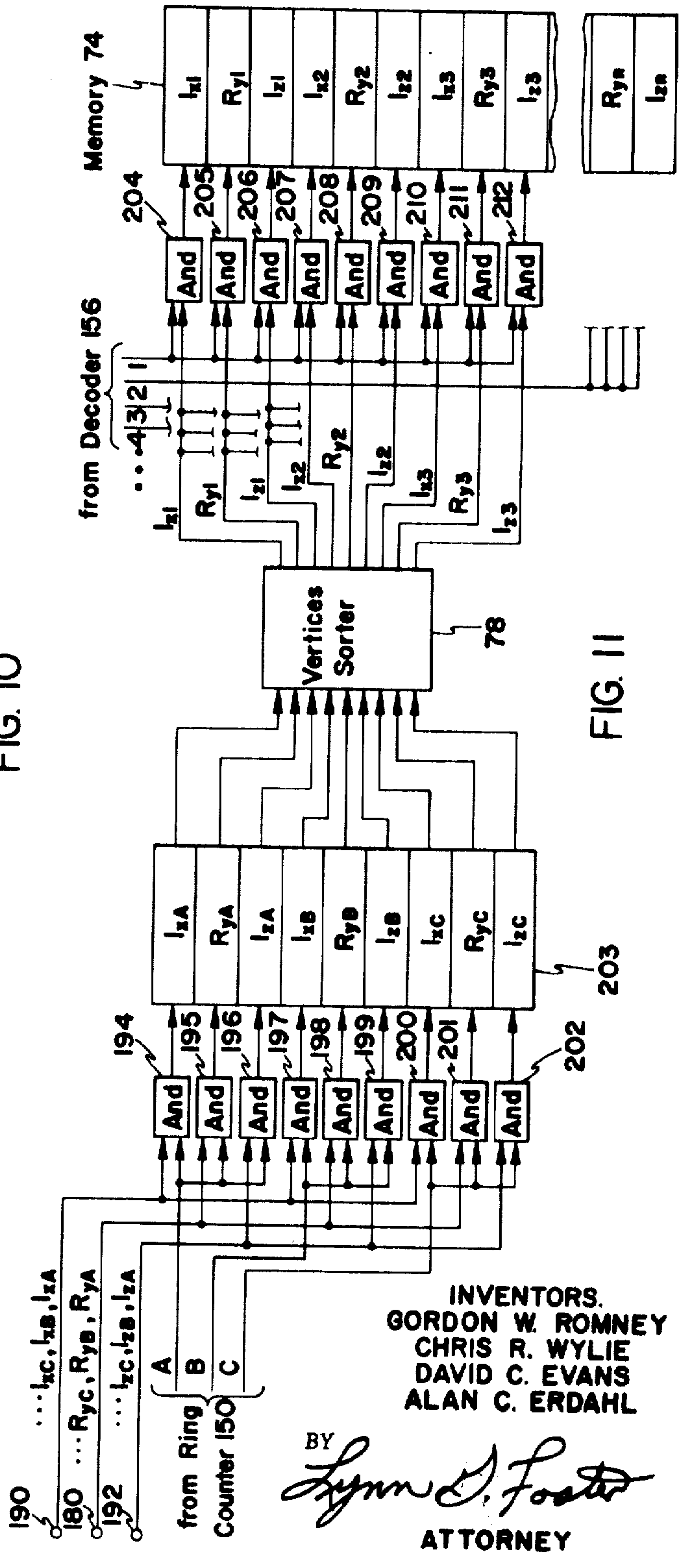
FIG. 11 is a schematic diagram of a transfer circuit.

Referring to FIG. 11 transfer circuits for feeding the $I_x$, $I_z$ and $R_y$ signals from the output terminals 180, 190 and 192 of the calculating Section 168 to the memory 74 and hence to the vertices sorter and back to the memory 74 will now be described. Here again, reference will be made only to the components of the images vector $\vec{I}$ by $I_x$, $R_y$ and $I_z$, it being understood that these represent specific components of each of the vertices of each triangle.

The signals from the output terminals 180, 190 and 192 are selectively fed to one input of a plurality of AND-gates 194 to 202. Specifically, $I_x$ is supplied from output terminal 190 to one input of each of the AND-gates 194, 197 and 200. $R_y$ is supplied from output terminal 180 to one input of each of the AND-gates 195, 198 and 201 and $I_z$ is supplied to one input of each of the AND-gates 196, 199 and 202. Outputs A, B and C from the ring counter 150 are supplied to a second input of each of the AND-gates 194 through 202. Specifically, output A is supplied to AND-gates 194, 195 and 196, output B is supplied to AND-gates 197, 198 and 199 and output C is supplied to AND-gates 200, 201 and 202. The outputs of each of the AND-gates 194 through 202 are connected to successive lines of a temporary register 203. The temporary register 203 is actually the portion of memory 74 as shown in FIG. 7 for storing the mapped vertices of a triangle. Each of the lines of the temporary register 203 are connected to the vertices sorter 78 which will be described in detail hereinafter. The outputs of the vertices sorter 78 which represent the reordered vertices according to the maximum and minimum Z components are then fed to one input of each of a plurality of AND-gates 204 through 212. The outputs from the vertices sorter 78 are also applied to similar sets of AND gates (not shown) which exist for each of the remaining triangles. The outputs from the decoder 156 are also applied to the second input of each of the AND-gates 204 through 212 as well as the remaining sets of AND gates. Specifically, the one output from the decoder 156 is applied to the second input of each of the AND-gates 204 through 212. The remaining outputs from the decoder 156 will be applied sequentially to each successive set of AND gates. The outputs of the AND-gates 204 through 212 are connected to successive lines of the memory 74.

In operation the outputs A, B and C of the ring counter 150 selectively enable the AND-gates 194–202 to pass incoming $I_x$, $R_y$ and $I_z$ signals to the proper line of temporary register 203. Specifically, the output A enables AND-gates 194, 195 and 196 to pass $I_{xa}$, $R_{ya}$ and $I_{za}$ to the first three lines of temporary register 203, output B enables AND-gates 197, 198 and 199 to pass $I_{xb}$, $R_{yb}$ and $I_{zb}$ to the next three lines of the temporary register, and output C enables AND-gates 200, 201 and 202 to pass $I_{xc}$, $R_{yc}$ and $I_{zc}$ to the last three lines of the temporary register 203. Signals thus stored in temporary register 203 are fed in parallel to the vertices sorter 78 which reorders the vertices as will be described hereinafter. The outputs of vertices sorter 78 are then selectively passed to the various sets of AND gates similar to 204 through 212 to be loaded in the proper location of memory 74. Specifically, the first signal coming from the vertices sorter 78 are enabled by the output "1" to pass through the AND-gate 204 through 212. Subsequent signals from the vertices sorter will be enabled by successive outputs of the decoder to pass through similar sets of AND gates to their proper location in the memory.

THE VERTICES SORTER

Figure 12:
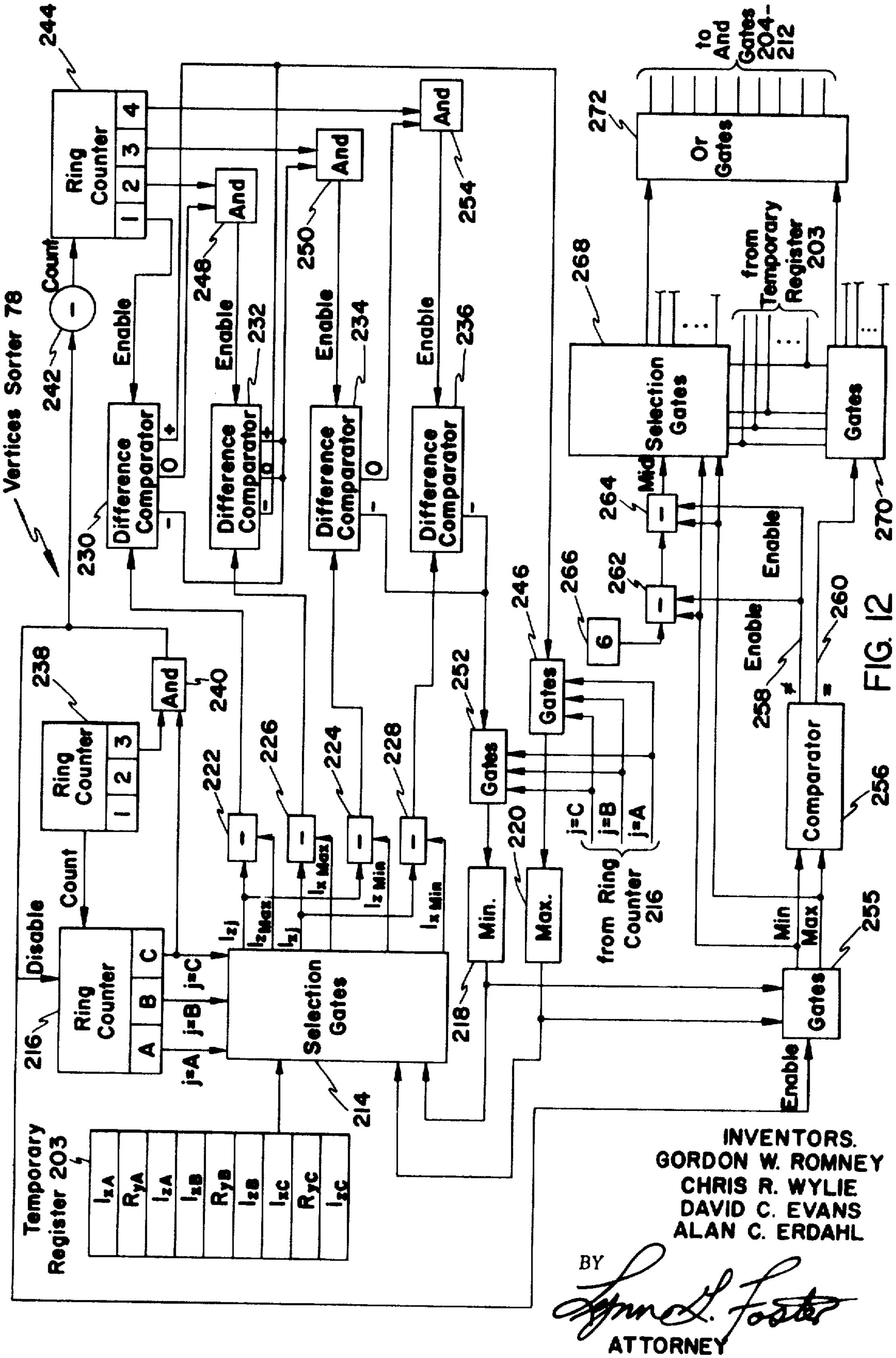
FIG. 12 is a schematic diagram of the vertices sorter.

As described previously the vertices sorter 78 (see FIG. 11), reorders the vertices of a given triangle so that the vertex having the maximum Z-component is specified first and the vertex having the minimum Z-component is specified last. If two vertices have equal Z-components then their corresponding X-components are compared and the one having the minimum X-component is considered to be the maximum vertex. Referring to FIG. 12 a circuit for accomplishing the vertices sort will be described.

The component values stored in the temporary register 203 are supplied in parallel to selection gates 214. Also supplied to selection gates 214 are the outputs $j$=A, B, C from ring counter 216. The outputs of a min register 218 and a max register 220 which are loaded with predetermined values are also supplied to the selection gates 214. The selection gates 214 which will be described in detail hereinafter selects the appropriate component values of the vertices of a triangle indicated by the particular $j$ output of the ring counter 216 and by the values of the min and max registers 218 and 220 respectively. The particular $j$ output selects the $I_x$ and $I_z$ values of the correspondingly labeled vertex. For example the J=A output selects $I_{xa}$ and $I_{za}$. The min and max values also select the Ix and $I_z$ values of correspondingly labeled vertices. For example when Max=C, $I_{xc}$ and $I_{zc}$ are selected and when min=B, $I_{xb}$ and $I_{zb}$ are selected. $I_{zj}$ is supplied from the selection gates 214 to subtractors 222 and 224. $I_{xj}$ is supplied to subtractors 226 and 228. $I_{z\,max}$ is fed to the subtractor 222 where it is subtracted from $I_{zj}$. The output of the subtractor 222 is connected to the difference comparator 230. It is fed to subtractor 226 where it is subtracted from $I_{xj}$. The output of the subtractor 226 is connected to a difference comparator 232. $I_{z\,min}$ is subtracted from $I_{zj}$ in the subtractor 224, the output of which is connected to a difference comparator 234. $I_{x\,min}$ is subtracted from $I_{xj}$ in the subtractor 228 the output of which is fed to a difference comparator 236. The ring counter 216 is controlled from a second ring counter 238 to step through all three outputs ABC for each count of the ring counter 238. The ring counter 238 has an output after the third count which is fed to an ANDagate 240 which also receives the output of the $j$=C count of the ring counter 216. The output of the AND-gate 240 is connected to the ring counter 216 to disable it and through an inverter 242 to a third ring counter 244. The ring counter 244 includes four outputs each one being connected to a different one of the four difference comparators 230–236. Specifically, output one enables the difference comparator 230.

Each of the difference comparators 230–236 includes three outputs, a negative output, a zero output and a positive output. The positive output of the difference comparator 230 is connected to a set of gates 246. The zero output is connected to an AND-gate 248 which also receives the output 2 of the ring counter 244. AND-gate 248 supplies an enabling signal to the difference comparator 232. The negative output of the difference comparator 230 is connected to one input of an AND-gate 250 which also receives the output 3 of the ring counter 244. The AND-gate 250 supplies an enabling signal to the difference comparator 234. The zero and plus outputs of the difference comparator 232 are also connected to the input of the AND-gate 250 which is connected to the negative output of the difference comparator 230. The negative output of the difference comparator 232 is also supplied to the set of gates 246. The difference comparator 234 utilizes only the negative and zero output. The negative output is fed to a set of gates 252. The zero output is fed to one input of an AND-gate 254 which also receives the output 4 of the ring counter 244. The AND-gate 254 enables the difference comparator 236 which includes only the negative output which is also connected to the set of gates 252. Sets of gates 246 and 252 are supplied with the outputs A, B and C of the ring counter 216, and are enabled by signals received from the various difference comparators to pass the presently active output of the ring counter 216 to the min and max registers 218 and 220 respectively. The outputs of the min and max register 218 and 220 are also fed to gates 255. Gates 255 are connected to the output of the AND-gate 240 which supplies an enabling signal allowing the min and max signals to a comparator 256 to which the output of gates 255 is connected. Comparator 256 has two outputs 258 and 260. An output signal on 258 indicated that min and max signals are not equal and an enabling signal is supplied to subtractors 262 and 264. The min signal supplied from the output of the gates 255 to the subtractor 262 where it is subtracted from a value 6 stored in a register 266. The output of the subtractor 262 is connected to the subtractor 264. The max signal is supplied from the output of the gates 255 to the subtractor 264 where it is subtracted from the output of the subtractor 262. The output of the subtractor 264 represents the label of the vertex determined to be the middle one. The min and max signals are also supplied to selection gate 268. Selection gates 268 are similar to the min and max selection portions of the selection gates 214 and will not be shown in detail as their construction is deemed apparent from the foregoing description. The component values stored in the temporary register 203 are also supplied to selection gates 268.

The output 260 indicates that the min and max values are equal which signifies that the vertices as stored originally in the temporary register 203 are in the proper order. This output is connected to a set of gates 270 which are also supplied from the temporary register 203. The outputs of the selection gates 268 AND-gates 270 are connected to OR-gates 272 which then pass the signals to the AND-gates 204–212 of FIG. 11.

In operation selection gates 214 select the appropriate $I_z$'s and $I_x$'s as determined by the active output of the ring counter 216, and the values presently stored in the min and max registers 218 and 220. At the start of the vertices sort of each triangle, the value C is stored in both the min and max registers 218 and 220. These signals are supplied to the subtractors 222–228. The subtractors 222–228 subtract the selected max and min $I_z$ and $I_x$ values from the $I_{xj}$ and $I_{zj}$ values as described above and supply the results of these subtractions to the difference comparators 230–236 which analyze these results. The ring counter 244 sequentially enables the difference comparators 230–236 since the decisions must be made in sequence.

The difference comparator 230 is enabled first, and depending upon what the decision is the remaining comparators are enabled. If $I_{z\ max}$ is less the $I_{zj}$ then the positive output will be energized and gates 246 will replace the max value with the present value and new $I_x$'s and $I_z$'s will be selected. If $I_{zj}$ equals $I_{z\ max}$ then the zero output will be energized and the difference comparator 232 is enabled through the AND-gate 248. Zero output indicates that the two components being examined have the same value. When the two $I_z$ components are equal, in order to determine which vertex is to be considered the maximum, the one having the lowest $I_x$ value is arbitrarily chosen to be the maximum vertex.

Thus if $I_{z\ max}$=$I_{zj}$ the difference comparator 230 has its zero output energized to enable the difference comparator 232 to check $I_{x\ max}$ against $I_{xj}$. If $I_{z\ max}$ is greater than $I_{zj}$ then the negative output of the difference comparator 230 will be energized to enable the difference comparator 234. An output on the negative output of the difference comparator 230 indicates that $I_{z\ max}$ is greater than $I_{zj}$ and therefore the next thing to be determined is whether $I_{zj}$ is less than the selected $I_{z\ min}$.

Referring back to the case where $I_{z\ max}$=$I_{zj}$ the difference comparator 232 then determined the relationship between $I_{xj}$ and $I_{x\ max}$. If $I_{xj}$ is less than $I_{x\ max}$ then there will be an output on the negative output of the difference comparator 232 which is fed to the gates 246 to replace the max value with the present $j$ value. If $I_{xj}$ is either equal to or greater than $I_{x\ max}$ then the relationship of $I_{zj}$ and $I_{z\ min}$ will be examined in the difference comparator 234. If the output of the difference comparator 234 is positive then nothing is done. If the output is negative, it means that $I_{zj}$ is less than the present minimum vertex and therefore the negative output of difference comparator 234 enables gates 252 to store the present value of $j$ as the new minimum vertex in the min register 218. If they are equal, then the relationship between $Ix\ min$ and $I_{xj}$ is checked in the difference comparator 236 which is enabled by the zero output of difference comparator 234. If $I_{xj}$ is equal to or greater than $I_x$ min, nothing is done. If, however, $I_{xj}$ is less than $I_x$ min, it is determined to be the minimum vertex and the negative output enables gates 252 to store the present $j$ value as the new minimum value in the min register 218.

Once the ring counter 216 has called out each of the three vertices A, B, and c three times under the control of the ring counter 238, AND-gate 240 provides an output which disables the ring counters 244 and 216 while enabling the gates 255 to pass the presently stored values of the min and max values from the registers 218 and 220 respectively to a comparator 256. If the min and max values are equal, the vertices as stored in the temporary register 203 were already in the proper order, these signals are then transferred directly through the gates 270 and OR-gates 272 to the AND-gates 204 through 212 of FIG. 11. If, however, the min and max values are not equal, an enabling signal is sent on the output 258 to the subtractors 262 and 264. Subtractors 262 and 264 subtract the min and max values from 6. This produces an output which equals the $j$ term of the middle vertex. This mid vertex value is supplied to the selection gates 268 as is the min and max values wherein the values in the temporary register 203 are selectively gated out in the proper order through the OR-gates 272 to the AND-gates 204–212.

Figure 13:
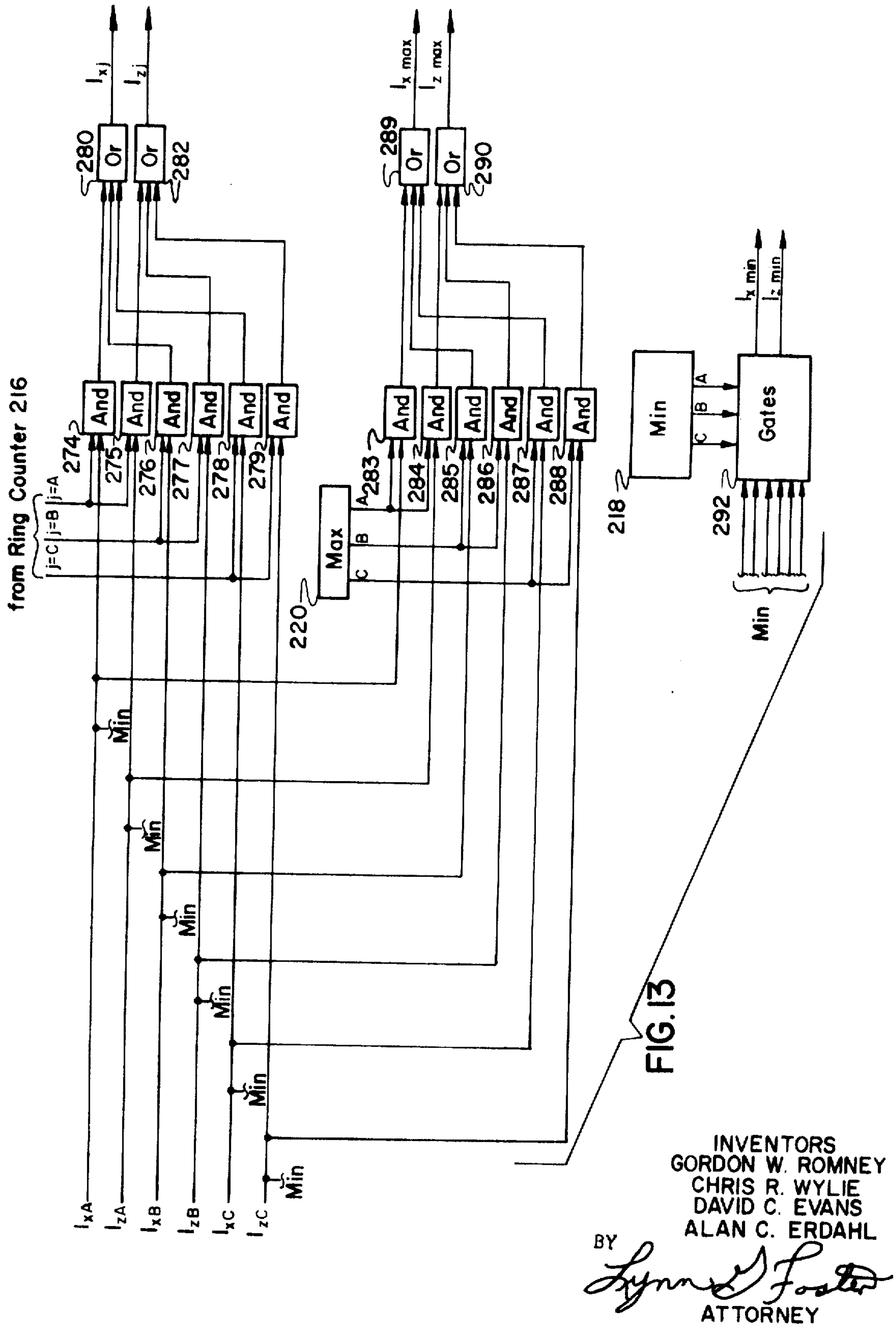
FIG. 13 is a schematic diagram of the selection gates of the vertices sorter of FIG. 12.

Referring to FIG. 13, selection gates 214 will be described in detail. The values of $I_x$ and $I_z$ for each of the vertices are fed from the temporary register 203 to one input of each of a plurality of AND-gates 274–279. Specifically, $I_x$ is supplied to the AND-gate 274, $I_{za}$ is supplied to the AND-gate 275, $I_{xb}$ is supplied to the AND-gate 276, $I_{zb}$ is supplied to the AND-gate 277, $I_{xc}$ is supplied to the AND-gate 278, and $I_{zc}$ is supplied to the AND-gate 279. The outputs A, B and C of the ring counter 216 are selectively applied to a second input of the AND-gates 274–279. Specifically, output A is supplied to the second input of the AND-gates 274 and 275, output B is supplied to the second input of the AND-gates 276 and 277 and output C is supplied to the second input of the AND-gates 278 and 279. The outputs of AND-gates 274, 276, and 278 are supplied to an OR-gate 280 whose output represents $I_{xj}$. The outputs of AND-gates 275, 277 and 279 are supplied to the inputs of an OR-gate 282 whose output is $I_{zj}$.

The signals $I_{xn}$ through $I_{zr}$ are also supplied in the same order to one input of each of the AND-gates 283 through 288 respectively. The max register 220 has three outputs A, B and C which are selectively actuated depending on the value stored therein. These outputs are selectively connected to a second input of each of the AND-gates 283–288. Specifically, output A is connected to the second input of the AND-gates 283 and 284; output B is connected to the second output of the AND-gates 285 and 286; and output C is connected to the second input of the AND-gates 287 and 288. The outputs of AND-gates 283, 285 and 287 are fed to an OR-gate 289. The outputs of the AND-gates 284, 286 and 288 are fed to an OR-gate 290. The output of the OR-gate 289 represents the $I_{x\,max}$-signal and the output of OR-gate 290 represents the $I_{z\,max}$-signal. Similarly, the signals $I_{xn}$ through $I_{zr}$ are also supplied to AND-gates 292 which are also supplied with three outputs A, B, C of the min register 218. These signals are all supplied in the same manner as the gates for obtaining $I_{x\,max}$ and $I_{z\,max}$ and therefore are not shown in detail. The output of gate 292 are the values $I_{x\,min}$ and $I_{z\,min}$.

In operation, the active output of the ring counter 216 selectively enables a pair of the AND-gates 274 through 279 whose outputs are then fed through the OR-gates 280 and 282 to provide the signals $I_{xj}$ and $I_{zj}$. Specifically, if the output $j$=A of the ring counter 216 is energized, then the AND-gates 274 and 275 will be enabled to pass $I_{xn}$ and $I_{zn}$ through the OR-gates 280 and 282, respectively, as the outputs $I_{xj}$ and $I_{zj}$. Similarly, the B output and C outputs control successive pairs of the AND gates to pass through the other vertex component values.

Additionally, the particular value stored in the max register 220 will selectively enable a pair of the AND-gates 283 through 288 to pass a particular $I_x$ and $I_z$ value through the OR-gates 289 and 290 as the $I_{x\,max}$ and $I_{z\,max}$ signals. For example, when max=A the A output is energized and the AND-gates 283 and 284 will be enabled to pass $I_{xn}$ and $I_{zn}$ to the OR-gates 289 and 290 respectively to supply $I_{x\,max}$ and $I_{z\,max}$. Similarly, outputs B and C will enable successive pairs of the AND gates to pass through the different vertex components in the same manner. The gates 292 operate in the same manner as the max gates 283 through 288 to supply signals $I_{x\,min}$ and $I_{z\,min}$ where min equals either A, B or C.

TRIANGLE EQUATION CONSTANTS CALCULATOR

Figure 14A:
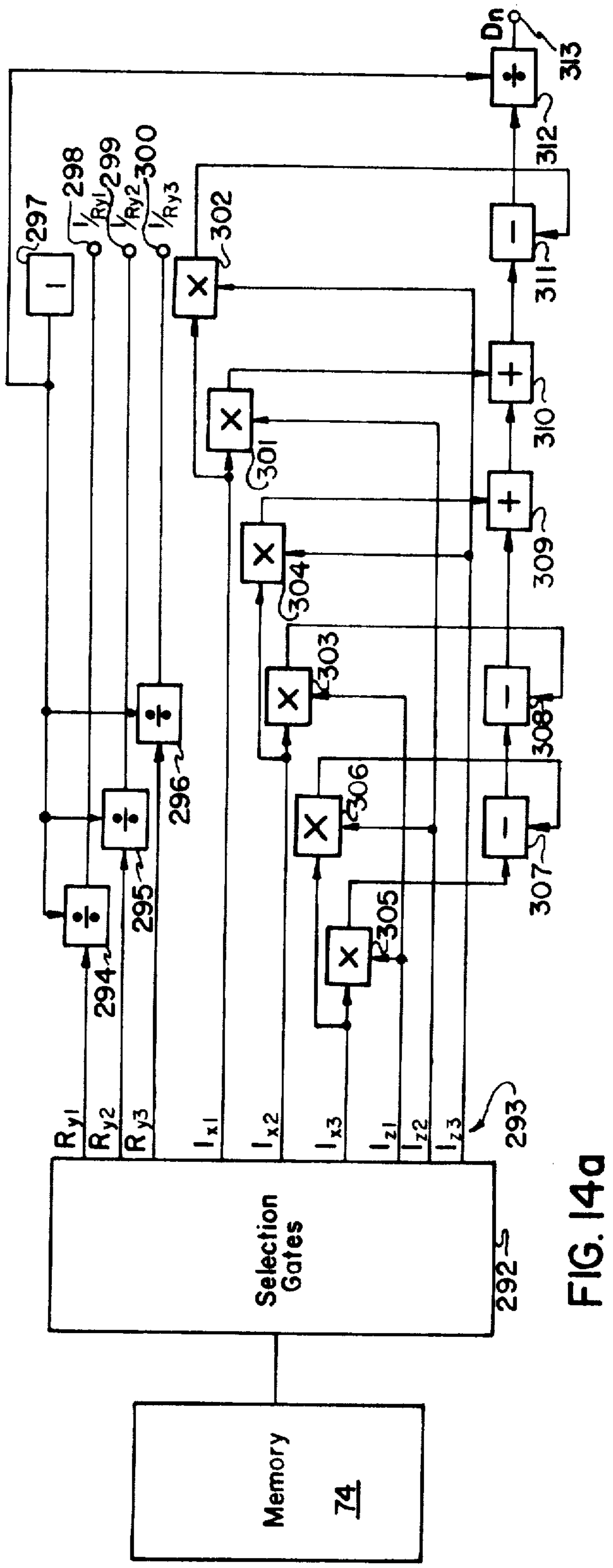
FIGS. 14*a* and 14*b* are schematic diagrams of the triangle equation constants calculator.

The triangle equation constants calculator 80 of FIG. 7 functions to calculate the triangle equation constants $a_1$, $a_2$ and $a_3$. Referring to FIGS. 14*a* and *b*, the circuitry for accomplishing this calculation will be described.

Referring to FIG. 14*a*, component values of the vertices of each triangle are sequentially removed from memory 74 by the selection gates 292. The selection gates 292 are essentially the same as the AND-gates 140 through 148 of FIG. 9, and, therefore, they are not shown in detail. The selection gates 292 provide the component values of each vertex of a single triangle on a plurality of output lines 293. These lines are designated by the component thereon as indicated in FIG. 14*a*. Component values $R_{y1}$, $R_{y2}$ and $R_{y3}$ are fed to dividers 294, 295 and 296, respectively. Also supplied to each of the dividers 294 to 296 is the value "1" from a register 297. The dividers divide "1" from a register 297. The dividers divide "1" a divider the $R_y$ values to produce the inverse of each $R_y$ at output terminals 298, 299 and 300. $I_{x1}$ is fed to multipliers 301 and 302; $I_{x2}$ is fed to multipliers 303 and 304; and $I_{x3}$ is fed to multipliers 305 and 306. $I_{z1}$ is fed to the multipliers 303 and 305; $I_{z2}$ is fed to the multipliers 301 and 306; $I_{z3}$ is fed to the multipliers 302 and 304. The outputs of the multipliers 305 and 306 are connected to a subtractor 307. The output of subtractor 307 is connected to another subtractor 308 which is connected to the output of the multiplier 303. The output of subtractor 308 is connected to an adder 309 which is also connected to the output of the multiplier 304. The output of the adder 309 is connected to another adder 310 which is also connected to the multiplier 301. The output of this adder 310 is connected to a subtractor 311 which is connected to the output of multiplier 302. The output of the subtractor 311 is connected to a divider 312 which is also connected to the output of the register 297 in which the value "1" is stored. A signal DN is supplied from the divider 312 on an output terminal 313.

In operation the selection gates 292 retrieve information of the component values describing a single triangle and supply them to the various arithmetic units to provide the desired outputs. The $R_y$ components are inverted in the dividers 294, 295 and 296 and the inve--es $1/R_{y1}$, $1/R_{y2}$ and $1R_{y3}$ are provided at the output terminals 298, 299 and 300, respectively. The $I_x$ and $I_z$ compone·ts are selectively multiplied by each other and then appropriately subtracted and added to provide an output DN at the output terminal 313.

In essence, the triangle equation constants calculator utilizes Cramc.'s rule to evaluate the constants $a_1$, $a_2$ and $a_3$. The DN is a signal representing the equation:

$$DN=\frac{1}{(I_{x2}I_{z3}-I_{x3}I_{z2}-I_{x1}I_{z3}+I_{x3}I_{z1}+I_{x1}I_{z2}-I_{x2}I_{z1})}$$

Figure 14B:
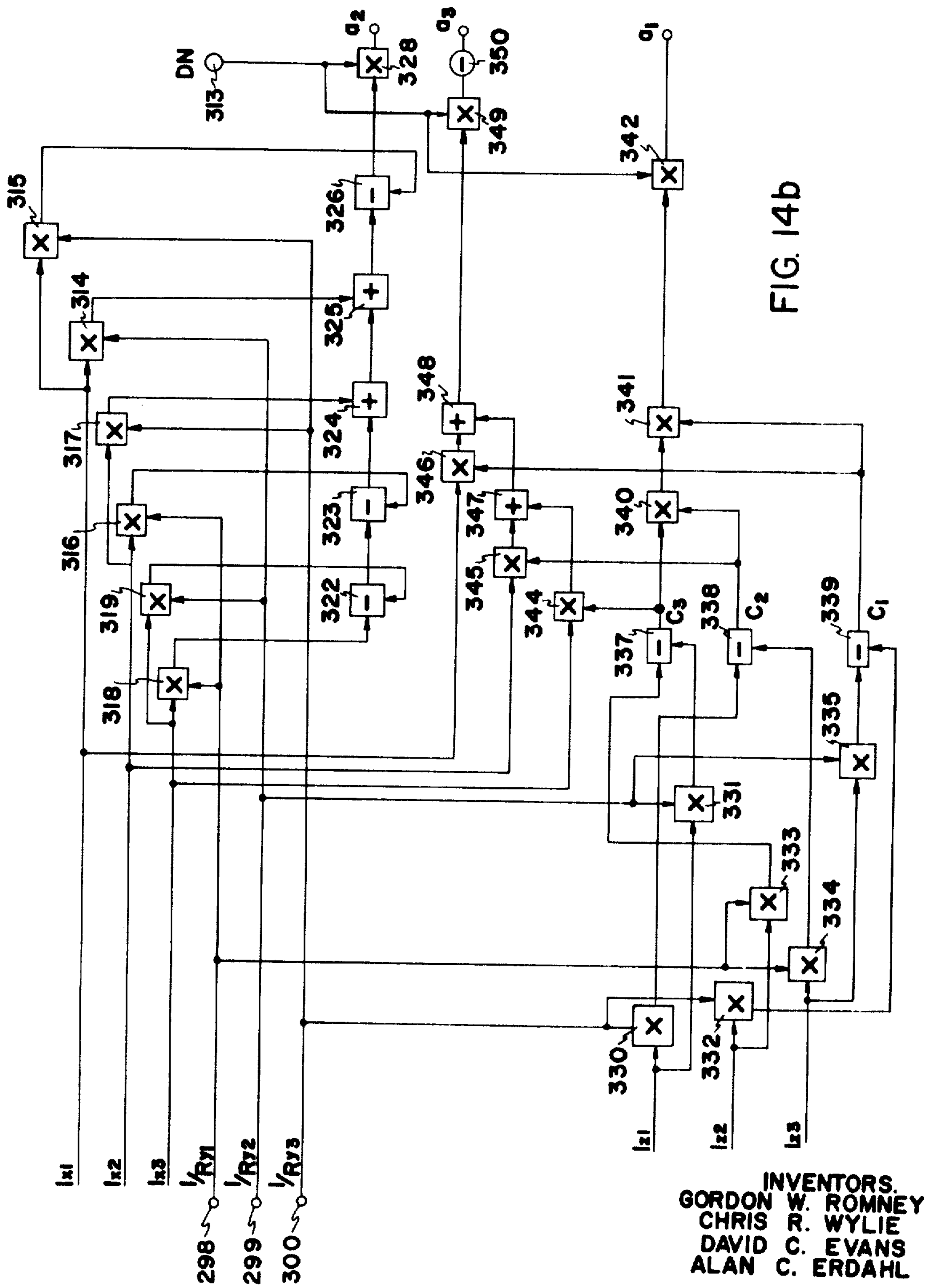

Referring to FIG. 14*b*, the $I_x$ and $I_z$ signals are supplied from the selection gates 292 to the lines as designated in the drawing. The inverted $R_y$ values are also supplied from output terminals 298, 299 and 300. $I_{x1}$ is supplied to the multipliers 314 and 315; $I_{x2}$ is supplied to the multipliers 316 and 317; and $I_{x3}$ is supplied to the multipliers 318 and 319. $1/R_{y1}$ is fed to the multipliers 318 and 316; $1/R_{y2}$ is fed to the multipliers 319 and 314; and $1/R_{y3}$ is fed to the multipliers 317 and 315. The output of the multiplier 318 is connected to a subtractor 322 which is also connected to the output of the multiplier 319. The output of the subtractor 322 is connected to a subtractor 323 which is also connect to the output of the multiplier 316. The output of subtractor 323 is connected to an adder 324 which is also connected to the output of the multiplier 317. The output of the adder 324 is also connected to another adder 325 which is also connected to the output of the multiplier 314. The output of the adder 325 is connected to a subtractor 326 which is also connected to the output of the multiplier 315. The output of subtractor 326 is connected to a multiplier 328 which is also connected to the output terminal 313 on which the signal DN is supplied. The output of the multiplier 328 is a signal representing the triangle constant $a_2$. $I_{z1}$ is supplied to multipliers 330 and 331; $I_{z2}$ is supplied to multipliers 332 and 333; and $I_{z3}$ is supplied to multipliers 334 and 335. Also, $1/R_{y1}$ is supplied to the multipliers 333 and 334; $1/R_{y2}$ is supplied to the multipliers 331 and 335, and $1/R_{y3}$ is supplied to the multipliers 330 and 332. The output of the multiplier 333 is connected to a subtractor 337 which is also connected to the output of the multiplier 331. The multiplier 330 is connected to a subtractor 338 which is also connected to the output of the multiplier 334. The output of the multiplier 335 is connected to a third subtractor 339 which is also connected to the output of the multiplier 332. The outputs of the subtractors 337, 338 and 339 are cofactors $c_3$, $c_2$ and $c_1$, respectively. The output of the subtractors 337 and 338, $c_3$ and $c_2$ respectively, are multiplied together in a multiplier 340. The output of the multiplier 340 is multiplied by the output of the subtractor 339, $c_1$, in a multiplier 341. The output of the multiplier 341 is connected to a multiplier 342 which is also connected to the output terminal 313. The output of this multiplier 342 is a signal representing the constant $a_1$. The output of the subtractor 337, $c_3$, is connected to a multiplier 344 which is also supplied $I_{x3}$. The output of the subtractor 338, $c_2$, is connected to a multiplier 345 which is supplied $I_{x2}$, and the output of the subtractor 339, $c_1$, is connected to a multiplier 346 which is supplied the signal $I_{x1}$. The outputs of the multipliers 345 and 344 are added together in an adder 347 whose output is then added to the output of multiplier 346 in another adder 348. The output of the adder 348 is connected to a multiplier 349 which is also connected to the output terminal 313. The output of the multiplier 349 is a signal representing the constant $a_3$.

In operation, the $I_x$ signals are multiplied by the inverted $R_y$ signals in multipliers 314–319. The outputs of these multipliers are then appropriately added or subtracted to provide an output signal which when multiplied by the signal DN will represent the constant $a_2$. The arithmetic units are arranged to perform the equation:

$$a_2=\left(\frac{I_{x2}}{R_{y3}}-\frac{I_{x3}}{R_{y2}}-\frac{I_{x1}}{R_{y3}}+\frac{I_{x3}}{R_{y1}}+\frac{I_{x1}}{R_{y2}}-\frac{I_{x2}}{R_{y1}}\right)DN$$

The $I_z$ signals are appropriately multiplied by the inverted $R_y$ signals and the outputs of these multiplications are selectively subtracted from each other to provide the cofactors. These arithmetic units are arranged to perform the following three equations:

$$c_1=(I_{z3}/R_{y2})-(I_{z2}/R_{y3})$$
$$c_2=(i_{zl}/R_{y3})-(I_{z3}/R_{y1})$$
$$c_3=(I_{z2}/R_{y1})-(I_{z3}/R_{y2})$$

These cofactors are then multiplied by each other and by DN to provide the constant $a_1$ according to the equation:

$$a_1=DN(c_1 \cdot c_2 \cdot c_3)$$

The cofactors are also multiplied by the $I_x$ signals with the results being added together and multiplied by DN to obtain the constant $a_3$. This is done in accordance with the equation:

$$a_3=DN(c_1 I_{x1}+c_2 I_{x2}+c_3 I_{x3})$$

EDGE SLOPES CALCULATOR

Figure 15:
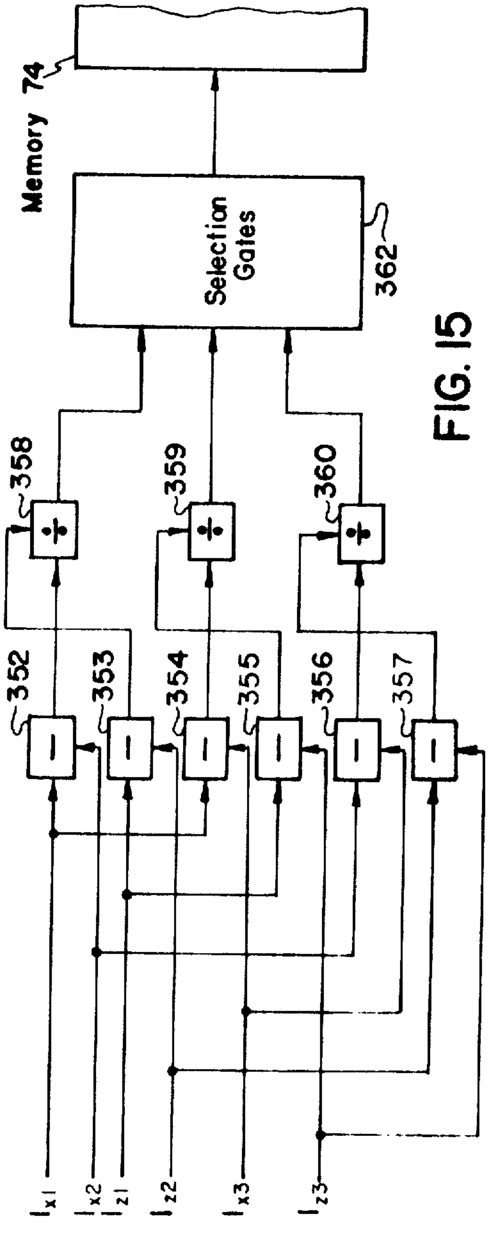
FIG. 15 is a schematic diagram of the edge slopes calculator.

Referring to FIG. 15, the edge slopes calculator which calculates the slopes of each of the sides of the triangles will be described. The $I_x$ and $I_z$ signals are supplied from the selection gates 292 of FIG. 14*a*. $I_{x1}$ is fed to subtractors 352 and 354. $I_{x2}$ is also supplied to the subtractor 352 where it is subtracted from $I_{x1}$, and to a subtractor 356. $I_{x3}$ is supplied to the subtractors 354 and 356 where it is subtracted from $I_{x1}$ and $I_{x2}$, respectively. $I_{z1}$ is fed to subtractors 353 and 355. $I_{z2}$ is fed to the subtractors 353 where it is subtracted from $I_{z1}$ and to the subtractor 357. $I_{z3}$ is supplied to the subtractors 355 and 357 where it is subtracted from $I_{z1}$ and $I_{z2}$, respectively. The outputs of the subtractors 352 and 353 are fed to a divider 358 which divides the output of the subtractor 353 by the output of the subtractor 352. Similarly, a divider 359 is connected to the subtractors 354 and 355 and provides an output representative of the output of the subtractor 355 divided by the output of the subtractor 354, and a divider 360 is connected to the subtractors 356 and 357 and provides an output representative of the output of the subtractor 357 divided by the output of the subtractor 356. The outputs of these dividers are fed to selection gates 362 which store the signals in the appropriate place in memory 74.

In operation, the arithmetic units calculate the slope of each of the sides of the triangle being examined. The subtractors 352, 354 and 356 provide the changes in the X-direction of the different sides while subtractors 353, 355 and 357 provide the changes in the Z-directions of the various sides. The outputs of these signals are then appropriately divided to provide the slopes.

LIST Z AND LIST X CREATORS

Figure 16:
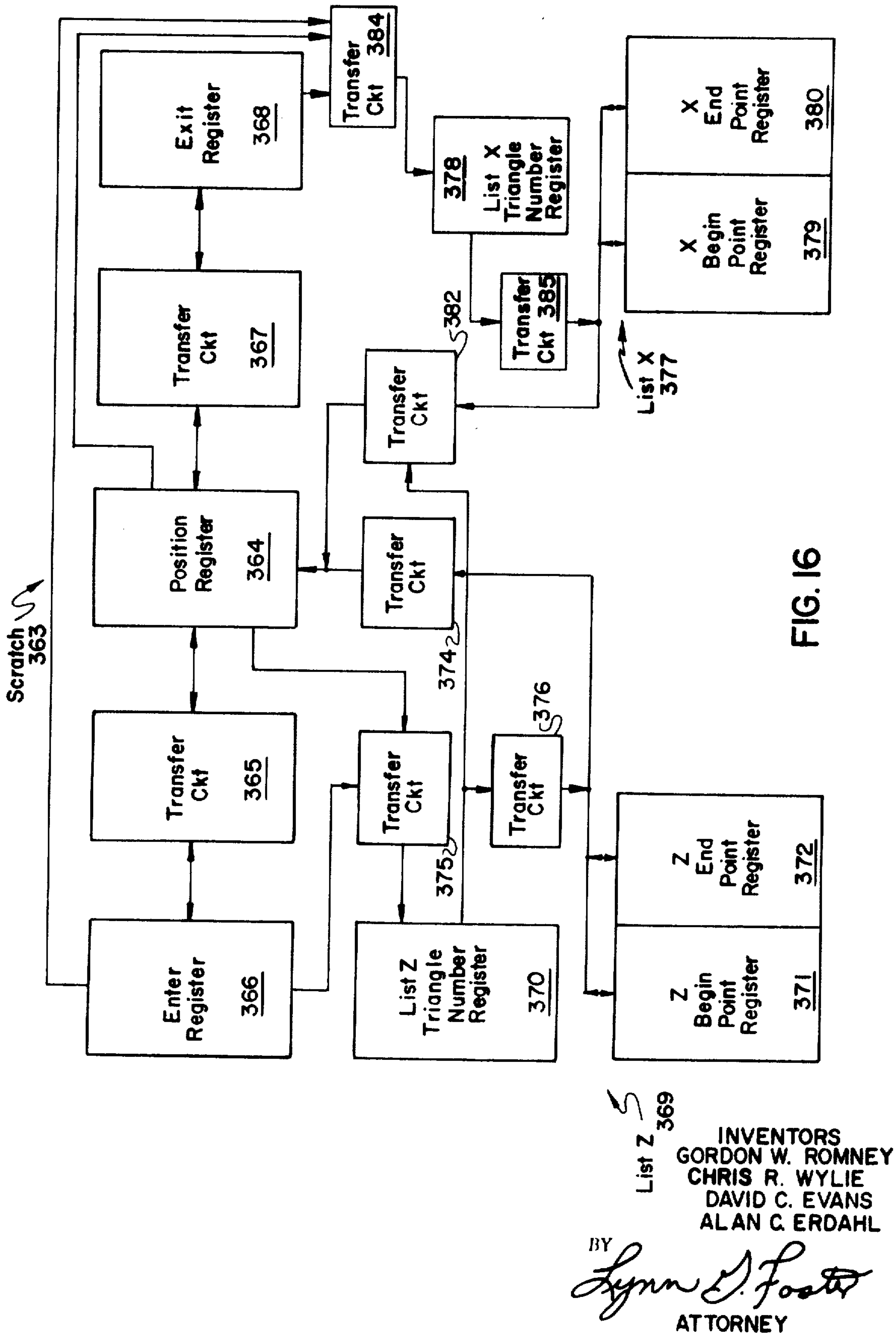
FIG. 16 is a block diagram of the List Z and List X creators.

One of the significant features of the present invention is the ordering of the units of electrical signals defining the triangles in accordance with the scanning pattern of the display. As discussed previously, this is accomplished by first sorting the triangles into the order in which they enter successive scan lines. Next, for each scan line the triangles are sorted into the order in which they enter the scan line. These sorting steps are accomplished by the list Z and list X creators 84 and 86. As mentioned previously, the list Z and X creators each utilize a portion of memory 74 labeled "Scratch" in FIG. 7, and that these portions may in fact be the same. In the detailed description below the list Z and list X creators are shown together and utilize a common Scratch. Referring to FIG. 16 SCratch 363 includes a position register 364, an enter register 366 and an exit register 368. The enter and exit registers 366 and 368 are connected to the position register 364 by transfer circuits 365 and 367 respectively. The registers are conventional storage devices having the required capacity. The transfer circuits are similar to various transfer gates previously described and will be apparent in view of the operation of the Scratch described hereinafter.

The list Z portion 369 of FIG. 16 includes a list Z triangle number register 370, a Z begin point register 371 and a Z end point register 372. The Z begin and end point registers 371 and 372 are connected through a transfer circuit 374 to the position register 364. The list Z triangle number register 370 is connected to outputs of the enter and position registers 366 and 364 through a transfer circuit 375. The list Z triangle number register 370 also includes an output to the Z begin and end point registers 371 and 372 through transfer circuit 376. Here again the registers are conventional storage means and the transfer circuits are similar to previously described transfer means and will be apparent in view of the operation hereinafter described.

The list X portion 377 of FIG. 16 is similar to the list Z portion and includes a list X triangle number register 378, an X begin point register 379, and an X-end point register 380. The x begin and end point registers 379 and 380 are connected through a transfer circuit 382 to the position register 364. The output of the list Z triangle number 370 is also connected to the transfer circuit 382. Outputs from the enter register 366, position register 364 and the exit register 368 are connected through a transfer circuit 384 to the list X triangle number register 378. The list X triangle number register 378 has an output connected to the X begin and end point register 379 and 380 through a transfer circuit 385.

In operation the maximum and minimum Z components of the units defining the triangles are stored in the Z begin and end point registers 371 and 372. The triangle numbers are then sequentially placed in the position register by means of the transfer according to the Z-components stored. Where different triangles begin at the same scan line triangle numbers are also stored in the enter register 366 through the transfer circuit 365. Once all the information is suitably located in the position and enter registers 364 and 366, outputs are taken from the position and enter registers 364 and 366 and placed in the list Z triangle number register 370. The information stored therein may be utilized to point to corresponding information in the begin and end point register 371 and 372 and is also supplied to control the transfer of information for the X begin and end point registers 379 and 380 through the transfer circuit 382 to the position register 364. X-begin and X-end point values are supplied to the X-begin and X-end registers 379 and 380 from the edge slopes previously determined. The information being transferred from the X-begin and -end point register 379 and 380 may be stored in position, enter or exit register 364, 366 and 368. Once completely stored therein the outputs of these registers may be utilized to transfer information into the list X triangle number register 378. The list X triangle number register is utilized to point to corresponding X-begin and X-end point registers 379 and 380 through the transfer circuit 385.

The operation of the List Z and List X creators 84 and 86, respectively, may be diagrammatically explained with reference to FIGS. 17, 18*a–h* and 19*a–i*.

Figure 17:
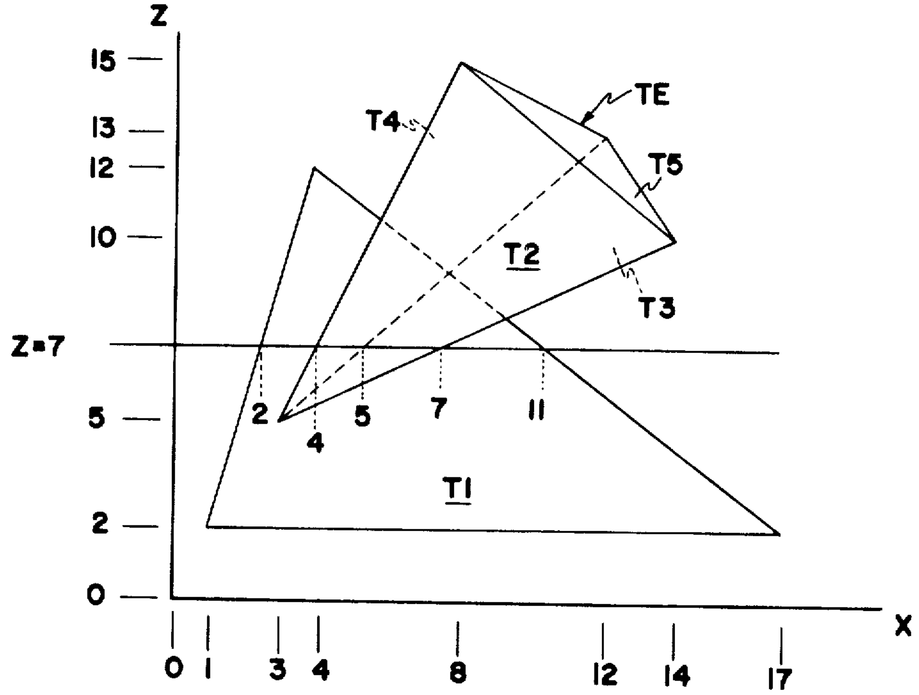
FIG. 17 is a diagrammatic illustration of a scan line intercepting four triangle surfaces of two overlapping objects.

FIG. 17 illustrates a tetrahedron TE in the foreground partially hiding a large triangle $T_1$. They appear as they would be projected onto a viewplane. Both objects are oriented with respect to the X- and Z-axis of the two-dimensional coordinate system of the viewplane. The tetrahedron TE is shown as quantized into four triangles arbitrarily numbered $T_2$, $T_3$, $T_4$ and $T_5$. An exemplary scan line $Z=7$ is shown intercepting triangles $T_1$, $T_2$, $T_4$, $T_3$ and $T_1$ in that order and the X-component of each of the intercepts is designated

LIST Z CREATION

First referring to FIG. 18*a–h* . The List Z creator includes the List Z 369 and the Scratch 363. The List Z 369 may be considered to have three columns, for storing the triangle number, the minimum Z-point and the maximum Z-point. The Scratch 363 also contains three columns labeled enter, exit and X- or Z- position. For the creation of List Z the exit column is not needed.

Initially zeros are stored in all positions of the Scratch.

The minimum and maximum Z points of triangle $T_1$, 2 and 12, respectively, are then stored in the first line of the Begin Point and End point columns of List Z. These two columns will be referred to as the minimum and maximum columns respectively.

The triangles are now examined in the order in which they are numbered to simplify the description. The triangles could be examined in any arbitrary order if desired. When two triangles enter at the same Z-line, the triangle with the lowest number is entered in List Z first for uniformity in approach.

Since triangle number $T_1$ begins at $z=2$, a "1" is placed in the second line of the Z-position column of Scratch. The zero previously there is then placed into the first line of the enter column. The first line is chosen because triangle number "1" is the current triangle being examined. The purpose of the enter column is to allow more than one triangle to enter at a particular Z-value. It is used as a list with the triangle numbers as pointers. This process is illustrated in FIG. 18*a*.

Figures 18A, 18B:
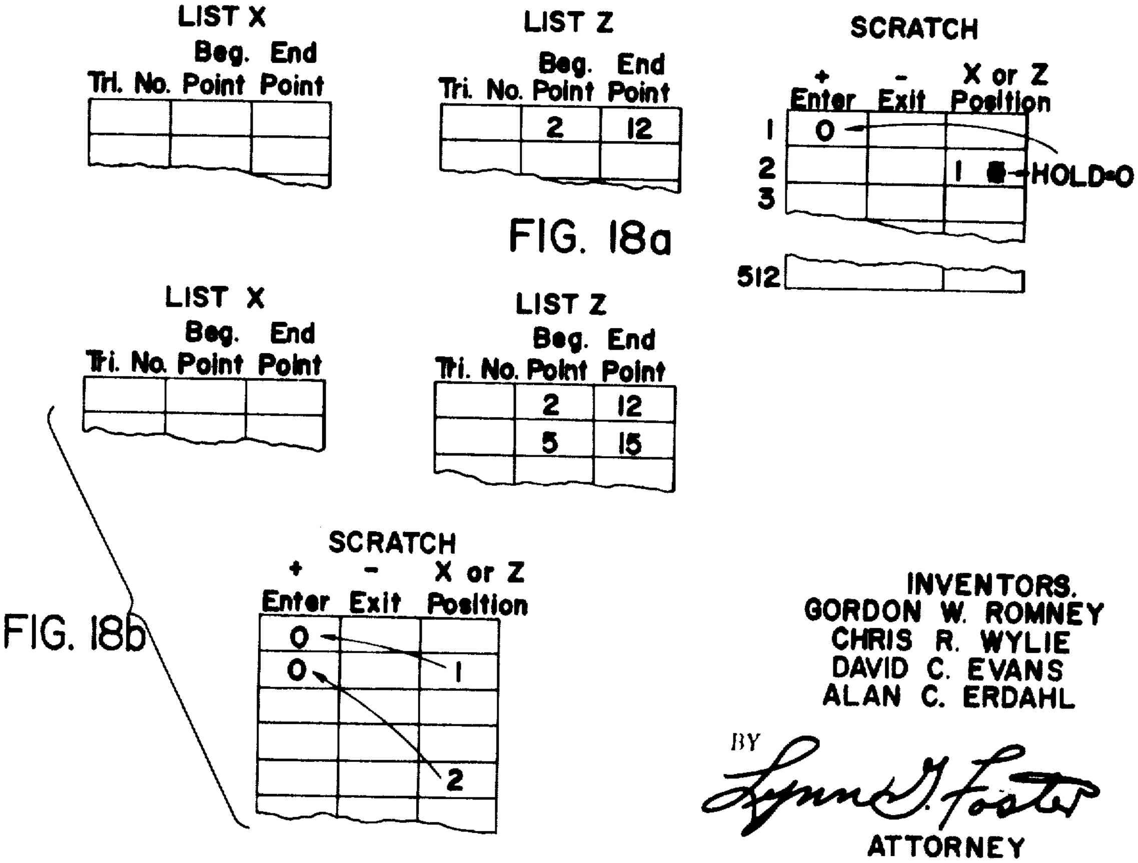
FIGS. 18*a* through *h* are diagrammatic illustrations of the operations of the List Z creator.

Referring to FIG. 18*b*, the minimum and maximum Z-points for triangle $T_2$, 5 and 15, respectively, are then stored in the second line of the minimum and maximum columns. Since the minimum Z-point is 5, the triangle number "2" is stored in the fifth line of the Z-position column with the zero previously stored there being placed in the second line of the enter column.

Figure 18C:
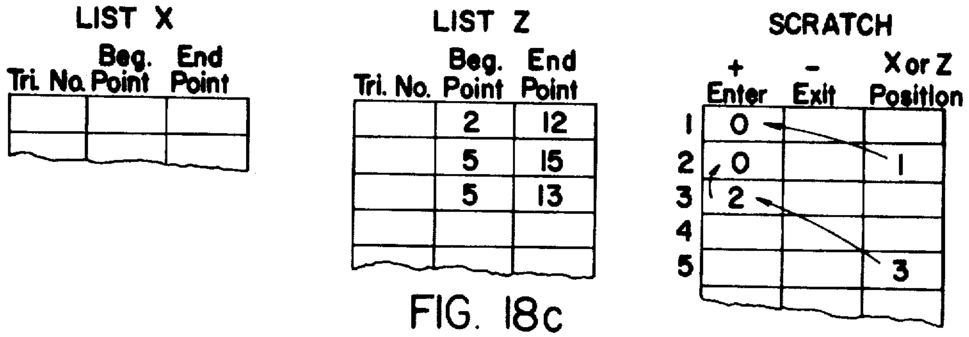

Referring to FIG. 18*c*, the minimum and maximum points for triangle $T_3$, 5 and 13, respectively, are stored in lines 3 of the minimum and maximum columns. Since the minimum Z-point is 5, the triangle number "3" is stored in the fifth line of the Z-position column. The "2" previously in the fifth line is then stored in the third line of the enter column.

Figure 18D:
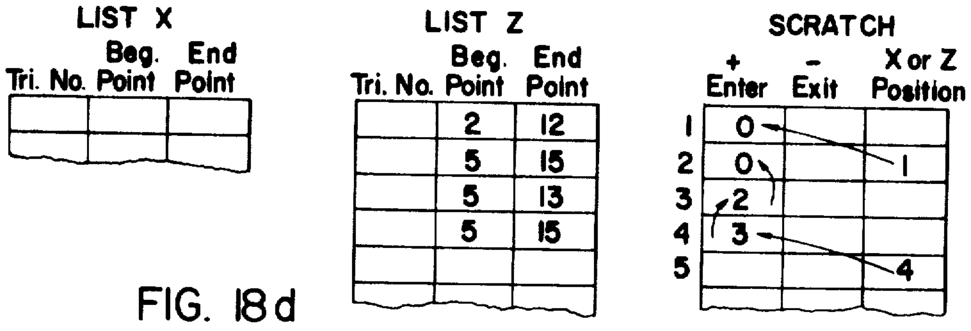
Figure 18E:
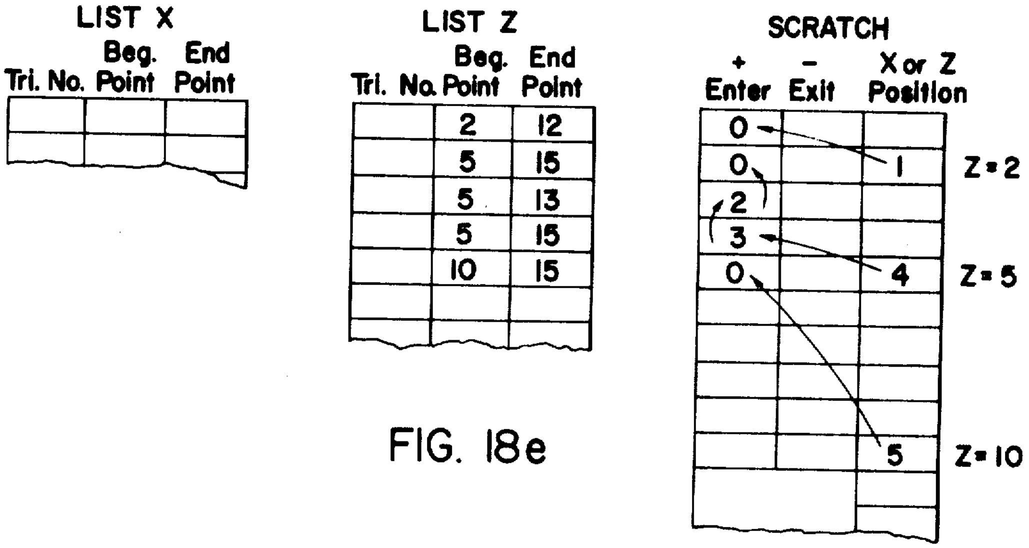
Figure 18F:
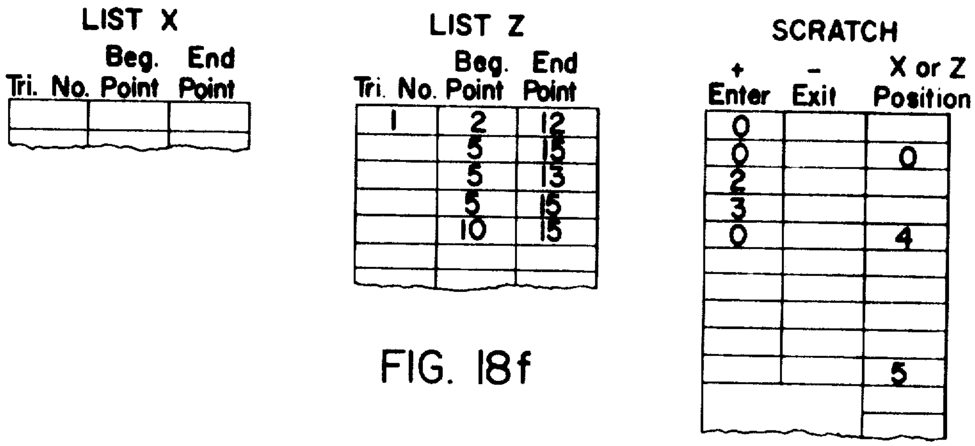

In this same manner, the minimum and maximum points of triangles $T_4$and $T_5$are stored in the List Z and Scratch as illustrated in FIGS. 18*d* and *e*. The final stage of creation for List Z begins now that the Scratch list has been completed. The object is to successively run through the Z position column of the Scratch from top to bottom and put the triangle numbers encountered into the Triangle Number column of List Z The first one encountered is triangle number "1" and is transferred to the first line of the Triangle Number column and zero is stored back into the Z-position line in which the "1" was stored. Using the number "1" as a pointer, the first line in the enter column is checked. This position is filled by a zero meaning that no more triangles enter at this value of Z. FIG. 18*f* illustrates the list at this stage.

Figures 18G, 18H:
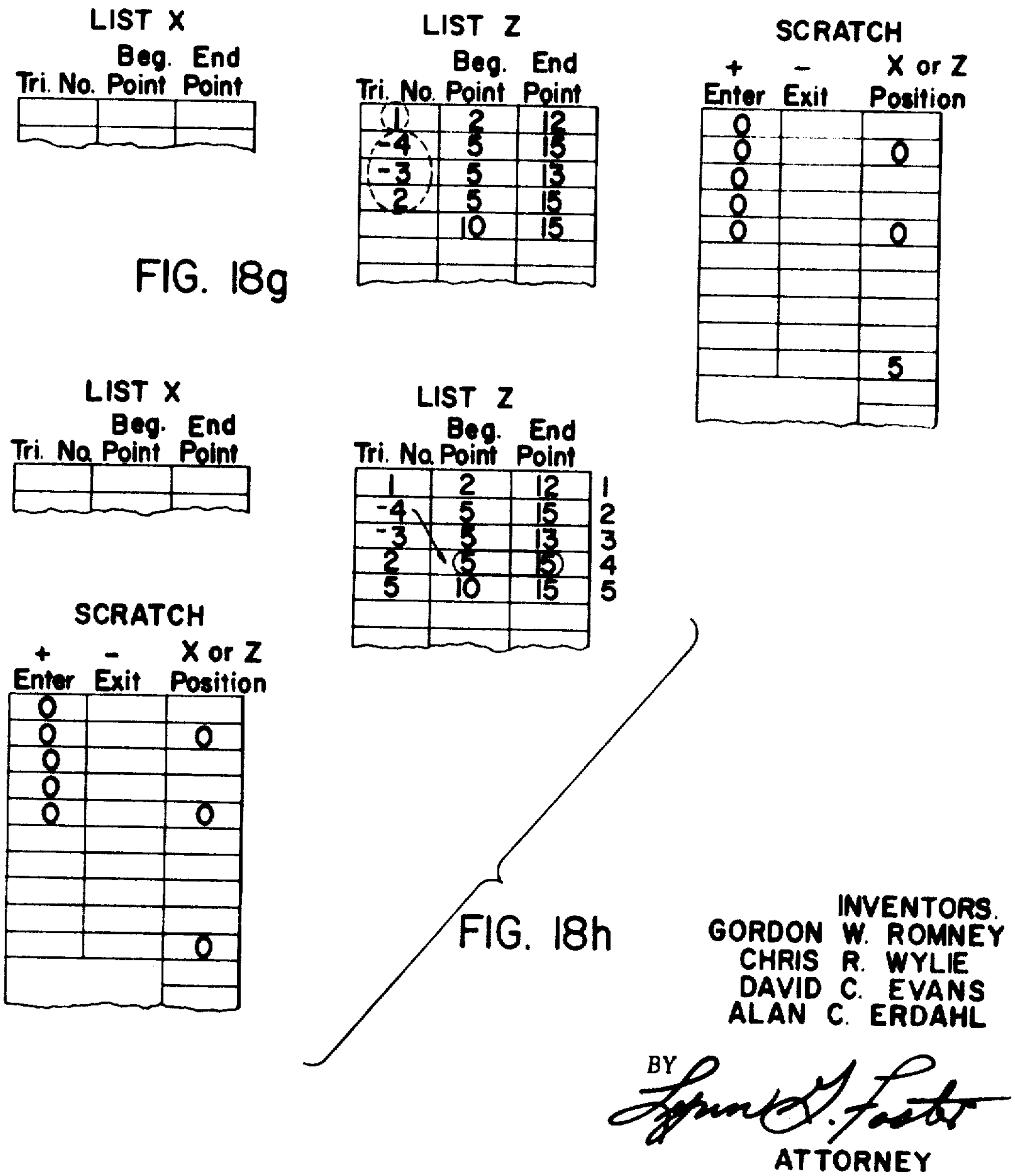

The next triangle to be reached in the Z position column Scratch is number "4." The next line in the Triangle Number column is filled with a "4," and the fourth line of the enter column is checked for other triangles entering at this value of Z. Triangle $T_3$is found to enter and therefore a "3" is put into the triangle number column, the preceding triangle in List Z being made negative. The presence of triangle $T_3$ causes the checking of the third line of the enter column where triangle $T_2$is found and therefore a "2" is also put into the Triangle Number Column. Again the preceding triangle number is made negative. This is illustrated in FIG. 18*g*. Whenever a triangle is found to be in the indicated line of the enter column, the previous triangle in the Triangle Number column is made negative to indicate that at least one other triangle enters at the same value Z. The last triangle is left positive to indicate that the last triangle to enter at the same value of Z is being stored. Note that as each triangle number is removed from the Scratch columns, zeros are stored therein. This process is repeated for all entries in the Z position column of Scratch and the completed List Z is shown in FIG. 18*h*. The Triangle Number is used as a pointer to show where that triangle enters and exits.

LIST X CREATION

Referring to FIG. 19*a–i*the List X creator 86 includes a List X and a Scratch. The List X includes columns for Triangle Number, entering X-point and exiting X-point. The Scratch is the same as described with respect to List Z except that the exit column is utilized.

On every Z-scan line in which a triangle enters, in this case from $Z=2$ to $Z=15$, List X will be created in a similar manner to the creation of List Z. Only one List X will be created at a time, and as a change is made from one scan line to the next, a new List X will be created and written over the old List X.

Figure 19A:
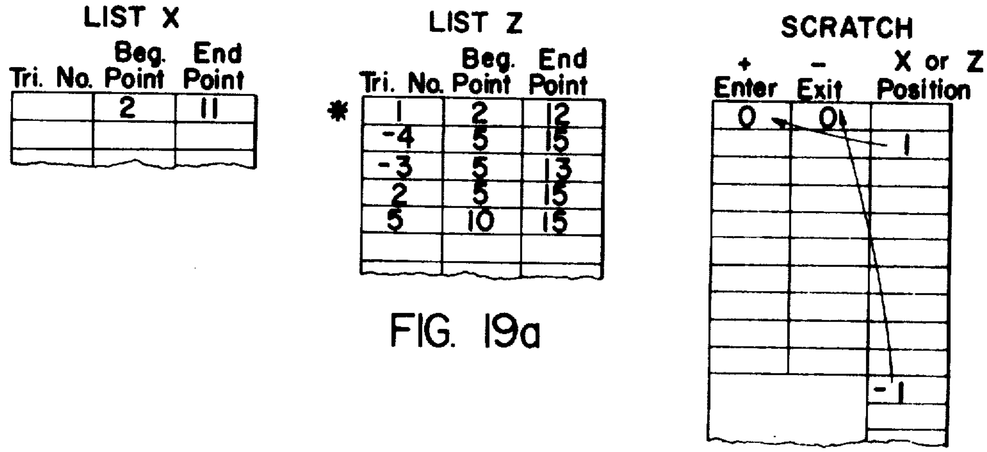
FIGS. 19*a* through *i* are diagrammatic illustrations of the operations of the List X creator.

A pointer, Z point, designated by an asterisk in FIG. 19*a*, initially points to the first line of List Z. Its purpose is to show where to begin searching through List Z for triangles that are visible on a particular scan line. For example, if the program was at scan line $Z=12$, it would find the triangle exits at this scan line. Therefore, zero would be stored in the triangle number column of List X and the pointer would point to the next line in List Z where a triangle is still visible.

The Z-scan line of $Z=7$ as shown in FIG. 17 has been chosen to be the example to illustrate the creation of List X. Note that triangle number 5 does not enter on this scan line so only the first four lines of List Z will be used. Since List Z contains triangles listed in the order of how they enter, List Z needs to be searched only until a triangle is found that has not yet entered.

Referring to FIG. 18*a* the first triangle in List Z is number 1. Its intercepts are found to be $X=2$ and $X=11$. These values are placed in the first line of the enter X-point and exit X-point columns of List X. Since Triangle $T_1$ enters the scan line at $X=2$, a "1" is placed in the second line of the X position column of Scratch. The zero previously in that line is placed in the first line of the enter columns. Since Triangle $T_1$ exits the scan line at $X=11$ a "−1" is placed in the eleventh line of the *X* position column of Scratch. The zero previously in that line of the *X* position column is placed into the first line of the exit column. The minus sign is utilized to designate exiting points of the triangles. The previous contents of the *X* column line are stored in either the enter or exit columns according to the sign of the new contents. More specifically, if the triangle number is positive, it points to the "enter" column, and if the triangle number is negative it points to the "exit" column.

Figures 19B, 19C:
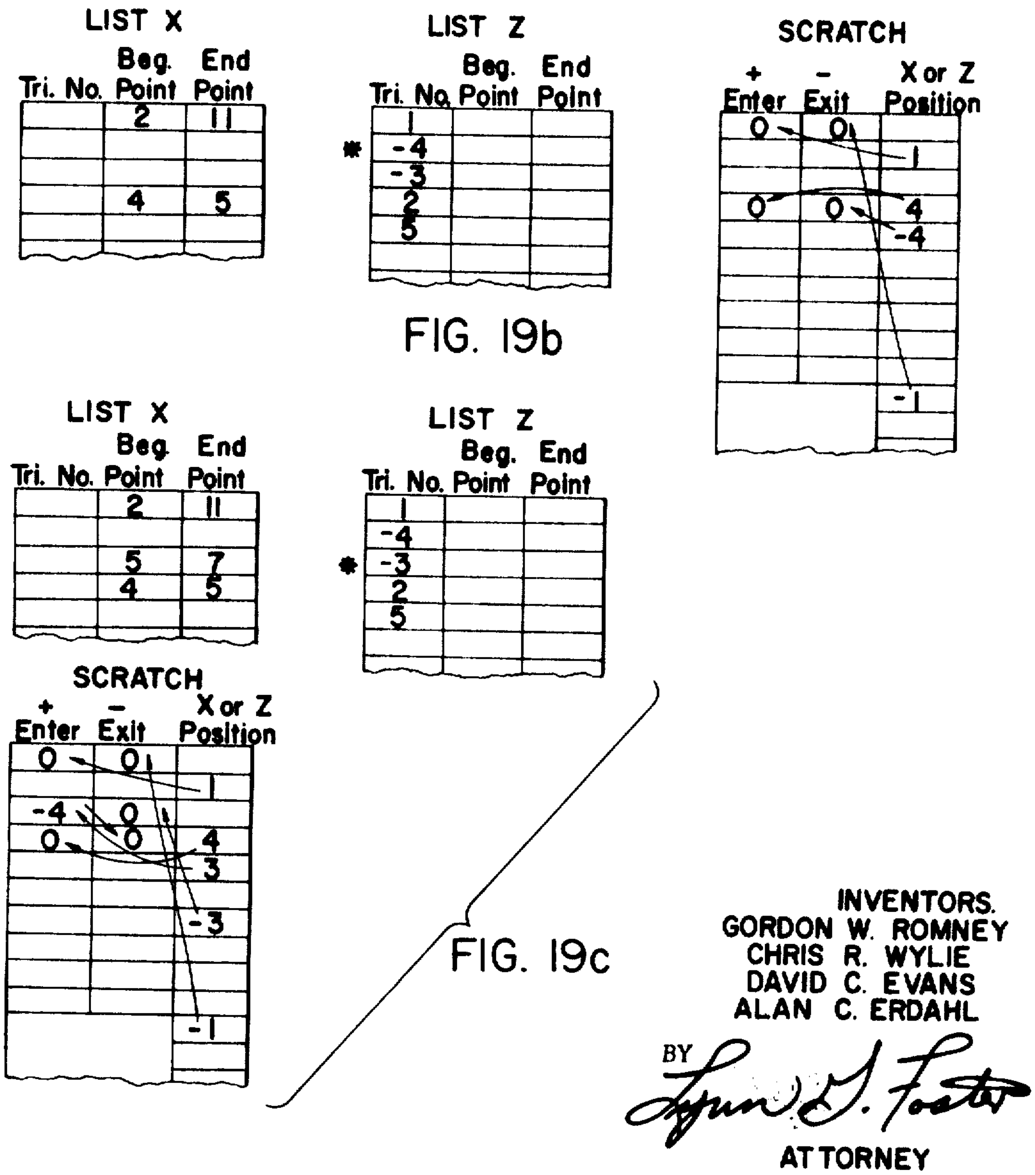

Referring to FIG. 19*b*, the pointer * is now at the triangle $T_4$ which has entering and exiting X-points 4 and 5, respectively. Since Triangle $T_4$ is being examined, these values are stored in the fourth lines of the entering and exiting X-point columns and a "4" is placed in the fourth line of the X-position column while a "−4" is stored in the fifth line thereof. The zeros previously in these lines are appropriately placed in the fourth line of the enter and exit columns.

Referring to FIG. 19*c* the next triangle in List Z, Triangle $T_3$ is examined. From FIG. 17 it is found that Triangle $T_3$ enters at X=5 and exits at X=7. These values are then stored in the third line of the entering and exiting X-points columns of List X. Since Triangle $T_3$ enters at X=5, a "3" is placed in the fifth line of the X-position column. The "−4" previously there is placed in the third line of the enter column and the zero previously in that line is placed in the fourth line of the exit column. A "−3" is placed in the seventh line of the X-position column and the zero previously there is placed in the third line of the exit column.

Figures 19D, 19E, 19F:
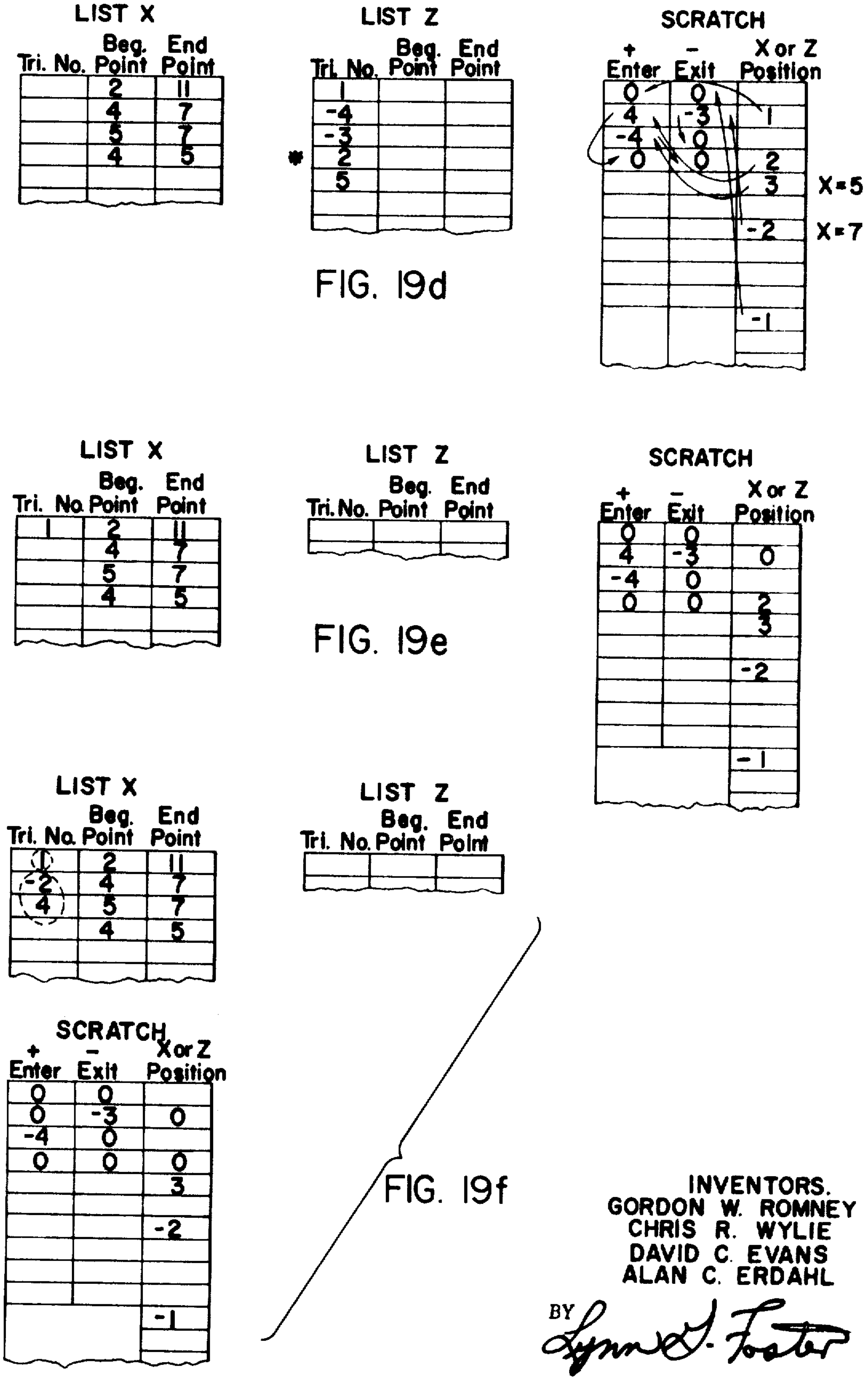
Figure 19G:
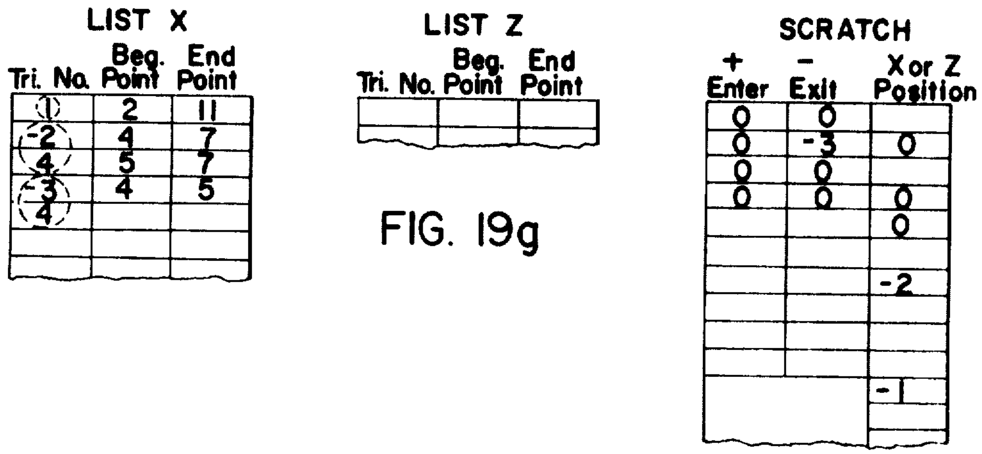

Finally, referring to FIG. 19*d*, the last triangle to enter scan line Z=7, Triangle $T_2$, is examined. The entering and exiting X-values, 4 and 7, respectively, are placed in the second line of the entering and exiting X-point columns. Since Triangle $T_2$ enters at X=4 a "2" is stored in the fourth line of the X-position column. The "4" previously there is placed in the second line of the enter column. The zero previously in that line is moved to the fourth line of the enter column since it was replaced by a "4". A "−3" is stored in the seventh line of the X-position column moving the "−3" previously there to the second line of the exit column. This moves the zero to the third line of the exit column since the zero was replaced by a "−3".

Now each line of the "X position" column of SCRATCH is checked to see if any triangles enter or exit. If there are any, they are placed into the "triangle number" column of List X. FIG. 19*e* shows that since triangle 1 is the only one that enters or exits at X=1, it is stored in the first line of the triangle number column. Here again once a triangle is listed in List X its designations in Scratch are replaced by a zero.

The next triangle found in the X position column is Triangle $T_2$; therefore, a "2" is placed in the second line of the triangle number column of List X. Since the "2" was positive the second line of the enter column is checked to see if other triangles enter or exit at this X-position. A "4" is found and stored in the next line of the triangle number column. Here again the previously listed triangle is given a negative sign to indicate that other triangles enter at this point. Note that the signs in the triangle number column do not correspond to the signs used in scratch. Since a positive "4" was found, the fourth line of the enter column is then checked. A zero there indicates that no other triangles enter or exit at this point. The state of the lists at this time is illustrated in FIG. 19*f*.

Triangle $T_3$ in the fifth line of the X-position column is found to be the next entering triangle. Therefore, a "3" is placed in the next line of the triangle number column. The positive 3 points to the third line of the enter column where a "−4" is found. Therefore a "4" is placed in the next line of the triangle number column and a minus sign is added to the preceding triangle number listed. Here again note that the signs utilized in the Scratch are disregarded when storing numbers in the triangle numbers column. The "−4" points to the fourth line of the exit column where a zero is found indicating no other triangles enter at this point. The list X is now in the state illustrated in FIG. 19*g*.

Figures 19H, 19I:
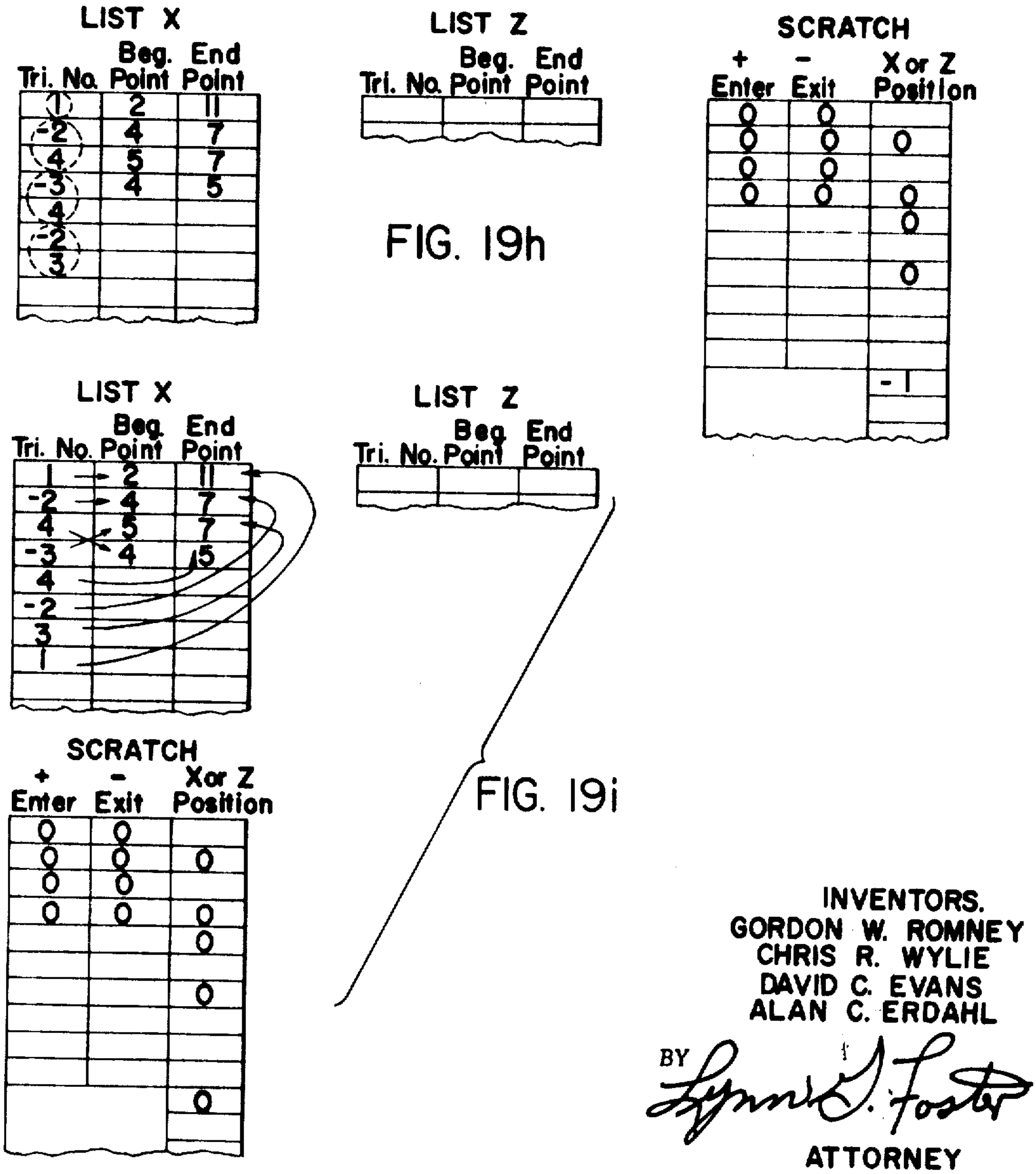

This process is repeated for all remaining triangles listed in the X-position column in the order in which they occur as illustrated in FIGS. 19*h* and 19*i*.

FIG. 19*i* shows the list X as finally constituted for Z-scan line Z=7. The List of the triangle numbers column is a list of the triangles that enter Z-scan line Z=7 in the order in which they enter and exit from the scan line. Additionally those triangles which enter or exit at the same point are designated by their signs.

SEQUENCER COMPARATOR AND HIDDEN LINE CALCULATOR

The sequencer comparator 88 and hidden line calculator 90 are significant features of the present invention. The sequencer comparator checks the current list X with the previous list X. If the triangles enter the scan line in the same order then the same triangles are visible and no hidden line calculation need be done. This feature substantially reduces computation time since many hidden line calculations are unnecessary. Where visibility must be determined the hidden line calculator functions to check the depth of each triangle at its X-begin point and determine that triangle which is closest to the eyepoint.

Figure 20A:
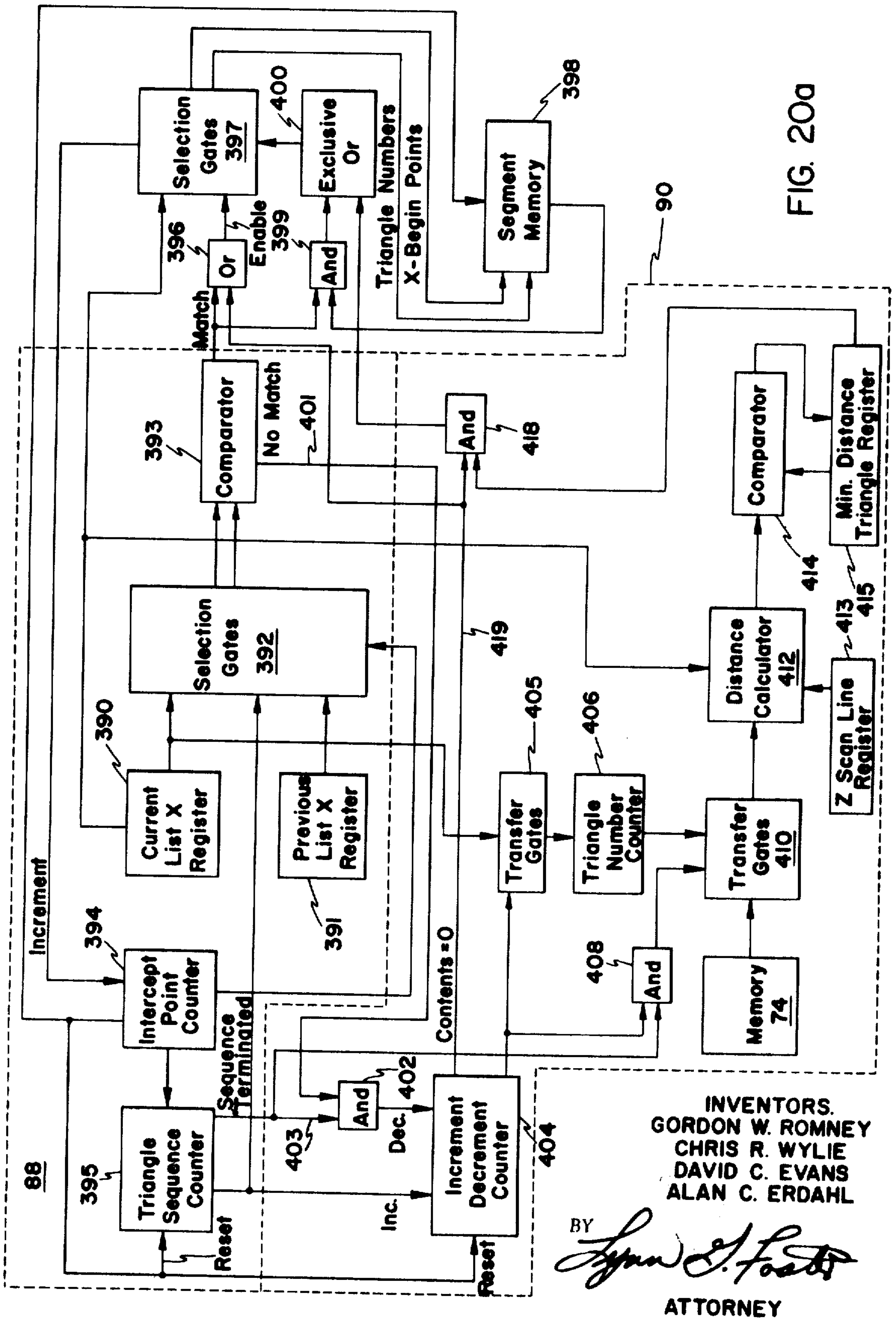
FIG. 20*a* is a schematic diagram of the sequencer comparator circuit and the hidden line calculator.

Referring to FIG. 20*a*, the sequencer comparator 88 as shown in the dotted lines includes current List X register 390 and a pervious List X register 391. The registers 390 and 391 are connected to a comparator 393. Selection gates 392 selectively retrieve information from the registers 390 and 391 under the control of the intercept point counter 394 and the triangle sequence counter 395. When the outputs from selection gates 392 match, a match signal is supplied to an OR-gate 396 which supplies an enable signal to selections gates 397. The selection gates 392 then transfer X-begin point information from the current List X register 390 to a segment memory 398 which acually is the portion of memory 74 labeled segment information in FIG. 7. In addition, the match signal is connected to an AND gate 399 which is also connected to the segment memory 398. The segment memory 398 then supplies information from its output through an exclusive OR-gate 400 to the selection gates 397. If the two signals received in the comparator do not match, a no match signal is sent on line 401 to an AND-gate 402. A no match signal indicates that calculations must be made by the hidden line calculator 90.

The gate 402 has an output connected to an increment-decrement counter 404. The AND-gate 402 includes a second input line 403 from the triangle sequence counter 395 which is energized when the sequence of triangles at a particular intercept point are terminated. The output from the AND-gate 402 decrements the counter 404. The triangle sequence counter also has an increment output to the counter 404. Triangle number information from the current List X register 390 is connected through transfer gates 405 to a triangle number register 406. The counter 404 has an output connected to the transfer gates 405. Output from the triangle sequence counter 395 on the line 403 is also connected to one input of an AND-gate 408 which is also connected to the counter 404. The output of the AND-gate 408 is connected to transfer gates 410 as is the triangle number register 406. Transfer gates 410 transfer selected information from the memory 74 to a distance calculator 412 which will be described in detail hereinafter. Also connected to the distance calculator 412 is a Z-scan line register 413 and the X-begin points information from the current List X register 390. The output from the distance calculator is fed to a comparator 414 which also has an input from a minimum distance triangle register 415. The comparator has an output connected to the register 415. The output of the minimum distance register 415 is connected to one input of an AND-gate 418. The counter 404 has an output 419 which is connected to a second input o the AND-gate 418 and a second input of the OR-gate 396. The output of the AND-gate 418 is connected to the exclusive OR-gate 400. Once the information on a particular intercept point has been passed through, the selection gate 397 supplies an increment signal to the intercept point counter 396 and a reset signal to the triangle sequence and increment-decrement counters 395 and 404.

In operation, the triangle sequence counter 395 and intercept point counter 394 control the selection gates to selectively retrieve successive triangles at a particular intercept point and supply them to the comparator 393. If the signals supplied to the comparator are the same, then the match signal is supplied through the OR-gate 396 to enable the selection gates 397 to select the proper X-begin point and supply it to the segment memory 398. In addition, the match signal enables the AND-gate 399 to pass triangle number information from the segment memory 398 through the exclusive OR-gate 400 to the selection gates 397 and back to the segment memory 398. The segment memory 398 supplies the triangle number information dependent on the signal it receives from the intercept point counter since it must know which intercept point is being considered to supply the proper triangle number. The triangle number fed through the AND-gate 399 also controls the selection gates 397 to select the proper corresponding X-begin point. Both the triangle numbers and the X-begin points are stored in the segment memory 398 which is actually the portion of the memory 74 labeled Segment Information. If a no match signal is received on line 401, and gate 402 is enabled to pass through decrement control to the increment-decrement counter 404 once the triangle sequence counter indicates that the triangles at a particular intercept point have been completely stored in the triangle number register 406. Triangle sequence counter 395 also supplies an increment signal to the counter 404 which stores a number corresponding to the number of triangles within a particular intercept point. The counter controls the transfer gates 405 to properly locate the information from the List X register in the triangle number register 406. Once the sequence is terminated, AND-gate 408 is enabled to pass the output from the counter 404 to control the transfer gates 410 which are also controlled from the triangle number register 406. Transfer gates 410 are controlled to access the appropriate triangle equation constants $a_1$, $a_2$ and $a_3$ for the particular triangle being examined. These constants are supplied to the distance calculator 412. Also connected to the distance calculator 412 is the X-begin point information from the current List X register 390 and the current Z-scan line from the Z-scan line register 413. The distance calculator functions to calculate $R'_Y$ in accordance with the equation (7) set forth below:

$$R'_Y=a_1I_x+a_2I_z+a_3 \qquad (7)$$

The result of this calculation is fed to comparator 414 which compares it with the previously stored maximum $R'_Y$ in register 415. Initially, register 415 is stored with a relatively small value. The AND-gate 418 is enabled to pass the triangle number of the value stored in the minimum distance triangle register 415 once the counter 404 is reduced to zero and supplies an enabling signal on line 419. The minimum distance triangle number of the minimum distance triangle register value is passed through the AND-gate 418 to the exclusive OR-gate 400 to control the selection of the proper X-begin point by the selection gates 397. A signal on line 419 indicating the counter 404 has been reduced to zero is fed to the OR-gate 396 to enable the selection gates 397 to pass information to the segment register 398.

Figure 20B:
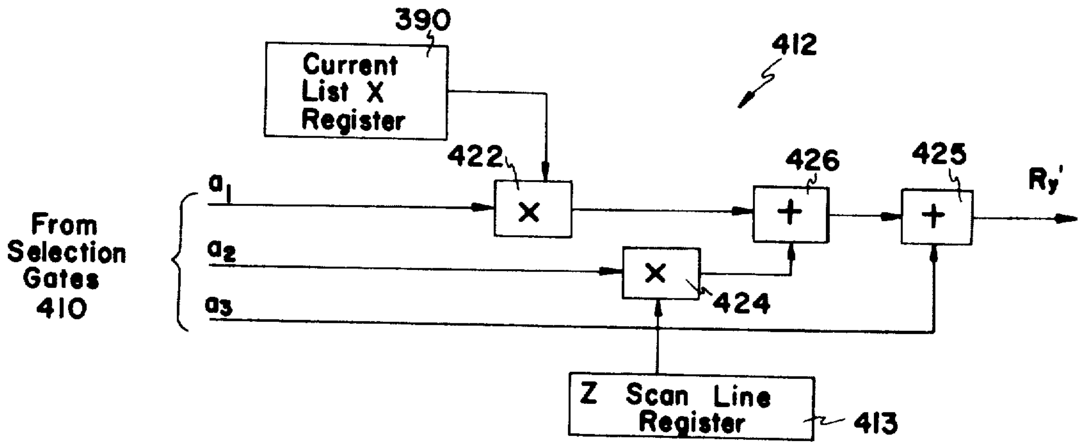
FIG. 20*b* is a detailed schematic of the distance calculator of FIG. 20*a*.

Referring to FIG. **20*b* the distance calculator 412 will now be described. The triangle equation constants $a_1$, $a_2$ and $a_3$ are supplied from the selection gates 410 to a multiplier 422, a multiplier 424, and an adder 425, respectively. The X-begin point information is supplied from the current List X register 390 to the multiplier 422 and the current Z-scan line is fed to the multiplier 424 from the Z-scan line register 413. The outputs of the multiplier 422 and 424 are added together in an adder 426 the output of which is added to constant $a_3$ in the adder 425. The output of the adder 425 represents $R'_Y$ at the X-begin point of the triangle on the particular scan line. In operation the circuit of FIG. 20*b*** functions to calculate the equation (7):

$$R'_Y=a_1I_x+a_2I_z+a_3$$

Specifically $a_1$ is multiplied by the $I_x$ value in the multiplier 422 and $a_2$ is multiplied by the $I_z$ value in the multiplier 424. The results of these multiplications are added in the adder 426, the output of which is added to $a_3$ in the adder 425.

INTENSITY PARAMETERS CALCULATOR

Another significant feature of this invention is the manner in which the triangles determined to be visible are displayed on the display device. First, the novel method and system utilized provides for the calculation of the intensity interpolation parameters. A system for accomplishing this is shown in FIGS. 21, 22, **23*a* and 23*b***.

Figure 21:
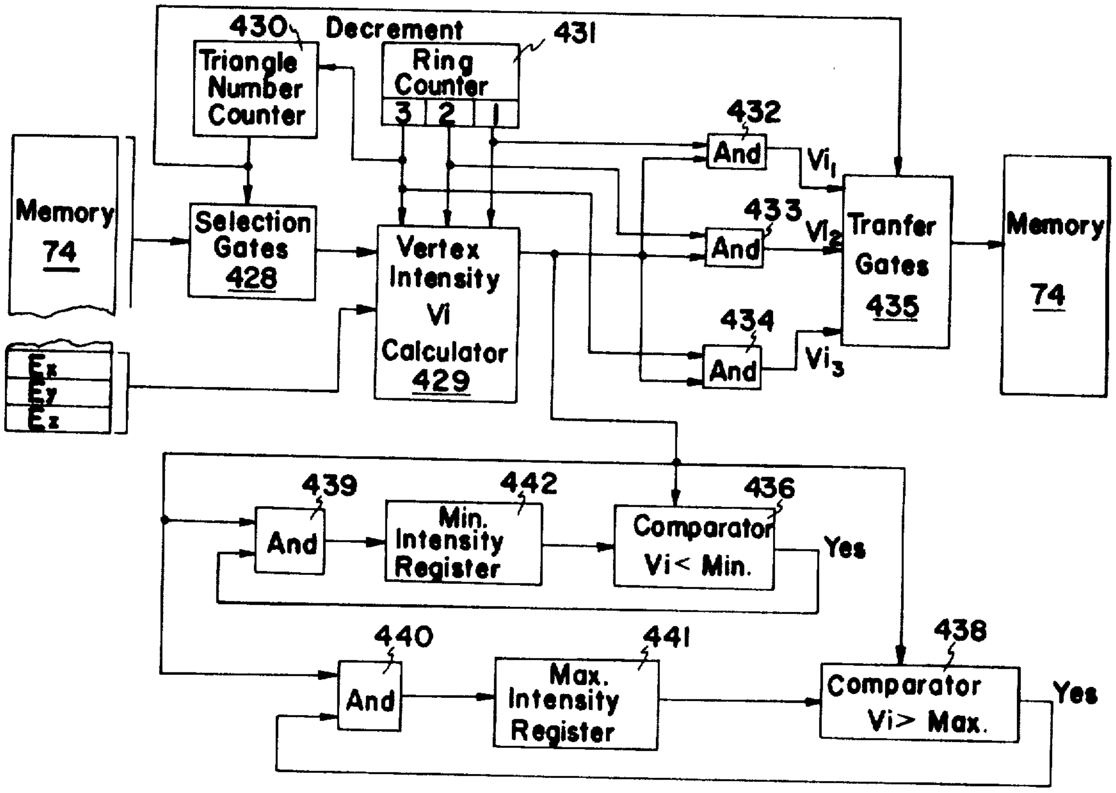
FIG. 21 is a schematic of a portion of the intensity interpolation parameters calculator.

Referring to FIG. 21, selection gates 428 select triangle information from the memory 74 and supply to this information to a vertex intensity (V*i*) calculator 429. The selection gates 428 are controlled by a triangle number counter 430 connected thereto. The component values of the eyepoint are also supplied from memory 74 to the V*i* calculator 429. The V*i* calculator 429, which will be described in detail hereinafter, is controlled by a ring counter 431. The V*i* calculator 429 calculates the intensity at each vertex of each triangle and supplies them sequentially to one input of AND-gates 423, 433 and 434. The ring counter outputs 1, 2 and 3 are connected to a second input of each of the AND-gates 432, 433 and 434 are connected to transfer gates 435 which are under the control of the triangle number counter 430. Transfer gates 435 transfer the Vi or intensity levels at each vertex to the proper location in the memory 74. The intensities at each vertex are also supplied sequentially to the comparators 436 and 438, as well as to one input of AND-gates 439 and 440. A min intensity register 422 is connected to the comparator 436 and a max intensity register 441 is connected to comparator 438. The comparators 436 and 438 each have a YES outputs which are connected to a second input of each of the AND-gates 439 and 440, respectively. In operation, triangle number counter 430 controls the selection gates 428 to supply in parallel the information representative of a single triangle to the V*i* calculator 429. Under the control of ring counter 431, the V*i* calculator calculates the intensity at each vertex and supplies the signals to the AND-gates 432, 433 and 434 as well as the comparators 436 and 438 and the AND-gates 439 and 440. The AND-gates 432, 433 and 434 are sequentially enabled from the outputs of the ring counter to supply the vertex intensities V*i* to the memory through the transfer gates 435. Comparators 436 and 438 compare the calculated V*i*'s to the minimum and maximum values stored in the min register 442 and the max register 441. Initially min intensity register 422 is loaded with a very high value and the max intensity register 441 is loaded with a very low value. If the current V*i* value is less that the min value, the YES output of the comparator 436 is energized to enable the AND-gate 439 to store the present V*i* value in the min intensity register 422 replacing the previous value therein. If V*i* is greater than max, the yes output of the comparator 441 is energized to enable the AND-gate 440 to store the present V*i* signal into the max intensity register 441 replacing the previous value therein.

Figure 22:
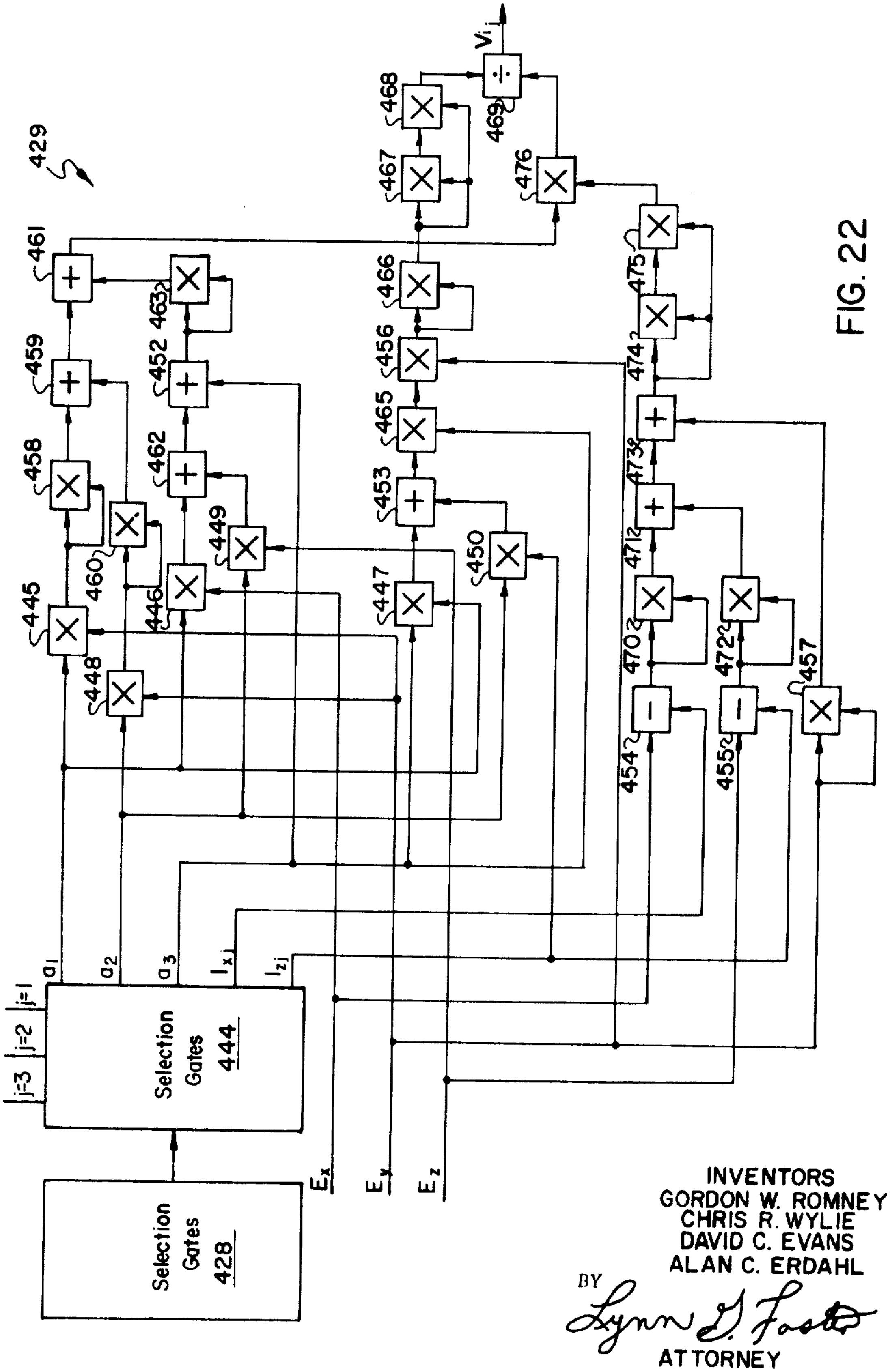
FIG. 22 is a detailed schematic diagram of the vertex intensity calculator of FIG. 21.

Referring to FIG. 22, the V*i* calculator 429 will now be described. The output of selection gates 428 are fed to a second set of selection gates 444, which are controlled by the outputs $j$=1, 2 and 3 of the ring counter 431. Selection gates 444 supply the signals $a_1$, $a_2$ and $a_3$ and $I_{xj}$ and $I_{zj}$ as outputs. The particular value of $j$ will depend on the condition of the ring counter 431. $a_1$ is supplied to multipliers 445, 446 and 447; $a_2$ is supplied to multipliers 448, 449 and 450; and $a_3$ is supplied to adder 452 and the multipliers 447 and 465. I is supplied to a subtractor 454 and $I_{zj}$ is supplied to the multiplier 450 and a subtractor 455. The components of the eyepoint, $E_x$, $E_y$ and $E_z$ are also supplied to the V*i* calculator. $E_x$ is supplied to the multiplier 446 and the subtractor 454; $E_Y$ is supplied to the multipliers 445, 448, 456 and 457; and $E_z$ is supplied to the multiplier 449 and the subtractor 455. The output of the multiplier 445 is squared in a multiplier 458 and output of which is connected to an adder 459. The output of the multiplier 448 is squared in a multiplier 460 and added to the output of the multiplier 458 in the adder 459. The output of the adder 459 is connected to another adder 461 the output of which is connected to a multiplier 476. The output of the multiplier 446 is connected to an adder 462 which is also connected to the output of the multiplier 449. The output of the adder 462 is supplied to the adder 452, which is also supplied with the signal $a_3$. The output of the adder 452 is squared in a multiplier 453 and connected to an output of the adder 461. The output of the multiplier 447 is connected to one input of an adder 453, the other input being the output of the multiplier 450. The output of the adder 453 is connected to the multiplier 465. The multiplier 465 is also supplied with the signal $a_3$ and has an output connected to the multiplier 456. The output of the multiplier 456 is taken to the sixth power by multipliers 466, 467 and 468. The output of the multiplier 468 is connected to a divider 469. The output of the subtractor 454 is squared in the multiplier 470 the output of which is connected to an adder 471. The output of the subtractor 455 is squared in the multiplier 472 and connected to the adder 471. The output of the adder 471 is connected to an adder 473 which is also connected to the output of the multiplier 457. The output of the adder 473 is cubed by multipliers 474 and 475. The output of the multiplier 475 is connected to the multiplier 476, the output of which is connected to the divider 469. The output of divider 469 is a signal representing $Vi_j$.

In operation the selection gates 444 select the appropriate $I_x$ and $I_z$ values from the selection gates 428 and supply these and the constants $a_1$, $a_2$ and $a_3$ to the arithmetic units described above. The components of the eyepoint $E_x$, $E_y$ and $E_z$ are also supplied to the arithmetic units which are arranged to perform the equation:

$$i = \frac{i_0 \cos^2 \theta}{R^4} \qquad (8)$$

Figure 23A:
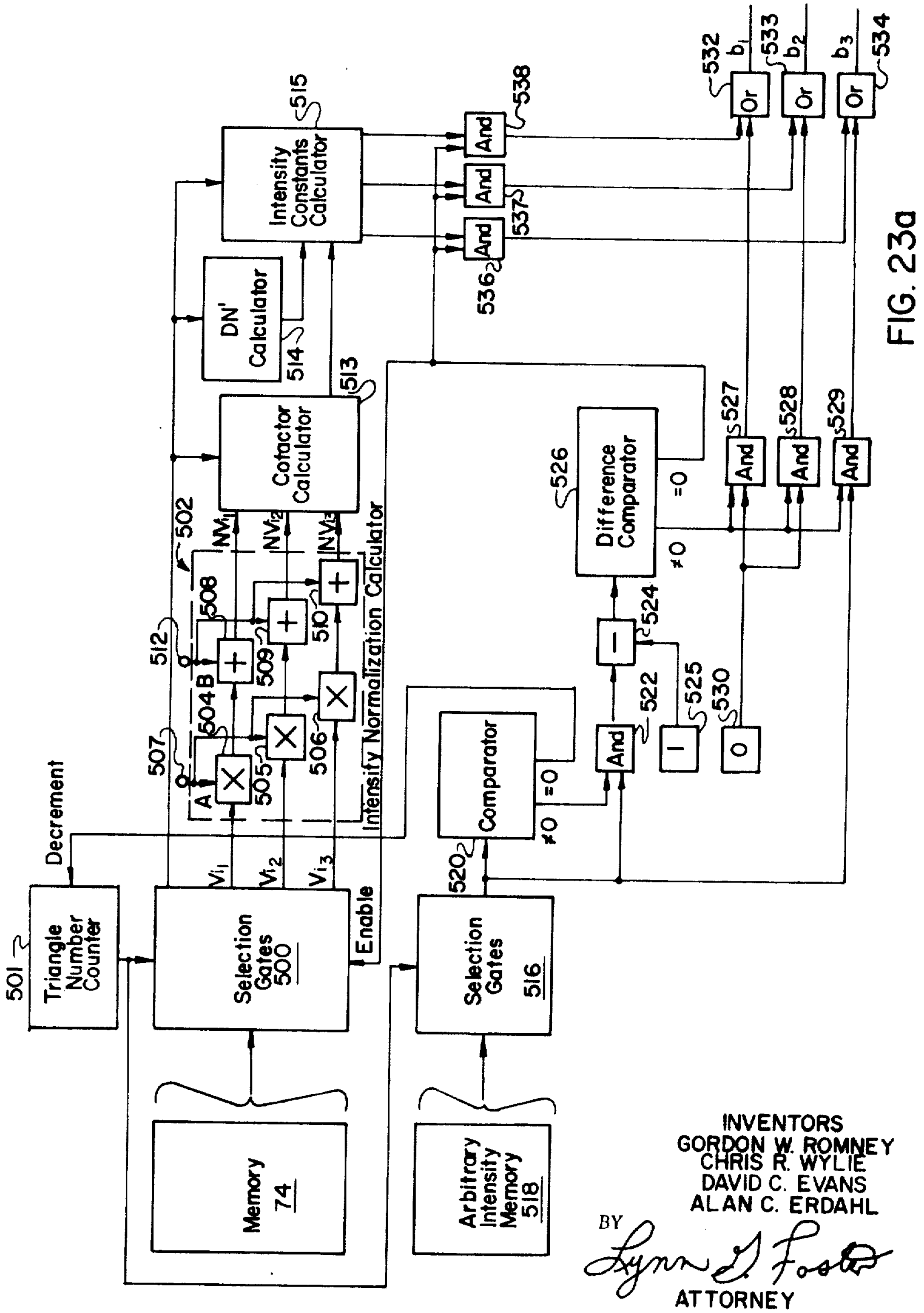
FIG. 23*a* is a schematic diagram of the remainder of the intensity interpolation parameters calculator.

Once the $Vi$ signals are calculated then intensity interpolation $b_1$ $b_2$ $b_3$ may be determined. Referring to FIG. 23*a* selection gates 500 are connected to the memory 74 to select the information corresponding to each triangle and to supply them to the remaining portions of the circuit. Selection gates 500 are controlled by triangle number counter 501 connected thereto. The $Vi$ signals $Vi_1$, $Vi_2$ and $Vi_3$ are supplied to an intensity normalization calculator 502. The intensity normalization calculator 502 is also connected to signals A and B from terminals 507 and 512 the provision of which will be described in detail hereinafter. The intensity normalization calculator includes multiples 504, 505 and 506 to which the $Vi_1$ $Vi_2$ and $Vi_3$ are connected respectively. Also connected to these multipliers 504, 505 and 506 is the terminal 507 on which the signal A is supplied. The outputs of these multipliers 504, 505 and 506 are connected to adders 508, 509 and 510, respectively. Also connected to these adders is the terminal 512 on which signal B is supplied. The outputs of the adders provide the signals $NVi_1$, $NVi_2$ and $NVi_3$, respectively, which represent the normalized vertex intensities. These outputs are connected to a cofactors calculator 513. Selection gates 500 also supply the $I_x$ and $I_z$ information to the cofactors calculator 513, DN′ calculator 514, and the intensity constants calculator 515. The cofactors calculator 513 and the DN′ calculator 514 are connected to the intensity constants calculator 515. These three calculators are the same as the triangle equation constants calculator as shown in FIG. 14*a* and 14*b* and therefore will not be described in detail. The only difference is that $NVi$'s are supplied instead of $1/R_V$'s. The triangle number counter 501 is also connected to selection gates 516 which selects information from an arbitrary intensity memory 518. A one is stored in a particular triangle number location for each triangle determined to be visible. The arbitrary intensity memory 518 may also include information arbitrarily selected to either discard a particular triangle or set a particular triangle at an arbitrary value intensity level. The arbitrary intensity signals are supplied from the selection gates 516 to a comparator 520. If the signal is zero, a decrement signal is supplied to the triangle number counter to cause it to count down one number and cause the next triangle information to be supplied to the selection gates 500 and 516. The comparator has an =0 output which is connected to decrement the triangle number counter 501 and ≠0 output connected to one input of an and gate 522. The arbitrary intensity value is connected to the second input of the AND-gate 522. The output of the AND-gate 522 is connected to a subtractor 524 which is also connected to a register 525 which has the value "1" stored therein. The output of the subtractor 524 is supplied to a difference comparator 526. The difference comparator has an =0 output which supplies an enabling signal to the selection gates 500 and an ≠0 output which is connected to an input of AND-gates 527, 528 and 529. A zero register 530 which has the value "zero" stored therein is connected to a second input of the AND-gates 527 and 528. The arbitrary intensity signal is connected to a second input of the AND-gate 529. The outputs of the AND-gates 527, 528 and 529 are supplied to one input of OR-gates 532, 533 and 534, respectively. The outputs of the intensity constants calculator are connected to one input of AND-gates 536, 537 and 538. The =0 line of the difference comparator 526 is supplied to a second input of each of the AND-gates 536, 537 and 538. The outputs of these AND-gates 536, 537 and 538 are fed to a second input of the OR-gates 534, 533 and 532, respectively. The outputs of the OR-gates 532, 533 and 534 are $b_1$, $b_2$ and $b_3$, respectively. In operation the triangle number counter controls the selection of triangle information from the memory 74 and arbitrary intensity memory 518. Selection gates 500 supply the $Vi$ signals to the intensity normalization calculator 502 and the $I_x$ and $I_z$ signals to the cofactors calculator 513, the DN′ calculator 514, and the intensity constants calculator 515. Intensity normalization calculator utilizes the signals A and B which are derived from the max and min values as compared to the capability of the display, and provides normalized intensity values $NVi_1$, $NVi_2$ and $NVi_3$. These are supplied to the cofactors calculator 513. The cofactors calculator, the DN′ calculator and the intensity constants calculator operate in the same manner as the previously described triangle equation constants calculator as shown in FIG. 14*a* and *b*. The only variance is that the $NVi$ signals are supplied instead of the inverted $R_V$ signals. The intensity interpolation parameters $b_1$, $b_2$ and $b_3$ are supplied from the intensity constants calculator 515 and the AND-gates 538, 537 and 536, respectively, if they were calculated. This calculation will only take place if the selection gates are enabled from the difference comparator 526 as will be described hereinafter. Selection gates 516 supply the arbitrary intensity signals stored for each triangle in the arbitrary intensity memory 518 to the comparator 520 which determines whether the signal is greater or equal to zero. A signal equal to zero indicates that this triangle has been disregarded, and a decrement signal is supplied to the triangle number counter to cause it to control selection gates 500 and 516 to look at the next triangle. If the arbitrary intensity signal was not equal to zero, then the AND-gate 522 is enabled to pass the arbitrary intensity signal to the subtractor 524. Also supplied to the subtractor 524 is the value 1 from the register 525. The output of the subtractor which represents the arbitrary intensity signal minus 1 is supplied to the difference comparator 526. A zero signal from the subtractor 524 indicates that the value stored in the arbitrary intensity memory was 1 and therefore an intensity calculation must be made. Therefore, a zero signal from the subtractor 524 causes an output on the =0 line of the difference comparator 526 which provides an enabling signal to selection gates 500 to calculate $b_1$, $b_2$ and $b_3$. If the signal stored for the triangle is greater than one, meaning that an arbitrary intensity level has been selected for that triangle the output of the subtractor will not equal zero. Therefore, the ≠0 output of the difference comparator 526 will be energized to enable AND-gates 527 and 528 to pass zeros through to the OR-gates 532 and 533 making the values of $b_1$ and $b_2$ zero. The ≠0 output also enables the AND-gate 529 to supply the arbitrary intensity value through the OR-gate 534 as $b_3$. If the calculation is needed, then the =0 line enables the AND-gates 538, 537 and 536 to pass $b_1$, $b_2$ and $b_3$ signals from the intensity constants calculator 515 through the OR-gates 534, 533 and 532 respectively. The arbitrary intensity which may be provided in the arbitrary intensity memory 518 may be utilized to make a particular portion of the object stand out at a constant intensity. Since $b_1$ and $b_2$ are made zero, the intensity at that point will be just equal to $b_3$. Alternatively, a portion of the object may be made to stand out by increasing or decreasing the intensity level and still provide the variations along the scan line and between successive scan lines. This can be done by adding an arbitrary value into the A and B signals supplied to the normalization calculator.

Figure 23B:
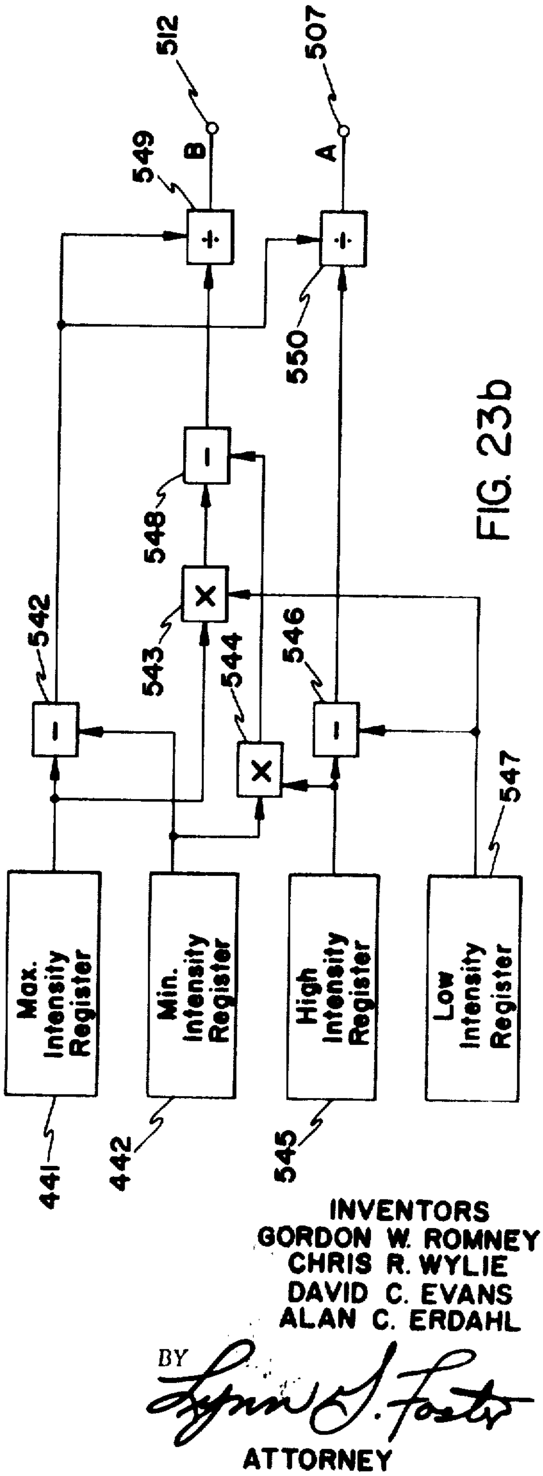
FIG. 23*b* is a schematic diagram of the creation of the signals A and B which are supplied to the circuit of FIG. 23*a*.

Referring to FIG. 23*b*, signals A and B which are supplied to terminals 507 and 512 for use in the normalization intensity calculator 502 will be described. The output of the max intensity register 441 is connected to a subtractor 542 and a multiplier 543. The output of the min intensity register 442 is connected to the subtractor 542 and a multiplier 544. The output of a high-intensity register 545 is connected to the multiplier 544 and a subtractor 546. The output of a low-intensity register 547 is connected to the subtractor 546 and the multiplier 543. The outputs of the multiplier 544 is subtracted from the output of the multiplier 543 in a subtractor 548. The output of the subtractor 542 is then divided by the output of the subtractor 548 in a divider 549. The output of the subtractor 542 is also divided by the output of the subtractor 546 in a second divider 550. The outputs of the two dividers 549 and 550 are connected to the terminals 507 and 512 which supply the signals B and A, respectively.

In operation, the min intensity value is subtracted from the max intensity value in the subtractor 542 and fed to the dividers 549 and 550. The low value is subtracted from the high value in the subtractor 546 and divided into the difference between the max and min signals in the divider 550 to produce the A signal. The max value is multiplied times the low value in the multiplier 543. The min value is multiplied by the high value in the multiplier 544 and subtracted from the max times the low output of the multiplier 543 in the subtractor 548. The difference between the max and min signals is divided by the result of this multiplication and subtraction in the divider 549 to provide the B-signal.

THE SHADER

The shader is the remainder of the intensity calculator which determines the manner in which the triangles determined to be visible are displayed. The intensity calculator, as stated previously is a significant feature of this invention.

Figure 24:
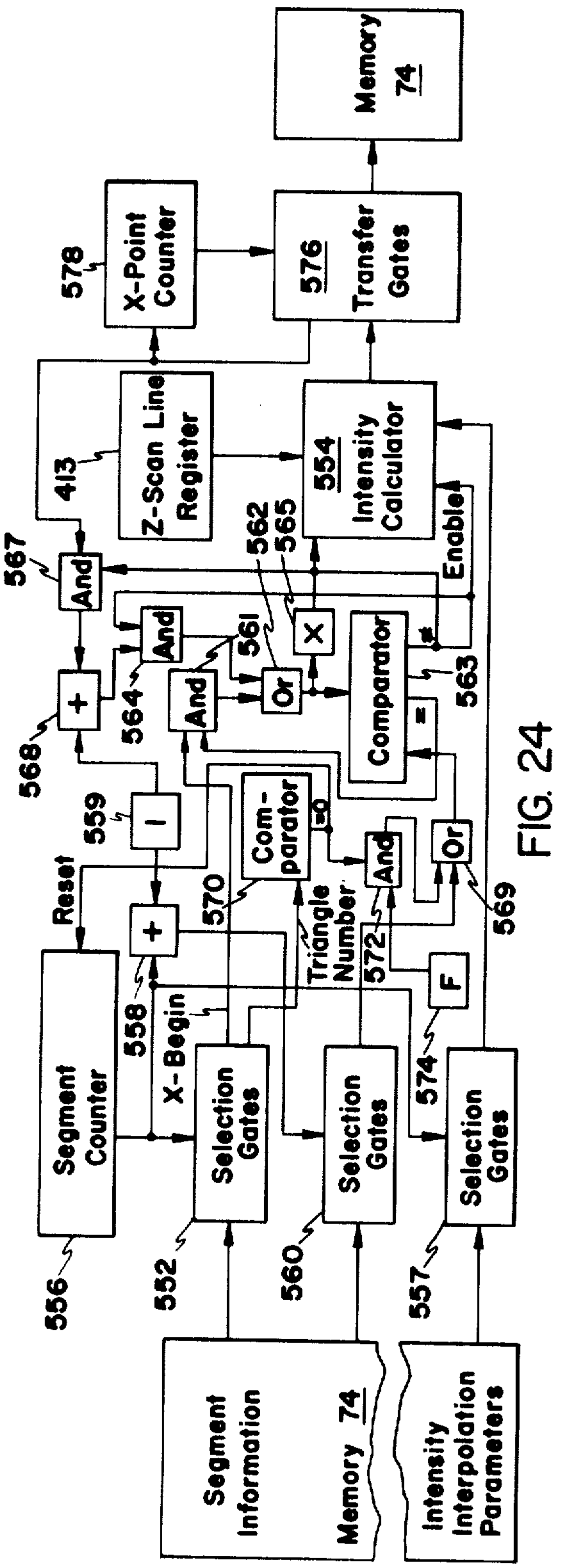
FIG. 24 is a schematic diagram of the shader according to the present invention.

Referring to FIG. 24, selection gates 552, which are similar to previous selection gates described, are connected to the segment information portion of the memory 74 to retrieve the X-begin point and triangle numbers of the visible triangles. A segment counter 556 controls the selection gates 552 and is connected thereto. The output of the segment counter is also connected to selection gates 557 which select the appropriate intensity interpolation parameters $b_1$,$b_2$, and $b_3$ and supplies them to an intensity calculator 554. The output of the segment counter is also connected to an adder 558 which is also connected to the output of a register 559 in which the value "1" is stored. The output of the adder 558 controls the selection gates 560 to retrieve the X-begin points of the succeeding triangle to that retrieved by the selection gates 552. The output of selection gates 552 is connected to one input of an AND-gate 561.

The output of the AND-gate 561 is connected to one input of an OR-gate 562 the output of which is connected to a comparator 563. The output of the comparator 563 has an = output that is connected to the second input of the gate 561 and a ≠output which is connected to one input of an AND-gate 564. The output of the AND-gate 564 is connected to the second input of the OR-gate 562. The ≠ output of the comparator 563 also supplies an enable signal to the intensity calculator 554. The output of the OR-gate 562 is also connected to an x-register 565 the output of which is connected to the intensity calculator 554 and to one input of an AND-gate 567. The output of the AND-gate 567 is connected to an adder 568 which is also connected to the register 559. The output of the adder 568 is connected to a second input of the AND-gate 564. The output of selection gates 560 is connected to one input of an OR-gate 569, the output of which is connected to the comparator 563. Selection gates 552 also provide the triangle number to a comparator 570. The comparator has an = 0 output which is connected to one input of an AND-gate 572 and is connected to reset the segment counter 556. The second input of the AND-gate 572 is connected to a register 574 which has a value F stored therein. The output of the AND-gate 572 is connected to a second input of the OR-gate 569.

Intensity calculator 554 is the same as distance calculator 412 of FIG. **20*b*. The only difference is that instead of supplying the signals $a_1$, $a_2$ and $a_3$, the constants $b_1$, $b_2$ and $b_3$ are supplied. The Z-scan line register 413 is also connected to the intensity calculator 554. The output of the intensity calculator 554 is connected to transfer gates 576 which puts the calculated intensity into the appropriate position of memory 74. The transfer gates 576 are controlled by an X-point counter 578 which is incremented from the transfer gates 576. The output from transfer gates 576 is connected to a second input of the AND-gate 567**.

In operation selection gates 552 are controlled by the segment counter to retrieve the proper X-point for the intensity calculation. The output of the segment counter is also incremented by "1" in the adder 558 to control selection gates 560. These selection gates 560 provide the X-point of the succeeding triangle to the triangle being retrieved by selection gates 552. The selection gates 557 are controlled by the output of the segment counter to provide the proper interpolation parameters $b_1$, $b_2$ and $b_3$ for the triangle being examined. The X-points retrieved by the selection gates 560 is fed through the OR-gates 569 to the comparator 563. The X-begin point supplied by selection gates 552 is connected through the AND-gate 561 and OR-gate 562 to the comparator 563.

Assuming a new X-begin point has been provided, the comparator 563 will have an equal output which enables the AND-gate 561 to pass the X-begin point through the OR-gate 562 to the comparator. The output of the OR-gate is also stored in the X-register 565, the output of which is connected to the intensity calculator 554 and through the AND-gates 567 to the adder 568. For each scan line the segment information is zero once all the triangles have entered and exited and, therefore, once the final triangle X-point has been supplied through the comparator 563, the triangle number zero will be fed into the comparator 570. When the =0 output is energized, the AND-gate 572 is enabled to pass the value F through the OR-gate 569 to the comparator 563. The value F will be the number of X-points which are being displayed along any scan line. This signal will then be compared to the input signal which will be described hereinafter.

The value F is supplied to cause the intensity calculator to continue on to the end of the scan line. The comparator =0 output also resets the segment counter 556 to cause the selection gates 552, 557 and 560 to retrieve the next scan line segment from the memory 74. If the X-point fed from the selection gates 552 is not equal to the X-begin point from the selection gates 560, the comparator will have ≠0 output signal which enables the AND-gate 564 to pass information from the adder 568 through the OR-gates 562 to the comparator 563 and the X-register 565. The value stored in the X-register is enabled to pass through the AND-gate 567 once the transfer gates indicate that the calculation for the previous X-point has been stored in the memory 74. The value "1" is added to the value in the X-register and supplied to the comparator 563. This value is then placed in the X register which value is supplied to the intensity calculator 554.

Essentially, the X-begin point is incremented by "1" until it is equal to the X-begin point of the succeeding triangle. At that point a new X-begin point is operated on. The intensity calculator, therefore, calculates intensity at the X-begin point and then incrementally at each increment X utilizing the intensity interpolation parameters of the triangle under investigation. Once the next triangle is reached, new interpolation parameters are supplied to the intensity calculator, and the process is repeated. The signals of the output intensity calculator are transferred to the appropriate location in memory 74 by the transfer gates 576 under the control of the X-point counter which received count signals from the transfer gates each time an intensity value is stored.

The above description of the individual blocks of FIG. 7 are exemplary of circuits capable of producing the desired operations. Other circuits capable of producing these functions will be readily apparent to those skilled in the art and may be used alternatively. Furthermore, it is noted that the processing of the signals through the circuits may in some instances be accomplished in different sequences as well as simultaneously. In addition the sequencing of a particular frame forming an object need not be completed before the next frame is begun.

AN ALTERNATIVE AND PREFERRED EMBODIMENT

General

Specific reference is now made to FIGS. 25*a* through 30*f*, which generally relate to a presently preferred system embodiment 700 of this invention and specifically depict diagrammatic representations of the basic geometrical relations applicable, schematic representations of the preferred hardware and schematic representations of various procedures which take place within selected hardware units.

Figure 27:
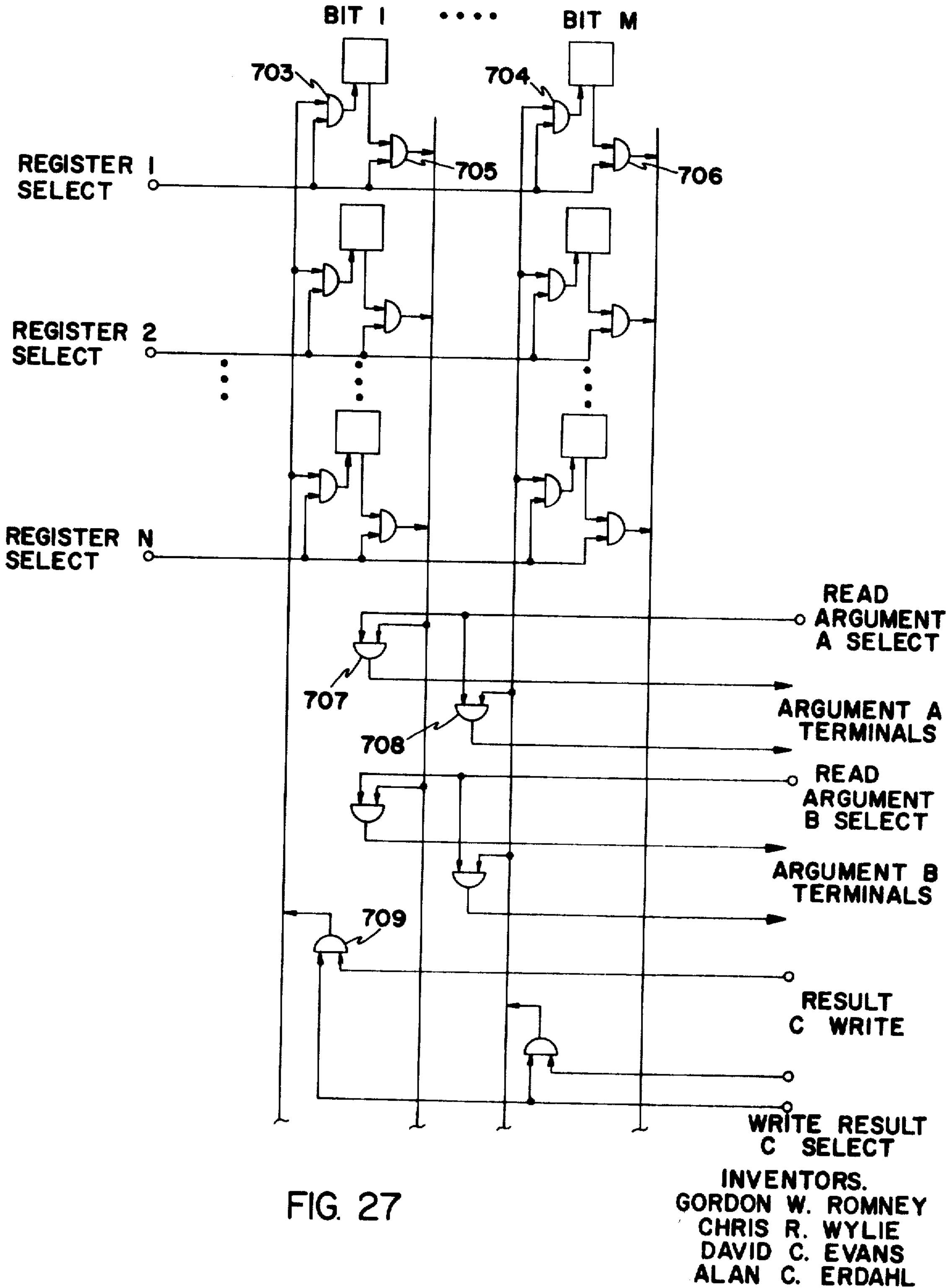
FIG. 27 illustrates the circuit relationships between the control unit and any register of FIG. 26.
Figure 28A:
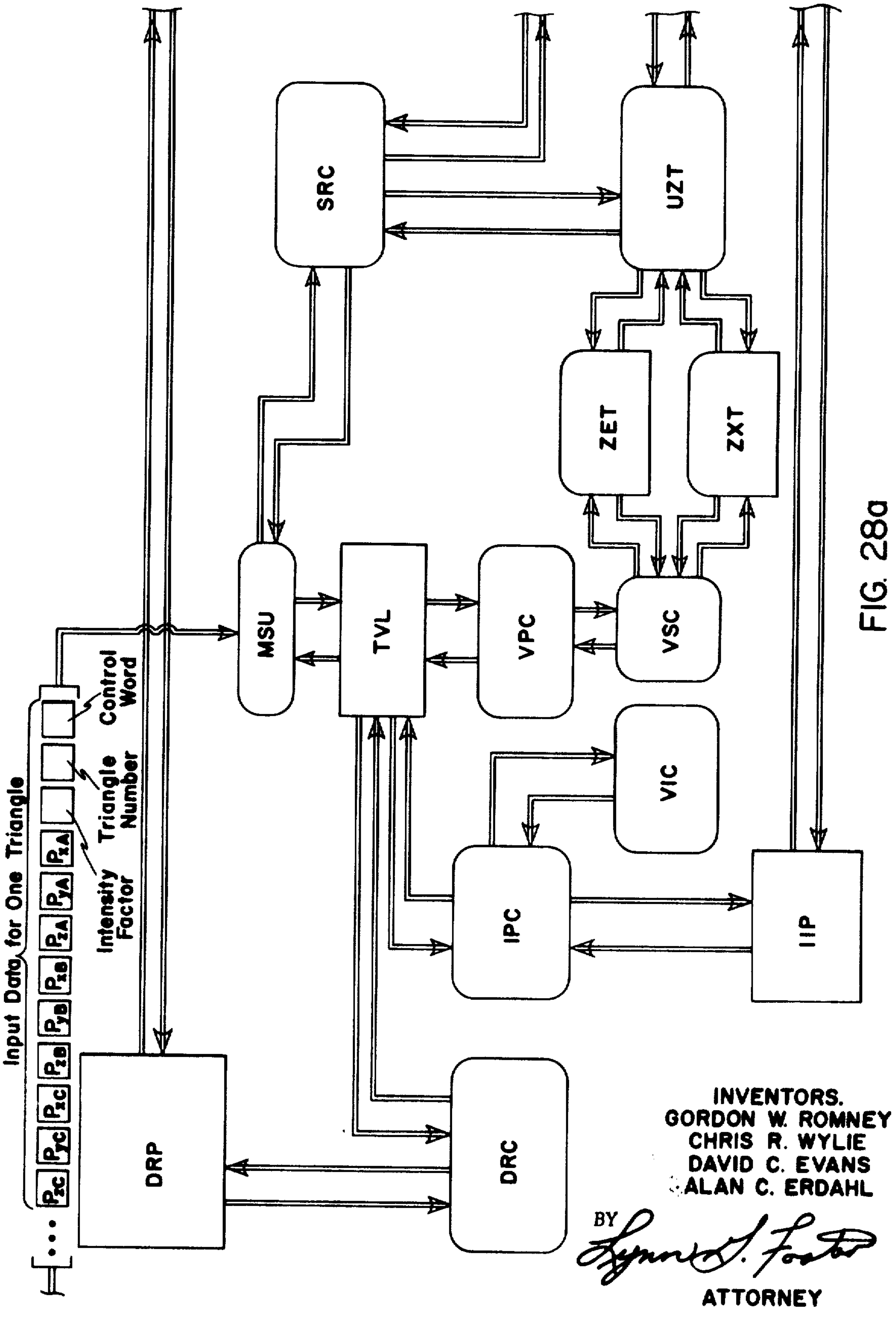
FIGS. 28*a* and 28*b* taken together comprise a detailed block diagram of the last-mentioned preferred embodiment, FIGS. 28*a* and 28*b* being related one to another as shown in FIG. 28.
Figures 28, 28B, 29:
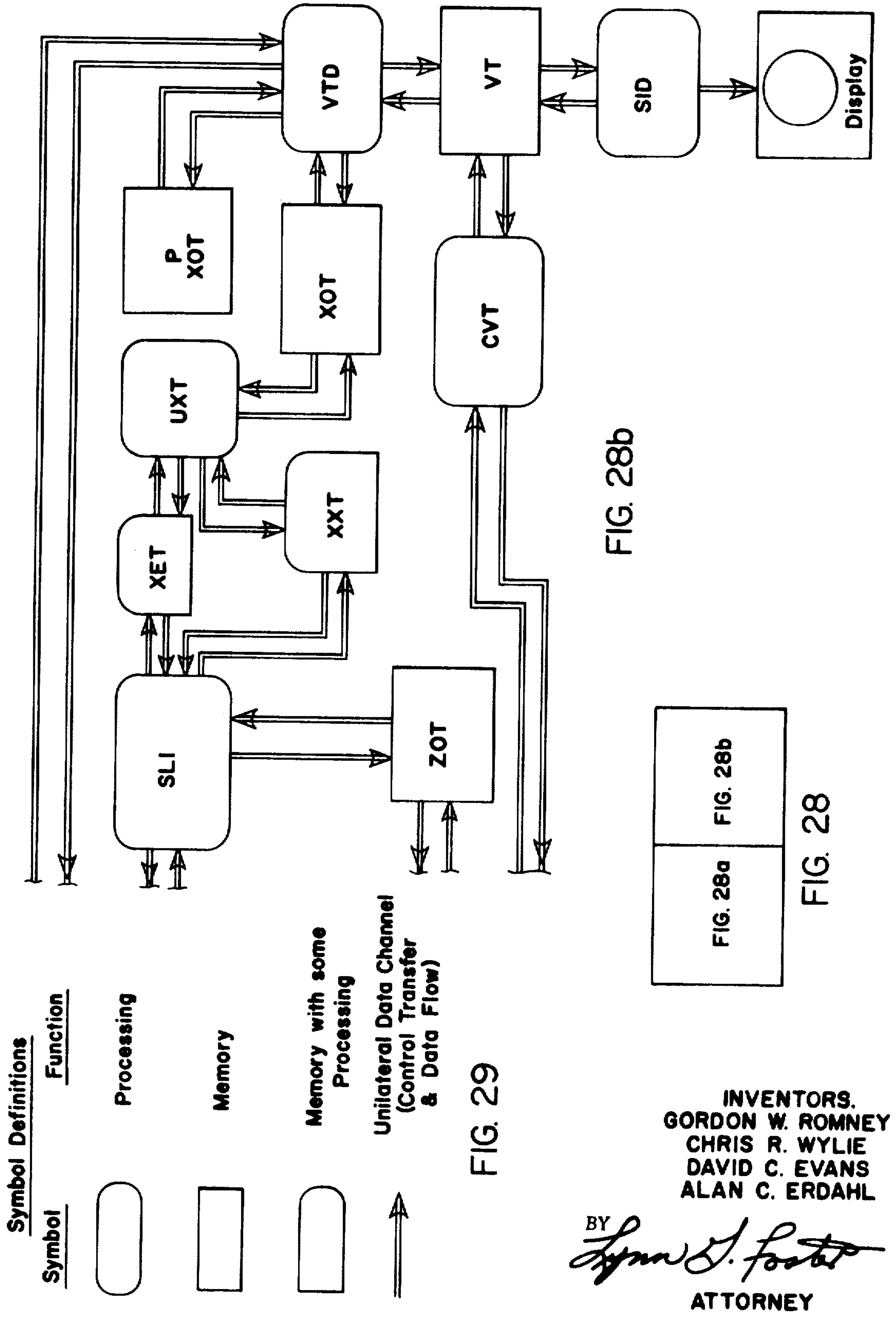
FIG. 29 comprises definitions of the symbols used in FIGS. 28*a* and 28*b*.

The overall presently preferred system 700 is illustrated in FIGS. 28*a* and 28*b*, which relate as shown in FIG. 28. The symbol identification of FIGS. 28*a* and 28*b* appears in FIG. 29. All of the blocks in FIGS. 28*a* and 28*b* represent processors or memory of essentially identical construction, which construction is typified in FIGS. 26 and 27 and which will be described in greater detail hereinafter.

The advantage of the system 700 should be briefly pointed out. A cost savings in design accrues because only one fundamental logic construction is relied upon. Manufacturing costs are also substantially reduced because the mentioned construction is nonspecialized and standardization of a few component types can readily be established for the one ultimate product. Moreover, the system 700 is comparitively fast in operation in relation to the speed of the components thereof because various register transfer processors which makeup the system simultaneously operate upon different frames of data, which frames are, of course, at different stages. In short, fast results are obtained at relatively low capital and operational costs.

Figures 25A, 25B:
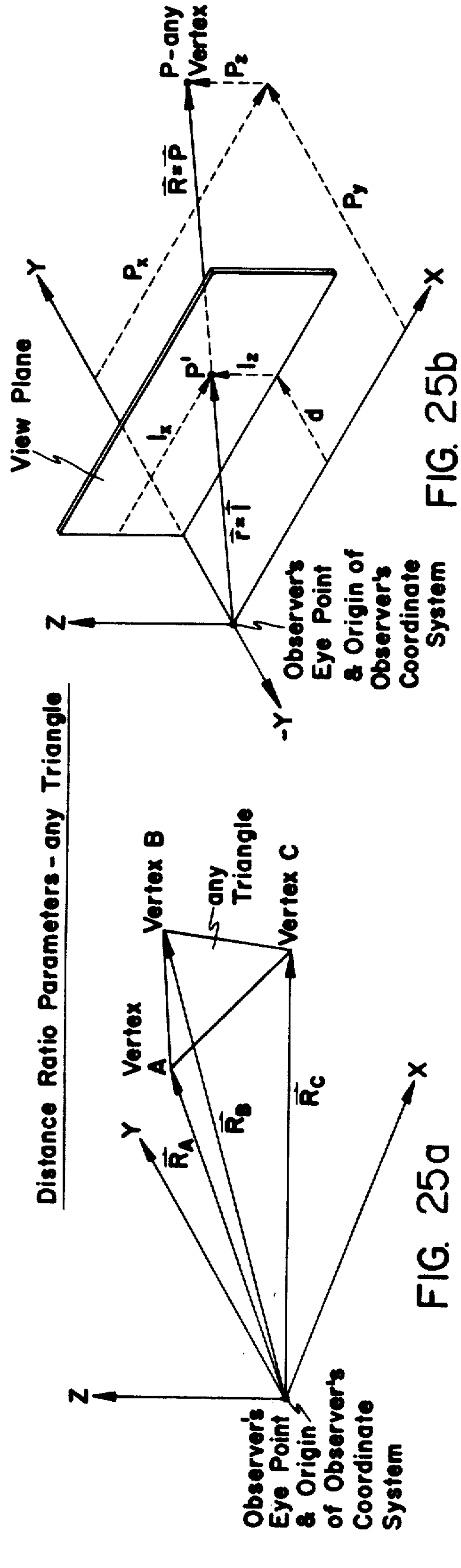
FIGS. 25*a*–*d* diagrammatically illustrate a space and intensity relationship utilized in describing another and a presently preferred embodiment of the present invention.

Fore theoretical simplicity, although differing somewhat from the earlier theory portion of this specification, the view point is chosen coincident with the origin of the observer's coordinate system so that the relationships illustrated in FIG. 25*a* prevail for any and all triangles forming part of a three-dimensional object in a manner heretofore described. Likewise, FIG. 25*b* depicts quantities which define the location of 3-D vertex point P, which is any triangle vertex, and the location of 2-D vertex point P′ which is the projection of point P upon the view plane, in relation to a coordinate system wherein the origin and eye point are coincident.

The viewplane in FIG. 25*b* is parallel to the X-Z plane at a distance "*d*" from the origin in the Y-direction. Remembering earlier derivations, $(w=r_v/R_v)$, the ratio of the image vector $\vec{r}$ on the view plane to the vector $\vec{R}$ on the 3-D object. Also, $(1/w)=a_1I_x+a_2I_z+a_3$ Later, by comparing the $(1/w)$'s for each triangle to be considered at a given X-intercept point, the triangle closest to the view point is easily found. The closest triangle is, of course, the triangle which is visible at the mentioned X-intercept point. It should be apparent that when the $(1/w)$'s for such a set of triangle are compared, the largest $1/w$ identifies the visible triangle. The terms $a_1$, $a_2$ and $a_3$ have been previously defined and are commonly referred to as "distance ratio parameters or triangle equation constants."

Figures 25C, 25D:
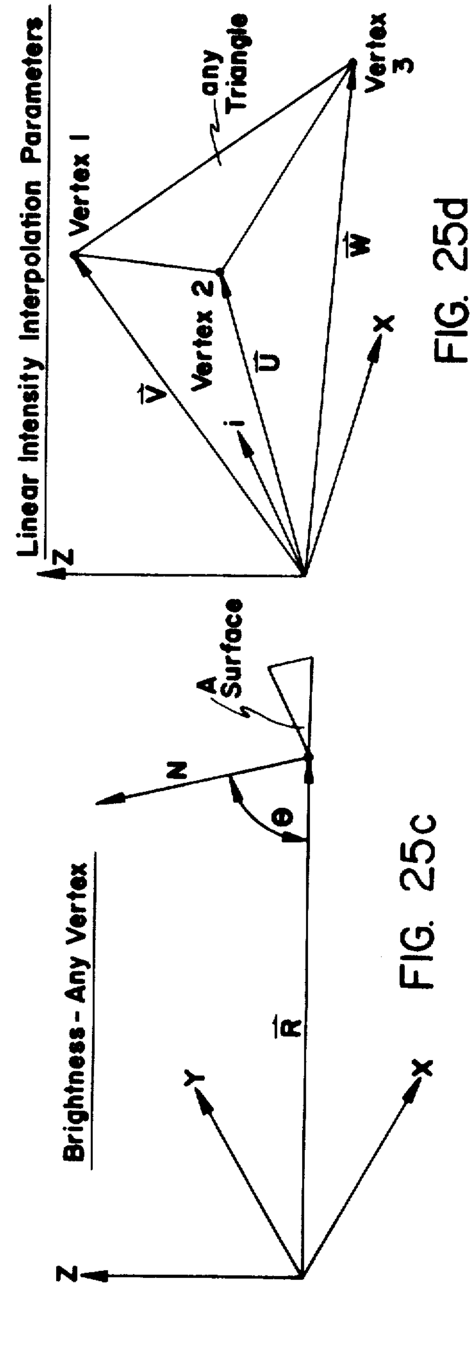
Figure 26:
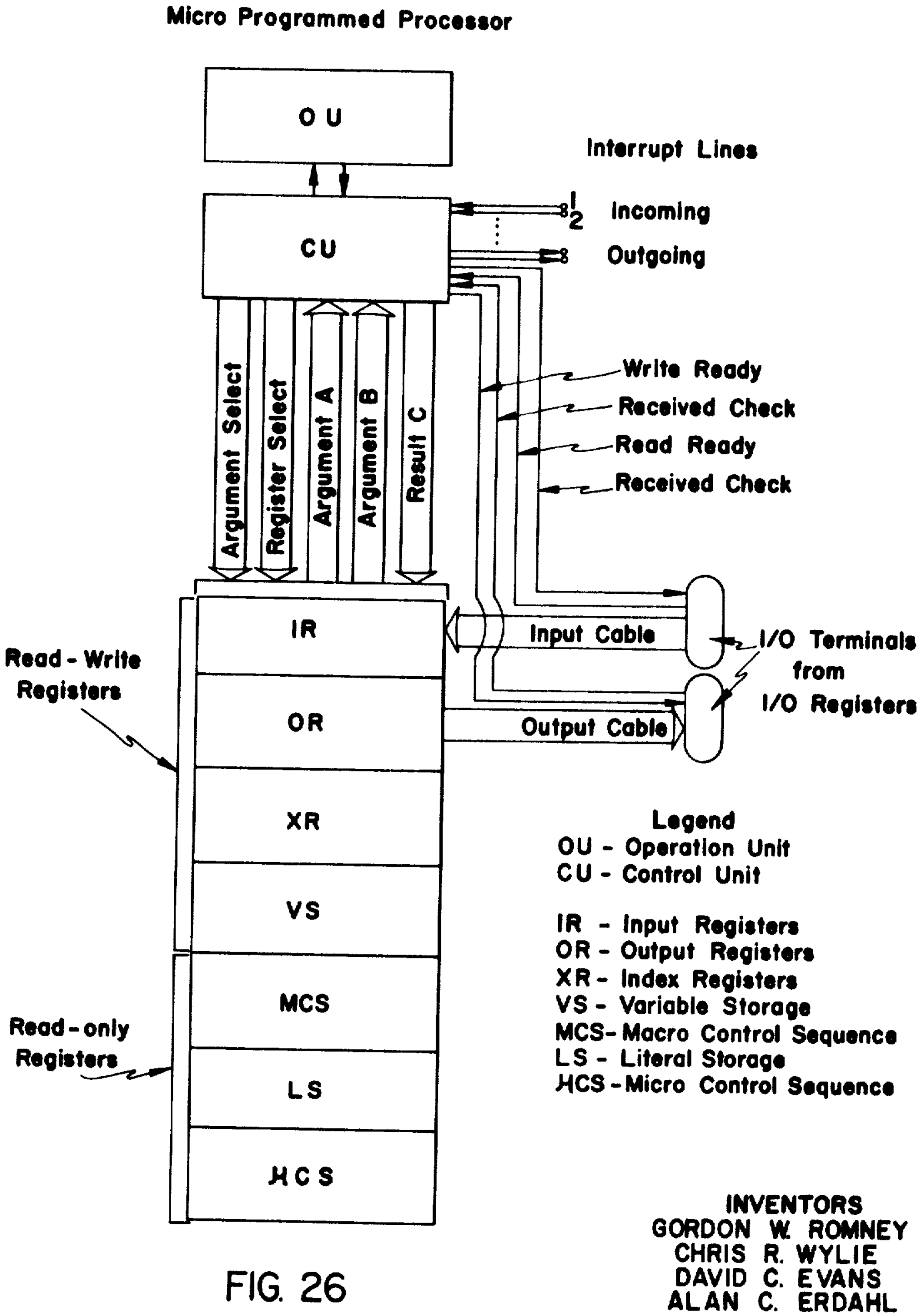
FIG. 26 is a block diagram of a presently preferred microprogrammed processor, comprising the principal design of the last-mentioned embodiment.

In order to better understand the manner in which the apparent brightness at any triangle vertex is calculated, reference is now made to FIG. 25*c*. Here, $\vec{R}$ is the positioned vector to any vertex, $\vec{N}$ is the vector normal to the plane of the triangle and $\theta$ is the angle between the vectors $\vec{R}$ and $\vec{N}$.

The expression for intensity at any vertex P is $$i=\frac{\cos\theta}{\vec{R}\cdot\vec{R}}=\frac{\vec{R}\cdot\vec{N}}{\vec{R}\cdot\vec{R}|\vec{R}|\,|\vec{N}|}$$

The intensities at the vertices of a triangle are used to find the intensity interpolation parameters (heretofore defined and designated as $b_1$, $b_2$ and $b_3$) which in turn are used to find the intensity over the interior of the triangle. While linear interpolation has been selected, use of nonlinear interpolation is not precluded.

To better understand the intensity interpolation process, reference is now made to FIG. 25*d*. Note that the coordinate system is a mixed coordinate system showing the heretofore defined X- and Z-axes and a depth axis consisting of the apparent brightness or intensity *i*.

The three point formula for the plane of FIG. 25*d* determined by $\vec{U}$, $\vec{V}$, $\vec{W}$, is $$\begin{vmatrix} X & i & Z & 1 \\ U_X & U_i & U_Z & 1 \\ V_X & V_i & V_Z & 1 \\ W_X & W_i & W_Z & 1 \end{vmatrix}=0$$

Expanding and rearranging this we obtain $$i=b_1X++b_2Z+b_3$$

MICRO PROGRAMMED ($\mu$P) PROCESSOR

As mentioned, the digital computing system 700 is comprised of a number of interrelated $\mu$P processors 702 of essentially identical design. See FIG. 26. Note that FIG. 26 comprises a "Legend" identifying the components of the processor $\mu$P 702, one component of which is control unit CU. The $\mu$P processor 702 also comprises typical read-only registers for storage of the macro control sequence MCS, literal storage LS and micro control sequence $\mu$CS. Also, $\mu$P processor 702 comprises typical read-write registers including input registers IR, output registers OR, index registers XR and variable storage VS.

The control unit CU is of a conventional design and functions to fetch instructions from the read-only sequence registers namely the macro control sequence MCS and the micro control sequence $\mu$CS. The control unit CU includes at least two program counters (not shown) one for micro control sequence CS and the other for the macro control sequence MSC. The number of program counters however may vary and will comprise a sufficient number to conveniently step through the subcontrol sequencers stored in MCS and $\mu$CS, the macro and micro control sequences.

As stated previously, two types of registers are included in the micro programmed processor 702. Read-only registers macro and micro control sequences MCS and $\mu$CS and Literal Storage LS. These registers function as the instruction storage units wherein the precise functions desired to be performed are stored. Specifically, each of the control sequencers MCS and $\mu$CS comprise a plurality of individual function segments. Each function segment is a string of control instructions for the execution of a given function such as divide, read, write, sort, etc. More specifically, micro control sequence $\mu$CS provides the instructions for background operations such as fetching and interpreting the instructions stored in the macro control sequence MCS, scanning interrupt lines which are fed to the control unit CU and initiating interrupt function segments. The macro control sequence MCS contains function segments which direct the actual functions desired such as arithmetic and logical operations, indexing and interrupt processing.

All of the read-write registers have the capabilities to function as index registers and accumulators as well as temporary storage registers. The read-write storage registers, input IR, output OR, index XR and variable storage VS provide the necessary storage for receiving input signals and storing the results once the signals have been operated on as controlled by the macro control sequence MCS.

The interrupt lines are connected to the control unit and interrupt the particular function being performed by the micro program processor 702 to initiate another function segment to be utilized. Once the other function is finished, the processor returns to the interrupted function segment. Micro control sequence MCS establishes a priority for the interrupt lines so that there is a clear choice if several interrupt lines are simultaneously activated.

Referring to FIG. 27, the typical connections of the control unit to various registers are illustrated. The connections shown illustrate only two arguments; however, additional arguments may be incorporated. A register select line exits for each register of a processor. The particular register select line energized by a decoder (not shown) chooses the register to be used. For instance, a signal on register select line 1 enables AND-gates 703 and 704 to transfer the information stored in the bits 1 through M which comprise a particular register. The signal also energizes AND-gates 705 and 706 to record new information in the register. The remaining register select lines are identical in structure to the register select line 1.

The read argument select lines control which line of the control unit CU will be utilized to transfer information from the register. For example, read argument A select line enables AND-gates 707 and 708 to enable information stored in the register bits 1 through M to pass through the AND-gates 707 and 708 to the argument A terminals. The read argument B select line is identical to the read argument A select line. The write result C-select line enables the AND-gate 709 to write the result of the function segment being transferred on result C-write line into the register bits 1 through M of the selected register.

For convenience the processing and storage units described hereinafter are listed below with their abbreviations and the corresponding units, where such exist to the first described embodiment.

| Abbreviations | Processors and storage units | Corresponding units of first embodiment |
|---|---|---|
| MSU | Master Scheduling Unit | |
| VPC | Viewplane Projection Calculation. | Mapper and Edge Slopes Calculator. |
| VSC | Vertex Sort Calculation | Vertices Sorter. |
| DRC | Distance Ratio Parameter Calculations. | Traingle Equat/on Constants Calculator. |
| IPC | Intensity Parameters Calculation. | Intensity Interpolation Parameter Calculator. |
| VIC | Vertex Intensity Calculations | Vi Calculator. |
| SRC | Scan Ray Controller | |
| UZT | Update Z-Occupied Table | |
| SLI | Scan-Line/Triangle Intersections. | |
| UXT | Update X-Occupied Table | |
| VTD | Visible Triangle Decision | Sequencer-Comparator and Hidden Line Calculator. |
| CVT | Convert Visible Table to Intensities. | Shader. |
| SID | Send Intensities to Display | A-D Converter. |
| ZET | Z-Entry Table | Z-Begin Point Resigter. |
| ZXT | Z-Exit Table | Z-End Point Register. |
| XET | X-Entry Table | X-Begin Point Register. |
| XXT | X-Exit Table | X-End Point Register. |
| TVL | Triangle Storage Vertices List | Memory 74. |
| IIP | Intensity Interpolation Parameters. | Do. |
| DRP | Distance Ratio Parameters | Do. |
| ZOT | Z-Occupied Table | List Z Triangle Name Register. |
| XOT | X-Occupied Table | List X-Triangle Name Register. |
| VT | Visible Table | Memory 74, |

DETAILED BLOCK EMBODIMENT UTILIZING MICRO PROGRAMMED PROCESSORS 702

A system for utilizing the micro programmed processors 702 as described above to perform the novel methods of the present invention is shown in FIGS. 28*a* and 28*b*. The relationship of the two Figures is shown in FIG. 28 as indicated previously. As stated with respect to the micro programmed processors 702, they may be utilized to perform various function. A legend of the symbols utilized in FIGS. 28*a* and 28*b* to indicate the type of function which the block is performing at the various location is listed in FIG. 29. The information is fed to a master scheduling unit MSU from the object creation apparatus. The form of the information is shown in FIG. 28*a* as consisting of the location of three vertices of a triangle with respect to the three-dimensional coordinate system, an intensity factor, a triangle number and a control word. The master scheduling unit MSU is connected to a triangle storage vertices list storage TVL and to a scan ray controller processor SRC. The triangle storage vertices list storage TVL is connected to a view plan projection calculation processor VPC, an intensity parameters calculation processor IPC and a distance ratio parameter calculation DRC. The view plane projection calculation processor VPC is connected to the vertex sort calculation processor VSC, the output of which is connected to Z entry table and Z exit table storages and processors ZET and ZXT. These are in turn connected to an update Z-occupied table processor VZT which is also connected to the scan ray controller processor SRC.

The intensity parameters calculation processor IPC is connected to a vertex intensity calculation processor VIC and to an intensity interpolation parameters storage IIP. The distance ratio calculator DRC is connected to a distance ratio parameters storage DRP.

Referring to FIG. 28*b*, the update Z-occupy table processor VZT is connected to a Z occupy table storage ZOT, which in turn is connected to a scan line triangle intersection processor SLI. The scan line triangle intersection processor SLI is connected to X-entry table and X-exit table processors and storages XET and XXT. These two units are connected to an update X-occupied table processor VXT which is connected to an X-occupied table storage XOT. The distance ratio parameters storage DRP is connected to a visible triangle decision processor VTD which is also connected to a previous X-occupied table storage PXOT and the X-occupied table storage XOT. The output of the intensity interpolation parameters storage IIP is connected to a converted visible table processor CVT which is connected to a visible table storage VT as is the visible triangle decision processor VTD. The visible triangle storage VT is connected to a send intensities to display processor SID which is connected to the display device.

All of the connections shown between the various units are shown as double transfer signals. Where information is fed from one processor unit to another and then back again, both of these transfer lines are utilized. However, not all are so utilized. They are shown in the Figures to illustrate the standardization of the units and the standardization of the connections therebetween.

The operation of the system 700 will now be described with references being made to FIGS. 28 and 30 *a* through *f*. Sets of input signals representing the vertices of a triangle, the intensity factor which is the arbitrary intensity value as described previously, the triangle number and the control word are transferred by the master scheduling unit MSU information to the triangle storage vertices list TVL. The master scheduling unit MSU also directs the distance ratio parameters calculation processor DRC, the intensity parameter calculation processor IPC and the view plane projection calculation processor VPC to initiate their function.

The intensity parameters calculation processor IPC calculates the intensity parameters $b_1$, $b_2$ and $b_3$ and stores them in the intensity interpolation parameters memory IIP. It does this in conjunction with the vertex intensity calculation processor VIC which calculates the intensity at each of the three vertices of the triangle.

The distance ratio parameters calculation processor DRC calculates the distance ratio parameters $a_1$, $a_2$ and $a_3$ and stores them along with the I/*w* in the distance ratio parameters storage DRP.

Figures 30A, 30B, 30C, 30D:
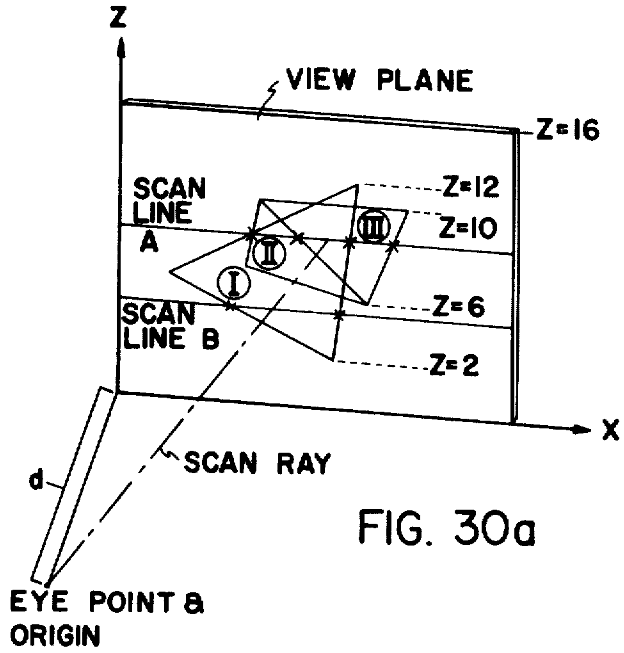
FIGS. 30*a*–*f* are diagrammatic illustrations of the way in which entry tables, exit tables, and visible tables are constructed by the system depicted in 28*a* and 28*b*.

The sorted vertices of the triangle from the vertices sort calculations processor VSC are fed to the Z-entry table ZET and the Z-exit table ZXT. As an example of this the three triangles mapped onto the view plane illustrated in FIG. 30*a* are stored in the appropriate Z value locations. Z-entry table ZET is diagrammatically illustrated in FIG. 30*b*. The triangles are also stored in the proper Z value location of the Z-exit table ZXT as illustrated in FIG. 30*c*. Specifically, from FIG. 30*a* triangle III enters at Z=10 and therefore III is stored in the "10" location of the Z-entry table. Triangle III exists at the scan line Z=III is stored in the "6" location of the Z-exit table.

The Z-exit tables and Z-entry tables, ZET and ZXT, are processed through the update Z-occupy table processor UZT under the control of the scan ray controller SRC. The update Z occupied table processor UZT transfers all those triangles entering and exiting the same scan line into the Z-occupied table ZOT as diagrammatically illustrated in FIG. 30*d*. The scan line triangle intersection processor SLI examines the Z-occupied table ZOT and determines the X-entry and X-exit intersections of the scan line with each of the triangles in the Z-occupied table ZOT. The X-entry tables and X-exit tables are similar to the Z-entry and exit tables as diagrammatically illustrated in FIG. 30*b* and FIG. 30*c*. Information is passed to the X-occupied update table which is similar to the Z-occupied table ZOT illustrated in FIG. 30*d*. The x-occupied table is updated through the update X-occupied table processor under the control of scan line triangle intersection processor SLI to store those triangles that the current scan ray intersects.

Previous X-occupied table storage PXOT contains the information on the X-intercepts for the previous scan line. This is supplied along with the present information in the X-occupied table XOT to the visible triangle decision processor VTD. The distance ratio parameters $a_1$, $a_2$ and $a_3$ are also supplied from the distance ratio parameter storage unit DRP to the visibility triangle decision VTD. The visible triangle decision processor VTD compares the present X-occupied table XOT with the previous X-occupied table PXOT and if the two are the same, the visibility of the triangles is determined as discussed previously. If they are not the same, then the relative distance factors $1/w$, described previously, are determined using the distance ratio parameters. These factors are then used to determine which triangle is closest to the eye point.

Figure 30E:
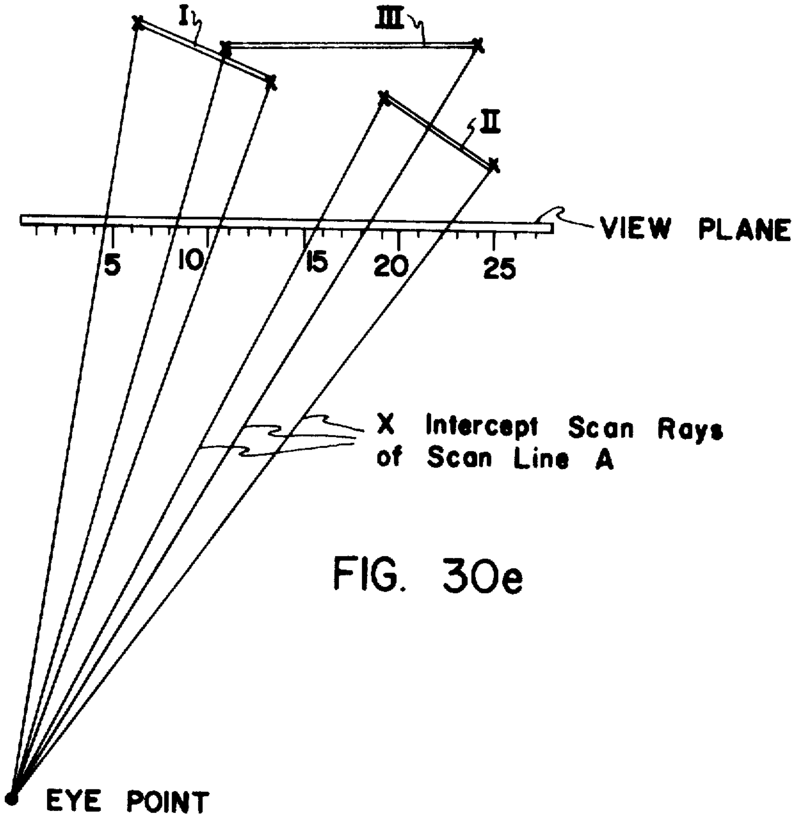
Figure 30F:
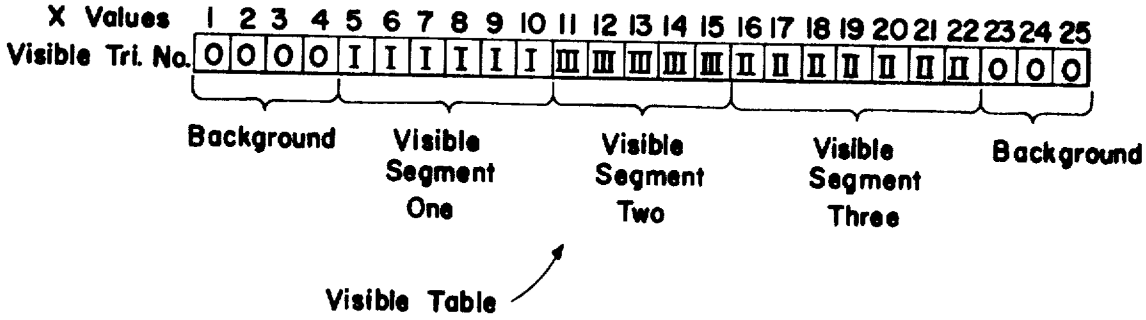

The results of this determination are stored in the visible table storage unit VI which is diagrammatically illustrated in FIG. 30*f* with reference to the exemplary scan line shown in FIG. 30*e*. For example, from the intercept 5 through 10 triangle I is visible and therefore an I is placed in the X-values 5 through 10. From 11 to 15, triangle III is visible: therefore, III's are stored in those X-locations.

The triangle numbers stored in the visible table VT are then converted to the intensity values in the converted visible table intensities processor CVT which is supplied the intensity interpolation parameters from the intensity interpolation parameters storage IIP. These intensity values are stored in the visible table VT. Display processor SID then accesses the intensity values stored in the visible table VT and converts them into useful form for controlling the display.

It should be noted that various portions of the processing may be carried on simultaneously and the next frame calculations may be initiated before the preceding frame is completed.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A method for generating a perspective representation of a three-space object on a two-space display by
   - recording sets of electrical signals of input data representative of locations of surfaces of said object;
   - ordering the sets in relation to the two-space characteristics of the display;
   - establishing visual characteristics for the surfaces defined by said sets comprising a visually discernible range of surface brightness resembling the appearance of the three-space object when illuminated by a specified light source; and
   - modifying the brightness of the display of each of said surfaces according to the visual characteristics.

2. A method for generating and displaying a shaded perspective image of a three-dimensional object upon a raster scan display device comprising:
   - dividing input data representative of the three-dimensional object to be displayed into units defining surface portions of the object;
   - converting the data units to represent the projection of the surface portions on a chosen two-dimensional view plane;
   - sorting the converted data units according to the scanning pattern of the display device;
   - using the sorted data units to assign values which control the appearance of various surfaces of the image ultimately displayed;
   - using the sorted data units to calculate values which control the light intensity of various surfaces of the image ultimately displayed as a function of the distance from a predetermined point; and
   - regulating the intensity of the scanning beam of the display device in relation to the calculated control values.

3. A method for generating a perspective view of a three-dimensional object on a two-dimensional display by
   - recording sets of electrical signals of input data representative of locations of surface areas of said object;
   - ordering said sets according to the scanning pattern of the display;
   - determining which of the surface areas defined by the sets are to be displayed according to the desired orientation of the object; and
   - modifying the intensity of the display in accordance with those surface areas determined to be displayed in the order established as a function of the distance of a displayed surface area from a predetermined point.

4. A method for generating a perspective picture of a three-space object on a two-space display by recording groups of electrical signals of data representative of the three-space locations of the surface regions of said object in regard to a selected set of reference relationships including the location of an observer;
   - converting the groups to represent the projections of the surface regions defined by the units onto a view plane defined by two-space relationships;
   - sorting the converted groups in accordance with the scanning pattern of the display;
   - calculating the value of a monotonic function of the line of sight distance along a scan ray from the observer to surface regions which are aligned one behind another in whole or in part;
   - comparing the calculated values to determine which surface region is closest to the observer and therefore visible; and
   - modifying the intensity of the scanning beam of the display in accordance with determined visual characteristics of all visible surface regions defined by the groups in the order established by the sort.

5. A method for generating a perspective image of a three-dimensional object on a two-dimensional display by recording electrical signals of data representative of locations, orientations and characteristics of surface portions of said object;
   - ordering data in the order in which the surface portions defined by the units initially enter at successive scan lines of the display;
   - ordering data concerned with surface portions entering at each scan line in the order in which the surface portions enter along that scan line; and
   - modifying the brightness of the display along each scan line in accordance with data representative of locations, orientations and characteristics of the entering surface portions to be displayed in the order in which the surface portions enter that scan line.

6. A method of processing signal data descriptive of an object in terms of object surface areas to produce a shaded perspective picture of the object upon a display;
   - removing from consideration the signal data descriptive of all portions of the surface areas which are to be behind other surface areas in the picture;
   - calculating a data value for the apparent brightness of only a few brightness control points on the surface areas not eliminated from consideration;
   - interpolating additional data values from the calculated brightness data values for locations between the brightness control points on said last-mentioned surface areas; and using the calculated and interpolated brightness data values to regulate the shading accorded the perspective picture by the display.

7. A system for generating perspective images of three-dimensional objects comprising:

object creation means for generating electrical signals representative of the three-dimensional object to be displayed;

said electrical signals being quantized into a plurality of surface defining units;

a display;

sorting means connected to said object creation means for ordering said units of electrical signals to conform to the scanning pattern of said display;

surface characteristic determination means connected to said sorting means for determining the visual characteristics of said surfaces defined by the units by determining values which control the intensity of illumination of said surfaces shown in the perspective image; and circuit means connecting said surface characteristic determination means to said display for applying the determined visual characteristics to said display in the order established by said sorting means to generate a perspective image of said three-dimensional object.

8. A system for generating perspective views of three-dimensional objects as set forth in claim 7 wherein said scanning pattern of said display is a raster scan and wherein said sorting means includes a first sorter for determining the order in which said surfaces defined by the units enter into successive scan lines and a second sorter for determining the order in which the surfaces defined by the units enter along a particular scan line.

9. A system for generating perspective views of three-dimensional objects comprising:

object creation means for generating electrical signals representative of the three-dimensional object to be displayed;

said electrical signals being quantized into a plurality of surface defining units;

a display;

sorting means connected to said object creation means for ordering said units of electrical signals to conform to the scanning pattern of said display;

surface characteristic determination means connected to said sorting means for determining the visual characteristics of said surfaces defined by the units;

visibility determining means connected between said sorting means and said surface characteristics determination means for determining which surfaces are to be displayed dependent upon the desired orientation of the object; and circuit means connecting said surface characteristic determination means to said display for applying the determined visual characteristics to said display in the order established by said sorting means to generate a perspective image of said three-dimensional object.

10. A system for generating shaded perspective views of a 3-D object comprising:

object creation means for providing electrical signals representative of the 3-D object, said signals being divided into sets defining a plurality of surface components of said object;

a first storage means connected to said object creation means for storing said sets of electrical signals;

a display;

sorting means connected to said storage means for ordering said stored sets of electrical signals to conform to the scanning pattern of the display;

a second storage means connected to said sorting means for storing said sorted sets of electrical signals;

a first calculating means connected to said second storage means for calculating the intensity of illumination of said surface components from a predetermined source of light; and circuit means connecting said first calculating means to said display, the intensity of said display being modified in accordance with the output of said first calculating means.

11. A system for generating a perspective picture of a 3-D object on a 2-D display comprising:

object creation means for producing a first set of digital signals representative of said object;

a storage means for receiving said first set of digital signals;

a prescan calculator connected to said storage means for retrieving said first set of digital signals and changing them in accordance with the desired orientation of the object to produce a second set of digital signals;

a display;

a sorter coupled to said prescan calculator for receiving said second set of digital signals;

said sorter rearranging said second set of digital signals to conform to the scanning pattern of said display;

circuit means connected between said sorter and said display for producing analog signals dependent on said second set of digital signals, said analog signals being supplied to said display in the order established by said sorter; and means for generating a display, the surface or portion thereof closest to said eye point being displayed where two or more surfaces occupy the same view plane position in whole or in part.

12. A system for generating shaded perspective views of three-dimensional objects comprising:

input means for receiving input data, said input data being representative of the object to be displayed and the eye point from which the object is to be observed, a first calculating means connected to said input means for determining the projection of said input data representative of the object onto a two-dimensional view plane established in relation to said eye point;

sorting means connected to said first calculating means for ordering the output of said first calculating means in accordance with the display scanning pattern;

distance-calculating means connected to said first calculating means for determining the distance from a light source to quantized portions of the output of said first calculating means;

light-intensity-calculating means connected to said distance calculating means for determining the intensity of light reflected from said quantized portions of the output of said first calculating means, and display means connected to said sorting means and responsive to the output of said light-intensity-calculating means for generating a perspective view of said object.

13. A system for generating perspective views of a three-diemnsional object as set forth in claim 12 wherein at least the sorting means, distance calculation means and the intensity calculation means comprise identical processing and storage units which are preset to perform the desired functions.

14. A system for generating perspective views of a three-dimensional object as set forth in claim 13 wherein the identical processing and storage units include a control unit, a plurality of read-only registers connected to said control unit and a plurality of read and write registers connected to said control unit.

15. A system for generating a shaded perspective representation of a 3-D object comprising:

object creation means for generating a first set of electrical signals representative of surface portions of the object;

prescan calculation means coupled to said object creation means for converting said first set of units into a second set of units representative of the projections of said surface portions defined by said first set of units onto a 2-D image plane;

a display;

sorting means coupled to said prescan calculation means for ordering said second set of units to conform to the scanning pattern of said display;

visibility calculation means connected to said sorting means for determining which of the projected surfaces defined by the second set of units are to be displayed;
intensity calculating means connected to said visibility calculating means for calculating the intensity of illumination of said surface portions defined by said second set of units from a predetermined source of light; and
circuit means connecting said intensity calculating means to said display,
the intensity of said display being modified in accordance with the output signals of said intensity-calculating means.

16. In the method of displaying a surface of an object, the steps of:
introducing into a memory unit electrical signals representative of the boundary of said surface;
arranging the electrical signals in a first register in accord with the position of said surface relative to an observation point desired for a particular display;
reading said register in a predetermined manner;
producing a first unique signal upon detection of a signal representative of a first boundary of said surface;
producing a display of said surface by a raster scan wherein a first boundary of the surface is displayed in an intensity proportional to said first unique signal, the intensity of the display being incrementally changed along said scan from said first boundary to the end of said surface.

17. The method of generating a perspective view of a 3-D object on a 2-D raster scan display by quantizing input data describing the simulated 3-D object into a plurality of surfaces, storing signals representative of said surfaces according to the order in which they appear in successive scan lines of the raster display,
storing signals representative of the surfaces appearing in each scan line according to their positions along said scan line and,
applying the stored signals representative of the surfaces along each scan line to the raster scan display.

18. A method of generating a perspective view of a 3-D object on a 2-D display comprising the steps of:
storing digital signals representative of the locations of surfaces of an object in a memory unit;
changing said stored digital signal to correlate with a chosen orientation relative to the eyepoint from which the perspective view is generated;
rearranging said changed digital signals to conform to the scanning pattern of the display; and
modifying the intensity of the display in response to the digital signals in the rearranged order.

19. The method of generating a perspective view of a 3-D object on a 2-D raster scan display by
quantizing input data describing the simulated 3-D object surfaces relative to an eyepoint;
determining signals representing the projection of said surfaces on a 2-D view plane established according to said eyepoint;
ordering said determined signals in accordance with the raster scan of the display; and
using the signals to generate a display of selected ones of said quantized surfaces in the order established, the surface or portion thereof closest to said eyepoint being displayed where two or more surfaces occupy the same view plane position in whole or in part.

20. The method of generating a halftone perspective image of a 3-D object on a raster scan display comprising the steps of:
providing quantized data defining the 3-D object in relation to an eyepoint the data comprising a group of signals each defining a surface of said object;
ordering the data group to conform to a predetermined scan;
calculating an apparent brightness value from said data for each of said surfaces to be displayed with reference to at least one predetermined light path;
scanning the raster of the display; and
modifying the light intensity of the scan in a manner related to the calculated apparent brightness values for the surfaces being displayed.

21. A method of claim 1 wherein the surfaces defined by the data groups are planar.

22. A method of claim 1 wherein the surfaces defined by the data groups are triangular planes.

23. A method according to claim 22 wherein the light path is essentially coincident with the line between the eyepoint and the object.

24. A method according to claim 20 wherein the light path is other than coincident with the line between the eyepoint and the object.

25. A method according to claim 20 wherein a plurality of light paths exist.

26. The method of claim 20 comprising calculating signals identifying projections of said surfaces on a 2-D view plane related to said eyepoint to obtain the quantized data.

27. The method of claim 26 wherein the surfaces defined by the units are triangular planes, and
wherein the calculated apparent brightness values are determined in terms of the values of the projections of said triangular planes on the view plane.

28. The method of claim 26, further including calculating signals indicative of the distance from each surface defined by a data group to said eyepoint, and wherein the intensity of the scan of the display is modified in a manner related to the calculated apparent brightness values for the surface closest to the eyepoint where two or more surfaces defined by the units project onto the view plane so as to overlap.

29. The method of claim 28 wherein the signals indicative of distance from each of said surfaces to said eyepoint is determined in terms of the values of the projections of said surfaces on the view plane.

30. The method of claim 28 wherein the surfaces defined by the data groups are triangular planes and
wherein the signals indicative of the distances from said triangular planes to said eyepoint are calculated approximately by considering components of the distances and by calculating the indicative signals at edges of the surfaces only.

31. The method of claim 20 wherein the ordering is according to the order in which the surfaces defined by the groups appear in successive scan lines of the display, and
ordering the groups within each scan line according to the positions of the surfaces defined by the groups along said scan line; and
wherein the intensity of the scan is modified in the order established in a manner relating to the calculated apparent brightness values for the surfaces to be displayed.

32. The method of claim 31 including comparing the order of the groups within each scan line with the order of the units for the preceding scan line.

33. The method of claim 31 wherein the calculated apparent brightness values for each of the surfaces to be displayed is approximated by calculating such values at the entering point of said surface along each scan line and linearly interpolating additional values thereafter along each scan line until the exiting point of said surface is reached.

34. The method of generating a perspective view of a 3-D object on a 2-D raster scan display comprising the steps of:
a. providing input data defining a 3-D object;
b. quantizing the input data into units defining surfaces of said object;
c. providing input data specifying an eyepoint;
d. calculating the projections of said surfaces defined by the units on a 2-D view plane related to said eyepoint;
e. ordering the units to conform to a predetermined scan;
f. calculating the distance from at least some of the surfaces defined by the units to said eyepoint;
g. scanning the raster of the display;
h. modifying the intensity of the scan in a manner related to the surfaces defined by the units in the order established for the units the intensity being modified in a manner related to the surface closest to said eyepoint where two or more surfaces project onto the view plane in the same position.

35. The method of claim 34 wherein the surfaces defined by the units are planar.

36. The method of claim 35 wherein the surfaces defined by the units are polyhedra.

37. The method of claim 34 wherein the said surfaces defined by the units are triangular planes.

38. The method of claim 37 wherein the distance from each of said triangular planes to said eyepoint is calculated in terms of the 2-D values defining a point on said view plane.

39. The method of claim 34 wherein the ordering of the units includes ordering the units according to the order in which the surfaces defined by the units appear in successive scan lines of the display and ordering the units within each scan line according to the positions of the surfaces defined by the units along said scan line.

40. The method of generating a perspective view of a 3-D object on a 2-D raster scan display comprising the steps of:

a. providing input data defining a 3-D object;
b. quantizing the input data units, each defining a surface of said object;
c. ordering the units according to the order in which the surfaces defined by the units appear in successive scan lines of this display;
d. ordering the units within said scan lines according to the positions of the surfaces defined by the units along said scan lines;
e. scanning the raster of the display;
f. modifying the intensity of the scan in a manner related to the surfaces defined by the units within each scan line according to the order established for the units along each scan line.

41. The method of claim 40 wherein the surfaces defined by the units are planar.

42. The method of claim 40 wherein the surfaces defined by the units are triangular planes.

43. The method of generating a perspective view of a 3-D object on a 2-D raster scan display comprising the steps of:

providing sets of quantized data defining a 3-D object, each set defining a surface of said object;
ordering the sets to conform to a predetermined scan;
scanning the raster of the display; and
modifying the intensity of the scan to display the surface defined by the sets in the order established.

44. The method of claim 43 wherein the surfaces defined by the units are planar.

45. The method of claim 43 wherein the surfaces defined by the units are triangular planes.

46. The method of generating a shaded perspective view of a 3-D object comprising:

providing a 3-D object defining a source of input electrical signals;
quantizing the electrical signals into surface defining units;
storing the quantized electrical signals;
ordering the stored quantized signals;
calculating the intensity of the illumination of each of the surfaces defined by the units from a predetermined light source;
scanning the display in the same order in which the electrical signals are ordered;
varying the display according to the calculated intensity in the same order in which the electrical signals are ordered.

47. A method for generating a perspective picture of a three-space object on a two-space display by recording groups of electrical signals of data representative of the three-space locations of the surface regions of said object in regard to a selected set of reference relationships including the location of an observer;

converting the groups to represent the projections of the surface regions defined by the units onto a view plane defined by two-space relationships;
sorting the converted groups in accordance with the scanning pattern of a display;
calculating the value of a monotonic function of the line of sight distance along a scan ray from the observer to surface regions which are aligned one behind another in whole or in part;
comparing the calculated values to determine which aligned surface region is closest to the observer and therefore visible; and
modifying the scanning beams of the display to create a picture of all and only the visible surface regions.

48. A method according to claim 47 including comparing the order of groups established by the sort for the previous scan line and where the orders are identical in whole or in part performing said modifying step without performing the calculating and comparing steps for that portion of the compared orders which is identical.

* * * * *

PO-1050
(5/69)

UNITED STATES PATENT OFFICE
CERTIFICATE OF CORRECTION

Patent No. 3,621,214 Dated November 16, 1971

Inventor(s) Gordon W. Romney et al

It is certified that error appears in the above-identified patent and that said Letters Patent are hereby corrected as shown below:

Column 3, line 11, "Figs. lb-ld" should read --Figs. lb-lc--.

Column 4, line 43, "depth in added" should read --depth is added--.

Column 6, line 17, "components vectors" should read --components of the corresponding vectors--.

Column 10, line 72, "stored the memory" should read --stored in the memory--.

Column 12, line 18, "by a single unit" should read --be a single unit--.

Column 13, line 74, "indicated" should read --indicates--.

Column 14, line 66, "AND gates output C" should read --Likewise output C--.

Column 15, line 54, "images vector" should read --image vector--.

Column 17, line 2, "AND agate" should read --AND gate--.

Column 17, line 42, "indicated" should read --indicates--.

PO-1050
(5/69)

UNITED STATES PATENT OFFICE
CERTIFICATE OF CORRECTION

Patent No. 3,621,214 Dated November 16, 1971

Inventor(s) Gordon W. Romney et al

It is certified that error appears in the above-identified patent and that said Letters Patent are hereby corrected as shown below:

Column 18, line 29, "determined" should read --determines--.

Column 18, line 71, "Specifically $I_z$" should read --Specifically $I_{xa}$--.

Column 19, line 25, "$I_{xa}$ through $I_{xc}$" should read --$I_{xa}$ through $I_{zc}$--.

Column 19, lines 72-73, "divide 1 from a register 297. The dividers divide "1" a divider the Ry" should read --divide "1" by the Ry--.

Column 20, line 22, "1Ry3" should read --1/Ry3--.

Column 20, line 22, "in the begin and end" should read --in the Z begin and end--.

Column 23, line 75, "preceding triangle in" should read --preceding triangle number in--.

Column 25, line 14, "A "-3" is stored" should read --A "-2" is stored--.

Column 26, line 3, " pervious" should read --previous--.

Column 26, line 47, "second input o the AND" should read --second input of the AND--.

Column 27, line 74, please change "423" to --432--.

Column 28, line 1, "434 are connected" should read --434, respectively. The outputs of the AND gates 432, 433 and 434 are connected--.

Column 28, line 8, please change "422" to --442--.

PO-1050
(5/69)

UNITED STATES PATENT OFFICE
CERTIFICATE OF CORRECTION

Patent No. 3,621,214 Dated November 16, 1971

Inventor(s) Gordon W. Romney et al

It is certified that error appears in the above-identified patent and that said Letters Patent are hereby corrected as shown below:

Column 28, line 25, please change "422" to --442--;

Column 28, line 30, please change "422" to --442--.

Column 28, line 43, "I" should read --$I_{xj}$--.

Column 29, line 25, "multiples" should read --multipliers--.

Column 32, line 62, "received" should read --receives--.

Column 33, line 28, "Fore" should read --For--.

Column 34, line 26, "sequence cs" should read --sequence μ cs--.

Column 34, line 67, "line exits" should read --line exists--.

Column 36, line 69, "exists" should read --exits--.

Column 36, line 70, "Z=III is stored" should read --Z=6 and therefor III is stored--.

Claim 23, line 1, reference to claim "22" should be --20--.

Claim 48, line 2, "by the sort for the previous scan line" should read --by the sort for one scan line with the order of groups established by the sort for the previous scan line--.

Signed and sealed this 8th day of August 1972.

(SEAL)
Attest:

| | |
|---|---|
| EDWARD M.FLETCHER,JR. | ROBERT GOTTSCHALK |
| Attesting Officer | Commissioner of Patents |